United States Patent
Weingarten et al.

(10) Patent No.: US 12,244,626 B2
(45) Date of Patent: *Mar. 4, 2025

(54) METHODS, SYSTEMS, AND DEVICES FOR DYNAMICALLY MODELING AND GROUPING ENDPOINTS FOR EDGE NETWORKING

(71) Applicant: Sentinel Labs Israel Ltd., Tel Aviv (IL)

(72) Inventors: Tomer Weingarten, Mountain View, CA (US); Almog Cohen, Tel Aviv (IL)

(73) Assignee: Sentinel Labs Israel Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/525,113

(22) Filed: Nov. 30, 2023

(65) Prior Publication Data
US 2024/0187437 A1 Jun. 6, 2024

Related U.S. Application Data

(63) Continuation of application No. 17/660,187, filed on Apr. 21, 2022, now Pat. No. 11,838,305, which is a
(Continued)

(51) Int. Cl.
*H04L 9/40* (2022.01)
*G06F 8/61* (2018.01)
(Continued)

(52) U.S. Cl.
CPC ............ *H04L 63/1425* (2013.01); *G06F 8/61* (2013.01); *G06F 9/44526* (2013.01);
(Continued)

(58) Field of Classification Search
CPC ............... H04L 63/1425; H04L 41/046; H04L 41/0893; H04L 41/16; H04L 63/08;
(Continued)

(56) References Cited

U.S. PATENT DOCUMENTS 4,979,118 A 12/1990 Kheradpir
5,311,593 A 5/1994 Carmi
(Continued)

FOREIGN PATENT DOCUMENTS

CN 103607399 A 2/2014
CN 109446755 A 3/2019
(Continued)

OTHER PUBLICATIONS

Barbhuiya et al., "Detection of neighbor solicitation and advertisement spoofing in IPV6 neighbordiscovery protocol." Proceedings of the 4th international conference on Security of information and networks. (2011).
(Continued)

*Primary Examiner* — J. Brant Murphy
(74) *Attorney, Agent, or Firm* — Perkins Coie LLP

(57) ABSTRACT

Various embodiments described herein disclose an endpoint modeling and grouping management system that can collect data from endpoint computer devices in a network. In some embodiments, agents installed on the endpoints can collect real-time information at the kernel level providing the system with deep visibility. In some embodiments, the endpoint modeling and grouping management system can identify similarities in behavior in response to assessing the data collected by the agents. In some embodiments, the endpoint modeling and grouping management system can dynamically model groups such as logical groups, and cluster endpoints based on the similarities and/or differences in behavior of the endpoints. In some embodiments, the endpoint modeling and grouping management system transmits the behavioral models to the agents to allow the agents to identify anomalies and/or security threats autonomously.

12 Claims, 23 Drawing Sheets

Related U.S. Application Data continuation of application No. 17/069,415, filed on Oct. 13, 2020, now Pat. No. 11,522,894, which is a continuation of application No. 16/525,415, filed on Jul. 29, 2019, now Pat. No. 10,841,325, which is a continuation of application No. 16/058,810, filed on Aug. 8, 2018, now Pat. No. 10,462,171.

(60) Provisional application No. 62/550,439, filed on Aug. 25, 2017, provisional application No. 62/545,917, filed on Aug. 15, 2017, provisional application No. 62/542,288, filed on Aug. 8, 2017.

(51) Int. Cl.
*G06F 9/445* (2018.01)
*H04L 41/046* (2022.01)
*H04L 41/0893* (2022.01)
*H04L 41/16* (2022.01)
*H04L 67/00* (2022.01)
*H04L 67/10* (2022.01)
*H04L 41/12* (2022.01)
*H04L 41/14* (2022.01)

(52) U.S. Cl.
CPC ........ *H04L 41/046* (2013.01); *H04L 41/0893* (2013.01); *H04L 41/16* (2013.01); *H04L 63/08* (2013.01); *H04L 63/102* (2013.01); *H04L 63/104* (2013.01); *H04L 63/1416* (2013.01); *H04L 63/1441* (2013.01); *H04L 63/205* (2013.01); *H04L 67/10* (2013.01); *H04L 67/34* (2013.01); *H04L 41/12* (2013.01); *H04L 41/145* (2013.01)

(58) Field of Classification Search
CPC . H04L 63/102; H04L 63/104; H04L 63/1416; H04L 63/1441; H04L 63/205; H04L 67/10; H04L 67/34; H04L 41/12; H04L 41/145; H04L 63/145; H04L 41/0894; H04L 41/0895; H04L 41/122; H04L 41/40; G06F 8/61; G06F 9/44526; G06F 21/552; G06F 21/554
See application file for complete search history.

(56) References Cited

U.S. PATENT DOCUMENTS

| | | | |
|---|---|---|---|
| 5,754,938 A * | 5/1998 | Herz .................... G06Q 20/383 | |
| | | | 348/E7.071 |
| 6,026,474 A | 2/2000 | Carter et al. | |
| 6,154,844 A | 11/2000 | Touboul et al. | |
| 6,157,953 A | 12/2000 | Chang et al. | |
| 6,728,716 B1 | 4/2004 | Bhattacharya et al. | |
| 6,804,780 B1 | 10/2004 | Touboul | |
| 6,836,888 B1 | 12/2004 | Basu et al. | |
| 7,076,696 B1 | 7/2006 | Stringer | |
| 7,093,239 B1 | 8/2006 | Van der Made | |
| 7,181,769 B1 | 2/2007 | Keanini et al. | |
| 7,225,468 B2 | 5/2007 | Waisman et al. | |
| 7,299,294 B1 | 11/2007 | Bruck et al. | |
| 7,305,546 B1 | 12/2007 | Miller | |
| 7,322,044 B2 | 1/2008 | Hrastar | |
| 7,464,407 B2 | 12/2008 | Nakae et al. | |
| 7,530,106 B1 | 5/2009 | Zaitsev et al. | |
| 7,543,269 B2 | 6/2009 | Krueger | |
| 7,546,587 B2 | 6/2009 | Marr et al. | |
| 7,574,740 B1 * | 8/2009 | Kennis ................. H04L 63/1433 | |
| | | | 713/168 |
| 7,596,807 B2 | 9/2009 | Ptacek et al. | |
| 7,596,808 B1 | 9/2009 | Wilkinson et al. | |
| 7,665,139 B1 | 2/2010 | Szor et al. | |
| 7,710,933 B1 | 5/2010 | Sundaralingam et al. | |
| 7,739,516 B2 | 6/2010 | Bender et al. | |
| 7,832,012 B2 | 11/2010 | Huddleston | |
| 7,882,538 B1 * | 2/2011 | Palmer .................... G06F 21/31 | |
| | | | 713/153 |
| 7,890,612 B2 | 2/2011 | Todd et al. | |
| 7,937,755 B1 | 5/2011 | Guruswamy | |
| 7,958,549 B2 | 6/2011 | Nakae et al. | |
| 7,975,018 B2 | 7/2011 | Unrau et al. | |
| 7,984,129 B2 | 7/2011 | Vaught | |
| 8,015,605 B2 | 9/2011 | Yegneswaran | |
| 8,024,795 B2 * | 9/2011 | Newton .................. H04L 63/20 | |
| | | | 726/25 |
| 8,042,186 B1 | 10/2011 | Polyakov et al. | |
| 8,056,134 B1 | 11/2011 | Ogilvie | |
| 8,065,722 B2 | 11/2011 | Barford et al. | |
| 8,078,556 B2 | 12/2011 | Adi et al. | |
| 8,082,471 B2 | 12/2011 | Khan | |
| 8,131,281 B1 | 3/2012 | Hildner et al. | |
| 8,141,154 B2 | 3/2012 | Gruzman et al. | |
| 8,156,556 B2 | 4/2012 | Krishnamurthy | |
| 8,171,545 B1 | 5/2012 | Cooley et al. | |
| 8,181,033 B1 | 5/2012 | Paul et al. | |
| 8,181,250 B2 | 5/2012 | Rafalovich et al. | |
| 8,204,984 B1 | 6/2012 | Aziz | |
| 8,205,035 B2 | 6/2012 | Reddy et al. | |
| 8,230,505 B1 * | 7/2012 | Ahrens ................. H04L 63/168 | |
| | | | 705/5 |
| 8,239,947 B1 | 8/2012 | Glick et al. | |
| 8,296,842 B2 | 10/2012 | Singh et al. | |
| 8,327,442 B2 | 12/2012 | Herz et al. | |
| 8,353,033 B1 | 1/2013 | Chen et al. | |
| 8,370,931 B1 | 2/2013 | Chien et al. | |
| 8,375,444 B2 | 2/2013 | Aziz et al. | |
| 8,375,447 B2 | 2/2013 | Amoroso et al. | |
| 8,413,238 B1 | 4/2013 | Sutton | |
| 8,413,241 B2 | 4/2013 | Weeks et al. | |
| 8,418,250 B2 | 4/2013 | Morris et al. | |
| 8,438,386 B2 | 5/2013 | Hegli et al. | |
| 8,438,626 B2 | 5/2013 | Anderson et al. | |
| 8,443,442 B2 | 5/2013 | Wang et al. | |
| 8,474,044 B2 | 6/2013 | Zawadowskiy et al. | |
| 8,488,466 B2 | 7/2013 | Breslin et al. | |
| 8,528,057 B1 | 9/2013 | Garrett | |
| 8,528,087 B2 | 9/2013 | Hsu et al. | |
| 8,538,578 B2 | 9/2013 | Battles et al. | |
| 8,539,578 B1 | 9/2013 | Zhou et al. | |
| 8,539,582 B1 | 9/2013 | Aziz et al. | |
| 8,549,643 B1 | 10/2013 | Shou | |
| 8,555,385 B1 * | 10/2013 | Bhatkar ................. G06F 21/556 | |
| | | | 726/25 |
| 8,561,177 B1 | 10/2013 | Aziz et al. | |
| 8,566,946 B1 | 10/2013 | Aziz et al. | |
| 8,607,054 B2 | 12/2013 | Ramarathinam et al. | |
| 8,607,340 B2 | 12/2013 | Wright | |
| 8,627,475 B2 | 1/2014 | Loveland et al. | |
| 8,677,494 B2 | 3/2014 | Edery et al. | |
| 8,713,306 B1 | 4/2014 | Bennett | |
| 8,719,937 B2 | 5/2014 | Sundaram et al. | |
| 8,725,898 B1 | 5/2014 | Vincent | |
| 8,726,389 B2 | 5/2014 | Morris et al. | |
| 8,732,296 B1 | 5/2014 | Thomas et al. | |
| 8,752,173 B2 | 6/2014 | Yadav | |
| 8,789,135 B1 | 7/2014 | Pani | |
| 8,793,151 B2 | 7/2014 | Delzoppo et al. | |
| 8,806,638 B1 | 8/2014 | Mani | |
| 8,821,242 B2 | 9/2014 | Hinman et al. | |
| 8,839,369 B1 | 9/2014 | Dai et al. | |
| 8,844,041 B1 * | 9/2014 | Kienzle ............... H04L 63/1433 | |
| | | | 709/224 |
| 8,849,880 B2 | 9/2014 | Thelen | |
| 8,850,582 B2 | 9/2014 | Endoh et al. | |
| 8,880,435 B1 | 11/2014 | Catlett et al. | |
| 8,881,282 B1 | 11/2014 | Aziz et al. | |
| 8,893,278 B1 | 11/2014 | Chechik | |
| 8,898,788 B1 | 11/2014 | Aziz et al. | |
| 8,904,527 B2 | 12/2014 | Dawson et al. | |
| 8,943,594 B1 | 1/2015 | Arrowood | |
| 8,949,986 B2 | 2/2015 | Ben-Shalom | |
| 8,959,338 B2 | 2/2015 | Snow et al. | |

(56) References Cited

U.S. PATENT DOCUMENTS

| | | | |
|---|---|---|---|
| 8,973,142 B2 | 3/2015 | Shulman et al. | |
| 8,984,637 B2 | 3/2015 | Karecha et al. | |
| 9,009,829 B2 | 4/2015 | Stolfo et al. | |
| 9,027,135 B1 | 5/2015 | Aziz | |
| 9,043,920 B2 | 5/2015 | Gula et al. | |
| 9,081,747 B1 | 7/2015 | Tabieros et al. | |
| 9,117,078 B1 | 8/2015 | Chien et al. | |
| 9,141,792 B2 | 9/2015 | Baluda et al. | |
| 9,166,993 B1 * | 10/2015 | Liu | H04L 63/1425 |
| 9,185,136 B2 | 11/2015 | Dulkin et al. | |
| 9,195,480 B2 | 11/2015 | Wang et al. | |
| 9,197,601 B2 | 11/2015 | Pasdar | |
| 9,213,838 B2 | 12/2015 | Lu | |
| 9,225,734 B1 | 12/2015 | Hastings | |
| 9,240,976 B1 | 1/2016 | Murchison | |
| 9,246,774 B2 | 1/2016 | Mataitis et al. | |
| 9,270,690 B2 | 2/2016 | Kraitsman et al. | |
| 9,305,165 B2 | 4/2016 | Snow et al. | |
| 9,329,973 B2 | 5/2016 | Bhuyan | |
| 9,330,259 B2 | 5/2016 | Klein et al. | |
| 9,356,942 B1 | 5/2016 | Joffe | |
| 9,356,950 B2 | 5/2016 | Vissamsetty et al. | |
| 9,369,476 B2 | 6/2016 | Chekina et al. | |
| 9,386,034 B2 | 7/2016 | Cochenour | |
| 9,398,001 B1 | 7/2016 | Tidd | |
| 9,407,602 B2 | 7/2016 | Feghali et al. | |
| 9,413,721 B2 | 8/2016 | Morris et al. | |
| 9,430,646 B1 | 8/2016 | Mushtaq et al. | |
| 9,432,360 B1 | 8/2016 | Triandopoulos et al. | |
| 9,438,614 B2 | 9/2016 | Herz | |
| 9,495,188 B1 | 11/2016 | Ettema et al. | |
| 9,503,470 B2 | 11/2016 | Gertner et al. | |
| 9,547,516 B2 | 1/2017 | Thakkar et al. | |
| 9,578,045 B2 | 2/2017 | Jaroch et al. | |
| 9,591,006 B2 | 3/2017 | Siva et al. | |
| 9,601,000 B1 | 3/2017 | Gruss et al. | |
| 9,602,531 B1 | 3/2017 | Wallace et al. | |
| 9,606,893 B2 | 3/2017 | Gupta et al. | |
| 9,607,146 B2 | 3/2017 | Sridhara et al. | |
| 9,609,019 B2 | 3/2017 | Vissamsetty et al. | |
| 9,628,498 B1 | 4/2017 | Aziz et al. | |
| 9,641,544 B1 * | 5/2017 | Treat | H04L 43/04 |
| 9,641,550 B2 | 5/2017 | Kraitsman et al. | |
| 9,705,904 B1 | 7/2017 | Davis et al. | |
| 9,710,648 B2 * | 7/2017 | Weingarten | G06F 21/566 |
| 9,712,547 B2 | 7/2017 | Touboul et al. | |
| 9,749,349 B1 | 8/2017 | Czarny et al. | |
| 9,769,204 B2 | 8/2017 | Vissamsetty et al. | |
| 9,772,832 B2 | 9/2017 | Rubio | |
| 9,781,148 B2 | 10/2017 | Mahaffey et al. | |
| 9,807,092 B1 | 10/2017 | Gutzmann | |
| 9,807,115 B2 | 10/2017 | Kolton et al. | |
| 9,813,451 B2 | 11/2017 | Honda et al. | |
| 9,871,766 B2 | 1/2018 | Syed et al. | |
| 9,877,210 B1 | 1/2018 | Hildner et al. | |
| 9,888,032 B2 | 2/2018 | Dekel et al. | |
| 9,898,763 B1 | 2/2018 | Vaynblat et al. | |
| 9,942,270 B2 | 3/2018 | Vissamsetty et al. | |
| 10,025,928 B2 | 7/2018 | Jaroch et al. | |
| 10,044,675 B1 | 8/2018 | Ettema et al. | |
| 10,102,374 B1 | 10/2018 | Cohen et al. | |
| 10,169,586 B2 | 1/2019 | Maciejak et al. | |
| 10,237,282 B2 | 3/2019 | Nelson et al. | |
| 10,250,636 B2 | 4/2019 | Vissamsetty et al. | |
| 10,257,224 B2 | 4/2019 | Jaroch et al. | |
| 10,284,591 B2 | 5/2019 | Giuliani et al. | |
| 10,375,110 B2 | 7/2019 | Vissamsetty et al. | |
| 10,382,484 B2 | 8/2019 | Shayevitz et al. | |
| 10,476,891 B2 | 11/2019 | Vissamsetty et al. | |
| 10,509,905 B2 | 12/2019 | Vissamsetty et al. | |
| 10,542,044 B2 | 1/2020 | Vissamsetty et al. | |
| 10,567,431 B2 | 1/2020 | Vissamsetty et al. | |
| 10,574,698 B1 | 2/2020 | Sharifi | |
| 10,599,842 B2 | 3/2020 | Vissamsetty et al. | |
| 10,599,844 B2 | 3/2020 | Schmidtler et al. | |
| 10,609,074 B2 | 3/2020 | Vissamsetty et al. | |
| 10,757,090 B2 | 8/2020 | Kahol et al. | |
| 10,826,941 B2 | 11/2020 | Jain et al. | |
| 10,855,671 B2 | 12/2020 | Kahol et al. | |
| 10,938,854 B2 | 3/2021 | Strogov et al. | |
| 11,032,301 B2 | 6/2021 | Mandrychenko et al. | |
| 11,038,658 B2 | 6/2021 | Vissamsetty et al. | |
| 11,171,974 B2 | 11/2021 | Gertner et al. | |
| 11,470,115 B2 | 10/2022 | Vissamsetty et al. | |
| 11,481,503 B2 | 10/2022 | Gitelman et al. | |
| 11,507,663 B2 | 11/2022 | Cohen et al. | |
| 11,522,894 B2 | 12/2022 | Weingarten et al. | |
| 11,579,857 B2 | 2/2023 | Montag et al. | |
| 11,580,218 B2 | 2/2023 | Enfinger | |
| 11,615,184 B2 | 3/2023 | Kutt et al. | |
| 11,695,800 B2 | 7/2023 | Vissamsetty et al. | |
| 11,734,303 B2 | 8/2023 | Cruanes et al. | |
| 11,997,139 B2 | 5/2024 | Vissamsetty et al. | |
| 2002/0010800 A1 | 1/2002 | Riley et al. | |
| 2002/0016826 A1 | 2/2002 | Johansson et al. | |
| 2002/0078382 A1 * | 6/2002 | Sheikh | H04L 63/20 709/224 |
| 2002/0093917 A1 | 7/2002 | Knobbe et al. | |
| 2002/0095607 A1 | 7/2002 | Lin-Hendel | |
| 2002/0178374 A1 | 11/2002 | Swimmer et al. | |
| 2002/0194489 A1 | 12/2002 | Almogy et al. | |
| 2003/0065950 A1 | 4/2003 | Yarborough | |
| 2003/0145225 A1 * | 7/2003 | Bruton, III | H04L 63/1408 726/23 |
| 2003/0145226 A1 * | 7/2003 | Bruton, III | H04L 63/0263 709/224 |
| 2003/0152034 A1 | 8/2003 | Zhang et al. | |
| 2003/0188189 A1 * | 10/2003 | Desai | H04L 63/104 726/23 |
| 2003/0223367 A1 | 12/2003 | Shay et al. | |
| 2004/0083369 A1 | 4/2004 | Erlingsson et al. | |
| 2004/0172557 A1 | 9/2004 | Nakae et al. | |
| 2004/0243699 A1 * | 12/2004 | Koclanes | H04L 41/5003 709/224 |
| 2004/0255157 A1 * | 12/2004 | Ghanea-Hercock | H04L 63/1408 726/23 |
| 2005/0050353 A1 | 3/2005 | Thiele et al. | |
| 2005/0076235 A1 | 4/2005 | Ormazabal et al. | |
| 2005/0076238 A1 | 4/2005 | Ormazabal et al. | |
| 2005/0108562 A1 | 5/2005 | Khazan et al. | |
| 2005/0138402 A1 * | 6/2005 | Yoon | H04L 63/1408 713/193 |
| 2005/0160480 A1 | 7/2005 | Birt et al. | |
| 2005/0198507 A1 | 9/2005 | Brender et al. | |
| 2005/0204157 A1 | 9/2005 | Johnson | |
| 2005/0223239 A1 | 10/2005 | Dotan | |
| 2005/0240906 A1 | 10/2005 | Kinderknecht et al. | |
| 2005/0240989 A1 | 10/2005 | Kim et al. | |
| 2006/0053490 A1 * | 3/2006 | Herz | H04L 63/1425 726/23 |
| 2006/0085543 A1 * | 4/2006 | Hrastar | H04W 12/122 709/224 |
| 2006/0101515 A1 | 5/2006 | Amoroso et al. | |
| 2006/0126522 A1 | 6/2006 | Oh | |
| 2006/0161989 A1 | 7/2006 | Reshef et al. | |
| 2006/0203774 A1 | 9/2006 | Carrion-Rodrigo | |
| 2006/0209701 A1 | 9/2006 | Zhang et al. | |
| 2006/0230129 A1 | 10/2006 | Swami et al. | |
| 2006/0236401 A1 | 10/2006 | Fosdick | |
| 2007/0022090 A1 | 1/2007 | Graham | |
| 2007/0025374 A1 | 2/2007 | Stefan et al. | |
| 2007/0067623 A1 | 3/2007 | Ward | |
| 2007/0097976 A1 | 5/2007 | Wood et al. | |
| 2007/0100905 A1 | 5/2007 | Masters et al. | |
| 2007/0101431 A1 | 5/2007 | Clift et al. | |
| 2007/0115993 A1 | 5/2007 | Cohen | |
| 2007/0143827 A1 * | 6/2007 | Nicodemus | H04L 63/102 726/2 |
| 2007/0143851 A1 * | 6/2007 | Nicodemus | H04L 63/1433 726/4 |
| 2007/0177499 A1 | 8/2007 | Gavrilescu et al. | |
| 2007/0208822 A1 | 9/2007 | Wang et al. | |

(56) References Cited

U.S. PATENT DOCUMENTS

| | | |
|---|---|---|
| 2007/0208936 A1 | 9/2007 | Ramos |
| 2007/0209070 A1 | 9/2007 | Yadav |
| 2007/0226320 A1 | 9/2007 | Hager et al. |
| 2007/0240215 A1 | 10/2007 | Flores et al. |
| 2007/0250930 A1 | 10/2007 | Aziz et al. |
| 2007/0266422 A1 | 11/2007 | Germano et al. |
| 2007/0282782 A1 | 12/2007 | Carey et al. |
| 2008/0005782 A1 | 1/2008 | Aziz |
| 2008/0018927 A1 | 1/2008 | Martin et al. |
| 2008/0022000 A1 | 1/2008 | Furuya et al. |
| 2008/0034429 A1 | 2/2008 | Schneider |
| 2008/0046989 A1 | 2/2008 | Wahl |
| 2008/0060074 A1 | 3/2008 | Okuyama |
| 2008/0071728 A1* | 3/2008 | Lim .................. H04L 63/20 |
| 2008/0082722 A1* | 4/2008 | Savagaonkar .......... G06F 21/56 |
| | | 711/6 |
| 2008/0083034 A1 | 4/2008 | Kim et al. |
| 2008/0098476 A1 | 4/2008 | Syversen |
| 2008/0104046 A1 | 5/2008 | Singla et al. |
| 2008/0127346 A1 | 5/2008 | Oh et al. |
| 2008/0162397 A1* | 7/2008 | Zaltzman ............... H04L 63/30 |
| | | 706/48 |
| 2008/0168559 A1 | 7/2008 | Touitou et al. |
| 2008/0170566 A1 | 7/2008 | Akimoto |
| 2008/0229415 A1 | 9/2008 | Kapoor et al. |
| 2009/0077664 A1* | 3/2009 | Hsu ..................... G06F 21/566 |
| | | 711/163 |
| 2009/0089040 A1* | 4/2009 | Monastyrsky ........ G06F 21/566 |
| | | 703/26 |
| 2009/0104046 A1 | 4/2009 | Martin et al. |
| 2009/0158407 A1 | 6/2009 | Nicodemus et al. |
| 2009/0158418 A1 | 6/2009 | Rao et al. |
| 2009/0170566 A1 | 7/2009 | Kwon et al. |
| 2009/0199296 A1 | 8/2009 | Xie et al. |
| 2009/0241173 A1 | 9/2009 | Troyansky |
| 2009/0249466 A1* | 10/2009 | Motil .................. H04L 63/1441 |
| | | 709/225 |
| 2009/0249470 A1 | 10/2009 | Litvin et al. |
| 2009/0254973 A1 | 10/2009 | Kwan |
| 2009/0288158 A1 | 11/2009 | Izatt et al. |
| 2009/0296641 A1 | 12/2009 | Bienas et al. |
| 2009/0327688 A1 | 12/2009 | Li et al. |
| 2009/0328196 A1 | 12/2009 | Bovee |
| 2010/0005339 A1 | 1/2010 | Hooks |
| 2010/0077483 A1 | 3/2010 | Stolfo et al. |
| 2010/0122317 A1 | 5/2010 | Yadav |
| 2010/0122343 A1 | 5/2010 | Ghosh et al. |
| 2010/0169973 A1 | 7/2010 | Kim et al. |
| 2010/0269175 A1 | 10/2010 | Stolfo et al. |
| 2010/0293615 A1 | 11/2010 | Ye |
| 2010/0299430 A1 | 11/2010 | Powers et al. |
| 2010/0332498 A1 | 12/2010 | Svore et al. |
| 2011/0023118 A1* | 1/2011 | Wright ................. H04L 63/1441 |
| | | 726/23 |
| 2011/0067107 A1 | 3/2011 | Weeks et al. |
| 2011/0078309 A1 | 3/2011 | Bloch |
| 2011/0099633 A1 | 4/2011 | Aziz |
| 2011/0113427 A1 | 5/2011 | Dotan |
| 2011/0138456 A1 | 6/2011 | Ormazabal et al. |
| 2011/0141937 A1 | 6/2011 | Breslin et al. |
| 2011/0145920 A1 | 6/2011 | Mahaffey et al. |
| 2011/0167494 A1 | 7/2011 | Bowen |
| 2011/0178930 A1 | 7/2011 | Scheidt et al. |
| 2011/0185430 A1* | 7/2011 | Sallam .................. G06F 21/56 |
| | | 726/23 |
| 2011/0209219 A1 | 8/2011 | Zeitlin et al. |
| 2011/0214176 A1 | 9/2011 | Burch et al. |
| 2011/0214182 A1 | 9/2011 | Adams et al. |
| 2011/0219443 A1 | 9/2011 | Hampel |
| 2011/0219449 A1 | 9/2011 | St. Neitzel |
| 2011/0225655 A1 | 9/2011 | Niemelä et al. |
| 2011/0247071 A1 | 10/2011 | Hooks et al. |
| 2011/0252434 A1 | 10/2011 | Stokes |
| 2011/0271341 A1 | 11/2011 | Satish et al. |
| 2011/0276597 A1 | 11/2011 | Little |
| 2011/0288940 A1 | 11/2011 | Hordan et al. |
| 2012/0023572 A1 | 1/2012 | William, Jr. et al. |
| 2012/0030745 A1 | 2/2012 | Bauer |
| 2012/0030750 A1 | 2/2012 | Bhargava et al. |
| 2012/0079596 A1* | 3/2012 | Thomas ............... H04L 63/1433 |
| | | 726/24 |
| 2012/0084866 A1 | 4/2012 | Stolfo |
| 2012/0106377 A1 | 5/2012 | Sommers et al. |
| 2012/0124363 A1 | 5/2012 | Dietrich et al. |
| 2012/0137342 A1* | 5/2012 | Hartrell ............... H04L 63/1425 |
| | | 726/1 |
| 2012/0137367 A1 | 5/2012 | Dupont et al. |
| 2012/0144488 A1 | 6/2012 | Sankruthi |
| 2012/0151565 A1 | 6/2012 | Fiterman |
| 2012/0185563 A1 | 7/2012 | Sugiyama et al. |
| 2012/0240182 A1 | 9/2012 | Marayanaswamy et al. |
| 2012/0254995 A1 | 10/2012 | Sallam |
| 2012/0255003 A1 | 10/2012 | Sallam |
| 2012/0255004 A1 | 10/2012 | Sallam |
| 2012/0255012 A1 | 10/2012 | Sallam |
| 2012/0291090 A1 | 11/2012 | Srinivasan et al. |
| 2012/0297486 A1 | 11/2012 | Turbin |
| 2012/0297488 A1 | 11/2012 | Kapoor et al. |
| 2012/0324094 A1 | 12/2012 | Wyatt et al. |
| 2012/0331553 A1 | 12/2012 | Aziz et al. |
| 2013/0052992 A1 | 2/2013 | Lee et al. |
| 2013/0054682 A1 | 2/2013 | Malik et al. |
| 2013/0061097 A1 | 3/2013 | Mendel et al. |
| 2013/0080641 A1* | 3/2013 | Lui ..................... H04L 47/70 |
| | | 709/226 |
| 2013/0086684 A1 | 4/2013 | Mohler |
| 2013/0091573 A1* | 4/2013 | Herz ................... H04L 63/1425 |
| | | 726/23 |
| 2013/0097706 A1 | 4/2013 | Titonis et al. |
| 2013/0111547 A1 | 5/2013 | Kraemer |
| 2013/0133072 A1 | 5/2013 | Kraitsman et al. |
| 2013/0152200 A1 | 6/2013 | Alme et al. |
| 2013/0167236 A1 | 6/2013 | Sick |
| 2013/0191924 A1 | 7/2013 | Tedesco et al. |
| 2013/0198842 A1 | 8/2013 | Klein et al. |
| 2013/0212658 A1 | 8/2013 | Amaya et al. |
| 2013/0219217 A1 | 8/2013 | Seren et al. |
| 2013/0231084 A1* | 9/2013 | Raleigh ................ H04M 15/00 |
| | | 455/408 |
| 2013/0239192 A1 | 9/2013 | Linga et al. |
| 2013/0242743 A1 | 9/2013 | Thomas et al. |
| 2013/0247190 A1 | 9/2013 | Spurlock |
| 2013/0290662 A1 | 10/2013 | Teal |
| 2013/0290729 A1 | 10/2013 | Pettigrew et al. |
| 2013/0291111 A1 | 10/2013 | Zhou et al. |
| 2013/0298192 A1* | 11/2013 | Kumar ................ H04L 63/1425 |
| | | 726/25 |
| 2013/0298244 A1* | 11/2013 | Kumar .................. G06F 21/51 |
| | | 726/25 |
| 2013/0305377 A1* | 11/2013 | Herz ................... H04L 63/1433 |
| | | 726/25 |
| 2013/0329732 A1 | 12/2013 | Vyas et al. |
| 2013/0333040 A1* | 12/2013 | Diehl .................. H04L 41/0803 |
| | | 726/22 |
| 2013/0340033 A1 | 12/2013 | Jones et al. |
| 2013/0346472 A1 | 12/2013 | Wheeldon |
| 2013/0347052 A1 | 12/2013 | Choudrie |
| 2014/0020046 A1 | 1/2014 | Heitzman |
| 2014/0046645 A1 | 2/2014 | White et al. |
| 2014/0053267 A1 | 2/2014 | Klein et al. |
| 2014/0059525 A1 | 2/2014 | Jawa et al. |
| 2014/0068326 A1 | 3/2014 | Quinn |
| 2014/0068779 A1 | 3/2014 | Tan et al. |
| 2014/0090061 A1 | 3/2014 | Avasarala et al. |
| 2014/0096229 A1 | 4/2014 | Burns et al. |
| 2014/0108794 A1 | 4/2014 | Barton et al. |
| 2014/0114609 A1 | 4/2014 | Maurer et al. |
| 2014/0123280 A1* | 5/2014 | Kedma ................ G06F 11/3003 |
| | | 726/23 |
| 2014/0137246 A1* | 5/2014 | Baluda ................ H04W 12/08 |
| | | 726/22 |
| 2014/0150094 A1 | 5/2014 | Rao et al. |

(56) References Cited

U.S. PATENT DOCUMENTS

| | | |
|---|---|---|
| 2014/0157366 A1 | 6/2014 | Ko et al. |
| 2014/0165203 A1 | 6/2014 | Friedrichs et al. |
| 2014/0215617 A1 | 7/2014 | Smith et al. |
| 2014/0215621 A1 | 7/2014 | Xaypanya et al. |
| 2014/0215625 A1 | 7/2014 | Paul et al. |
| 2014/0237562 A1 | 8/2014 | Nandakumar |
| 2014/0237595 A1 | 8/2014 | Sridhara et al. |
| 2014/0237599 A1* | 8/2014 | Gertner ............... H04L 63/1425 726/24 |
| 2014/0245376 A1 | 8/2014 | Hibbert et al. |
| 2014/0250524 A1 | 9/2014 | Meyers et al. |
| 2014/0259092 A1 | 9/2014 | Boucher et al. |
| 2014/0270157 A1* | 9/2014 | Youd ..................... G06F 16/211 709/224 |
| 2014/0280864 A1* | 9/2014 | Yin ...................... H04L 41/122 709/224 |
| 2014/0282816 A1 | 9/2014 | Xie et al. |
| 2014/0283038 A1 | 9/2014 | Call et al. |
| 2014/0283076 A1 | 9/2014 | Muttik |
| 2014/0289851 A1* | 9/2014 | Klein .................... G06F 21/566 726/23 |
| 2014/0298419 A1 | 10/2014 | Boubez et al. |
| 2014/0349611 A1 | 11/2014 | Kant et al. |
| 2014/0373091 A1 | 12/2014 | Kirner et al. |
| 2015/0006384 A1 | 1/2015 | Shaikh |
| 2015/0007312 A1 | 1/2015 | Pidathala et al. |
| 2015/0013006 A1 | 1/2015 | Shulman et al. |
| 2015/0013008 A1 | 1/2015 | Lukacs et al. |
| 2015/0033341 A1 | 1/2015 | Schmidtler et al. |
| 2015/0039513 A1* | 2/2015 | Adjaoute ........... G06Q 30/0609 705/44 |
| 2015/0067763 A1 | 3/2015 | Dalcher et al. |
| 2015/0074810 A1 | 3/2015 | Saher et al. |
| 2015/0082430 A1 | 3/2015 | Sridhara et al. |
| 2015/0089655 A1 | 3/2015 | Choi et al. |
| 2015/0096048 A1 | 4/2015 | Zhang et al. |
| 2015/0113616 A1 | 4/2015 | Sampas |
| 2015/0121524 A1 | 4/2015 | Fawaz et al. |
| 2015/0121529 A1 | 4/2015 | Quinlan et al. |
| 2015/0128206 A1 | 5/2015 | Haim et al. |
| 2015/0128246 A1 | 5/2015 | Feghali et al. |
| 2015/0143496 A1 | 5/2015 | Thomas et al. |
| 2015/0150125 A1 | 5/2015 | Dulkin et al. |
| 2015/0150130 A1* | 5/2015 | Fiala .................... G06F 21/566 726/23 |
| 2015/0156214 A1 | 6/2015 | Kaminsky |
| 2015/0161024 A1 | 6/2015 | Gupta et al. |
| 2015/0163121 A1 | 6/2015 | Mahaffey et al. |
| 2015/0172300 A1 | 6/2015 | Cochenour |
| 2015/0195291 A1 | 7/2015 | Zuk et al. |
| 2015/0199512 A1 | 7/2015 | Kim et al. |
| 2015/0200928 A1 | 7/2015 | Burch et al. |
| 2015/0200955 A1 | 7/2015 | Martin |
| 2015/0205962 A1 | 7/2015 | Swidowski et al. |
| 2015/0220735 A1 | 8/2015 | Paithane et al. |
| 2015/0254161 A1 | 9/2015 | Baril et al. |
| 2015/0257194 A1 | 9/2015 | Cho |
| 2015/0264068 A1 | 9/2015 | Beauchesne |
| 2015/0264077 A1 | 9/2015 | Berger et al. |
| 2015/0268947 A1 | 9/2015 | Ionescu |
| 2015/0268989 A1 | 9/2015 | Busch et al. |
| 2015/0271200 A1 | 9/2015 | Brady et al. |
| 2015/0281267 A1* | 10/2015 | Danahy ............... H04L 63/1416 726/23 |
| 2015/0286820 A1 | 10/2015 | Sridhara et al. |
| 2015/0288706 A1 | 10/2015 | Marshall |
| 2015/0310196 A1 | 10/2015 | Turgeman et al. |
| 2015/0326587 A1 | 11/2015 | Vissamsetty et al. |
| 2015/0326588 A1 | 11/2015 | Vissamsetty et al. |
| 2015/0326592 A1 | 11/2015 | Vissamsetty et al. |
| 2015/0326599 A1 | 11/2015 | Vissamsetty et al. |
| 2015/0346066 A1 | 12/2015 | Dutta et al. |
| 2015/0350213 A1 | 12/2015 | Varadarajan et al. |
| 2015/0350236 A1 | 12/2015 | Klinghofer et al. |
| 2015/0358345 A1 | 12/2015 | Clark et al. |
| 2015/0370560 A1 | 12/2015 | Tan et al. |
| 2015/0373039 A1* | 12/2015 | Wang .................. H04L 63/1425 726/23 |
| 2015/0379371 A1 | 12/2015 | Yoon et al. |
| 2015/0381376 A1 | 12/2015 | Wardman et al. |
| 2016/0028750 A1 | 1/2016 | Di Pietro et al. |
| 2016/0042179 A1* | 2/2016 | Weingarten ............. G06F 21/56 726/23 |
| 2016/0042180 A1 | 2/2016 | Sayre et al. |
| 2016/0055334 A1* | 2/2016 | Herwono ........... H04L 63/1458 726/23 |
| 2016/0055337 A1 | 2/2016 | El-Moussa |
| 2016/0072838 A1 | 3/2016 | Kolton et al. |
| 2016/0078365 A1* | 3/2016 | Baumard ............ H04L 63/1425 706/12 |
| 2016/0080414 A1 | 3/2016 | Kolton et al. |
| 2016/0127352 A1 | 5/2016 | Xu et al. |
| 2016/0127413 A1 | 5/2016 | Kraitsman et al. |
| 2016/0142399 A1 | 5/2016 | Pace et al. |
| 2016/0191554 A1 | 6/2016 | Kaminsky |
| 2016/0212225 A1 | 7/2016 | Smith et al. |
| 2016/0261631 A1 | 9/2016 | Vissamsetty et al. |
| 2016/0285914 A1 | 9/2016 | Singh et al. |
| 2016/0315909 A1 | 10/2016 | Von Gravrock et al. |
| 2016/0323300 A1 | 11/2016 | Boss et al. |
| 2016/0323316 A1 | 11/2016 | Kolton et al. |
| 2016/0381023 A1 | 12/2016 | Dulce et al. |
| 2017/0009391 A1 | 1/2017 | Fu et al. |
| 2017/0019425 A1 | 1/2017 | Ettema et al. |
| 2017/0026387 A1 | 1/2017 | Vissamsetty et al. |
| 2017/0032122 A1 | 2/2017 | Thakar et al. |
| 2017/0054754 A1 | 2/2017 | Saher et al. |
| 2017/0093910 A1 | 3/2017 | Gukal et al. |
| 2017/0126718 A1* | 5/2017 | Baradaran ........... H04L 63/0281 |
| 2017/0134453 A1 | 5/2017 | Ahmadzadeh et al. |
| 2017/0141980 A1 | 5/2017 | Palanciuc et al. |
| 2017/0147796 A1 | 5/2017 | Sardesai et al. |
| 2017/0149787 A1 | 5/2017 | Niemela et al. |
| 2017/0149795 A1* | 5/2017 | Day, II ................ H04W 12/088 |
| 2017/0149832 A1 | 5/2017 | Touboul et al. |
| 2017/0171244 A1 | 6/2017 | Vissamsetty et al. |
| 2017/0180421 A1 | 6/2017 | Shieh et al. |
| 2017/0201545 A1 | 7/2017 | Nicodemus et al. |
| 2017/0206142 A1 | 7/2017 | Pawar et al. |
| 2017/0206357 A1 | 7/2017 | Gorelik et al. |
| 2017/0230384 A1 | 8/2017 | Touboul et al. |
| 2017/0230402 A1 | 8/2017 | Greenspan et al. |
| 2017/0235967 A1 | 8/2017 | Ray et al. |
| 2017/0244729 A1* | 8/2017 | Fahrny ................. G06F 21/552 |
| 2017/0244749 A1 | 8/2017 | Shulman et al. |
| 2017/0244755 A1 | 8/2017 | Tsao |
| 2017/0250855 A1 | 8/2017 | Patil et al. |
| 2017/0257375 A1 | 9/2017 | Dulkin et al. |
| 2017/0264639 A1 | 9/2017 | Sama et al. |
| 2017/0279839 A1 | 9/2017 | Vasseur et al. |
| 2017/0279846 A1 | 9/2017 | Osterweil et al. |
| 2017/0286676 A1* | 10/2017 | Weingarten ............. G06F 21/56 |
| 2017/0302458 A1 | 10/2017 | Berger et al. |
| 2017/0302653 A1 | 10/2017 | Ortner et al. |
| 2017/0302665 A1 | 10/2017 | Zou et al. |
| 2017/0302696 A1 | 10/2017 | Schutz et al. |
| 2017/0318054 A1 | 11/2017 | Vissamsetty et al. |
| 2017/0322959 A1 | 11/2017 | Tidwell et al. |
| 2017/0324774 A1 | 11/2017 | Ohayon et al. |
| 2017/0324777 A1 | 11/2017 | Ohayon et al. |
| 2017/0331849 A1 | 11/2017 | Yu et al. |
| 2017/0331856 A1 | 11/2017 | Vissamsetty et al. |
| 2017/0346802 A1 | 11/2017 | Gruskin et al. |
| 2017/0346853 A1 | 11/2017 | Wyatt et al. |
| 2017/0359370 A1 | 12/2017 | Humphries et al. |
| 2018/0013788 A1 | 1/2018 | Vissamsetty et al. |
| 2018/0020005 A1 | 1/2018 | Beiter et al. |
| 2018/0027006 A1 | 1/2018 | Zimmermann et al. |
| 2018/0027009 A1 | 1/2018 | Santos et al. |
| 2018/0027017 A1 | 1/2018 | Touboul et al. |
| 2018/0039776 A1 | 2/2018 | Loman et al. |
| 2018/0048665 A1 | 2/2018 | Shulman et al. |
| 2018/0063187 A1 | 3/2018 | Pierre |

(56) References Cited

U.S. PATENT DOCUMENTS

| | | |
|---|---|---|
| 2018/0089430 A1 | 3/2018 | Mayo |
| 2018/0089431 A1 | 3/2018 | Nalluri et al. |
| 2018/0124096 A1 | 5/2018 | Schwartz et al. |
| 2018/0143915 A1 | 5/2018 | Gonzalez et al. |
| 2018/0146008 A1 | 5/2018 | Vissamsetty et al. |
| 2018/0173876 A1 | 6/2018 | Vissamsetty et al. |
| 2018/0183815 A1 | 6/2018 | Enfinger |
| 2018/0191593 A1 | 7/2018 | De et al. |
| 2018/0225592 A1 | 8/2018 | Ponnuswamy |
| 2018/0248896 A1 | 8/2018 | Challita et al. |
| 2018/0359272 A1 | 12/2018 | Mizrachi et al. |
| 2018/0359278 A1 | 12/2018 | Rusakov et al. |
| 2019/0042745 A1 | 2/2019 | Chen et al. |
| 2019/0052659 A1 | 2/2019 | Weingarten et al. |
| 2019/0068642 A1 | 2/2019 | Araujo et al. |
| 2019/0073475 A1 | 3/2019 | Vissamsetty et al. |
| 2019/0114426 A1 | 4/2019 | Cohen et al. |
| 2019/0138639 A1 | 5/2019 | Pal et al. |
| 2019/0138725 A1 | 5/2019 | Gupta |
| 2019/0199736 A1 | 6/2019 | Howard et al. |
| 2019/0253453 A1 | 8/2019 | Vissamsetty et al. |
| 2019/0258807 A1 | 8/2019 | Dimaggio et al. |
| 2019/0294485 A1 | 9/2019 | Kukreja et al. |
| 2019/0294614 A1 | 9/2019 | Brodt et al. |
| 2019/0318100 A1 | 10/2019 | Bhatia et al. |
| 2019/0340353 A1 | 11/2019 | Mitelman |
| 2019/0349369 A1 | 11/2019 | Bengtson et al. |
| 2019/0354355 A1 | 11/2019 | Jacobson et al. |
| 2019/0379697 A1 | 12/2019 | Vissamsetty et al. |
| 2019/0392260 A1 | 12/2019 | Pang et al. |
| 2020/0050586 A1 | 2/2020 | Pal et al. |
| 2020/0051697 A1 | 2/2020 | Krishnamurti et al. |
| 2020/0076853 A1 | 3/2020 | Pandian et al. |
| 2020/0133865 A1 | 4/2020 | Mannava et al. |
| 2020/0143054 A1* | 5/2020 | Cohen ............... G06F 21/554 |
| 2020/0143061 A1 | 5/2020 | Kim et al. |
| 2020/0201620 A1 | 6/2020 | Beard |
| 2020/0218806 A1 | 7/2020 | Cho |
| 2020/0244677 A1 | 7/2020 | Abbaszadeh et al. |
| 2020/0252429 A1 | 8/2020 | Vissamsetty et al. |
| 2020/0274894 A1 | 8/2020 | Argoeti et al. |
| 2020/0374087 A1 | 11/2020 | Vissamsetty et al. |
| 2021/0029153 A1 | 1/2021 | Sugimoto et al. |
| 2021/0073374 A1 | 3/2021 | Mookken et al. |
| 2021/0073658 A1 | 3/2021 | Poole et al. |
| 2021/0117232 A1 | 4/2021 | Sriharsha et al. |
| 2021/0232291 A1 | 7/2021 | Abdulaal et al. |
| 2021/0263945 A1 | 8/2021 | Siebel et al. |
| 2021/0397710 A1 | 12/2021 | Cohen et al. |
| 2022/0050895 A1 | 2/2022 | Yu et al. |
| 2022/0070256 A1 | 3/2022 | Singh et al. |
| 2022/0086142 A1 | 3/2022 | Hecht |
| 2022/0101096 A1 | 3/2022 | Singer et al. |
| 2022/0164444 A1 | 5/2022 | Prudkovskij |
| 2022/0253526 A1 | 8/2022 | Sanders |
| 2022/0391496 A9 | 12/2022 | Cho |
| 2023/0007025 A1 | 1/2023 | Weingarten et al. |
| 2023/0007026 A1 | 1/2023 | Weingarten et al. |
| 2023/0007027 A1 | 1/2023 | Weingarten et al. |
| 2023/0007028 A1 | 1/2023 | Weingarten et al. |
| 2023/0007029 A1 | 1/2023 | Weingarten et al. |
| 2023/0007030 A1 | 1/2023 | Weingarten et al. |
| 2023/0007031 A1 | 1/2023 | Weingarten et al. |
| 2023/0247046 A1 | 8/2023 | Peters et al. |
| 2023/0319089 A1 | 10/2023 | Chesla et al. |

FOREIGN PATENT DOCUMENTS

| | | |
|---|---|---|
| CN | 113297584 A | 8/2021 |
| CN | 113434858 A | 9/2021 |
| EP | 3 171 568 | 5/2017 |
| EP | 3472746 A1 | 4/2019 |
| EP | 3968197 A1 | 3/2022 |
| ES | 2785350 T3 | 10/2020 |
| JP | 2006-106939 A | 4/2006 |
| JP | 2008-252625 A | 10/2008 |
| JP | 2013-168141 A | 8/2013 |
| JP | 2015-534690 A | 12/2015 |
| JP | 2016-512631 | 4/2016 |
| JP | 2017-504102 | 2/2017 |
| KR | 10-2015-0101811 | 9/2015 |
| KR | 10-1969572 | 4/2019 |
| KR | 10-2021-0079494 A | 6/2021 |
| WO | WO 02/27440 A2 | 4/2002 |
| WO | WO 2010/030169 A2 | 3/2010 |
| WO | WO 2012/027669 | 3/2012 |
| WO | WO 2013/014672 | 1/2013 |
| WO | 2013/121951 A1 | 8/2013 |
| WO | WO 2015/171780 A1 | 11/2015 |
| WO | WO 2015/171789 A1 | 11/2015 |
| WO | WO 2016/024268 | 2/2016 |
| WO | WO 2016/081561 A1 | 5/2016 |
| WO | 2017/068889 A1 | 4/2017 |
| WO | WO 2017/064710 | 4/2017 |
| WO | 2017/218872 A1 | 12/2017 |
| WO | WO 2019/032728 | 2/2019 |
| WO | WO 2019/092530 | 5/2019 |
| WO | 2020/108357 A1 | 6/2020 |
| WO | 2022/076234 A1 | 4/2022 |

OTHER PUBLICATIONS

Chen et al., "MitM attack by name collision: Cause analysis and vulnerability assessment in the new gTLD era." Security and Privacy (SP), 2016 IEEE Symposium on. IEEE (2016).

Dini, Gianluca; Martinelli, Fabio; Saracino, Andrea; Sgandurra, Daniele; "Probabilistic Contract Compliance for Mobile Applications", Eighth International Conference on Availability, Reliability and Security (ARES) IEEE, Sep. 2-6, 2013, pp. 599-606.

Gu et al., "Malicious Shellcode Detection with Virtual Memory Snapshots," 2010 Proceedings IEEE Infocom, San Diego, CA, 2010, pp. 1-9, accessed Mar. 6, 2019.

Installing a Tanium Client—distributed also using user/password (not encrypted) from a hosted Module server, downloaded from https://docs.tanium.com/client/client/deployment.html#client_management on Apr. 1, 2021.

IBM Software, "Stepping up the battle against advanced threats", IBM Trusteer Apex Thought Leadership White Paper, Dec. 2013, WGW03043-USEN-00.

"IBM Security Qradar SIEM Installation Guide" downloaded from http://www.siem.su/docs/IBM/Installation_and_updating/IBM_Security_QRadar_installation_Guide.pdf, printed 2013, vol. 7.2 in 54 pages.

"IBM Security Trusteer Apex Advanced malware Protection (SaaS) delivers an enterprise endpoint security solution to help protect organizations from advanced malware and targeted attacks" downloaded from https://www-01.IBM.com/common/ssi/rep_ca/0/877/ENUSZP14-0390/ENUSZP14-0390.PDF, printed Aug. 5, 2014, in 9 pgs.

IBM Guardium Documentation "Components and Topology", downloaded from https://www.ibm.com/docs/en/qsip/7.4?topic=deployment-qradar-architecture-overview, printed on Jun. 8, 2021 in 3 pages.

IBM Software "Stepping up the battle against advanced threats", downloaded from https://citrixready.citrix.com/content/dam/ready/partners/ib/ibm-global-services/ibm-security-trusteer-apex-advanced-malware-protection/wgw03043usen.pdf, Printed Dec. 2013 in 12 pages.

Laureano et al., M., "Intrusion detection in virtual machine environments. In Euromicro Conference, 2004. Proceedings." 30th (pp. 520-525). IEEE Sep. 30, 2004.

Liu, Yu-Feng; Zhang Li-Wei; Liang, Juan; Qu, Sheng; Ni, Zhi-Qiang;, "Detecting Trojan Horses Based on System Behavior Using Machine Learning Method", International Conference on Machine Learning and Cybernetics (ICMLC), IEEE, Jul. 11-14, 2010, pp. 855-860.

Moussaileb et al., "Ransomware's Early Mitigation Mechanisms," Proceedings ARES 2018 Proceedings of the 13th International Conference on Availability, Reliability and Security Article No. 2, pp. 1-10 (2018).

(56) References Cited

OTHER PUBLICATIONS

IBM, "Qradar Architecture overview", downloaded from https://www.ibm.com/docs/en/qsip/7.4?topic=deployment-qradar-architecture-overview printed May 28, 2021 in 6 pgs.
Ornaghi et al., "Man in the middle attacks." Blackhat Conference Europe (2003).
Ramachandran et al., "Detecting ARP spoofing: An active technique." International Conference on Information Systems Security, Springer, Berlin, Heidelberg (2005).
Rüdiger Schollmeier, A Definition of Peer-to-Peer Networking for the Classification of Peer-to-Peer Architectures and Applications, Proceedings of the First International Conference on Peer-to-Peer Computing, IEEE (2002).
Shosha et al., A.F., "Evasion-resistant malware signature based on profiling kernel data structureobjects." In 2012 7th International Conference on Risks and Security of Internet and Systems (CRISIS) (pp. 1-8). IEEE., Oct. 31, 2012.
Tanium™ Client Management 1.6 User Guide, downloaded from https://docs.tanium.com/client_management/client_management/index.html on Apr. 1, 2021.
Ullrich et al., "IPv6 Security: Attacks and Countermeasures in a Nutshell." 8th USENIX Workshop on Offensive Technologies (2015).
Xu, J-Y; Sung, A.H.; Chavez, P.; Mukkamala, S.; "Polymorphic Malicious Executable Scanner by API Sequence Analysis", Fourth International Conference on Hybrid Intelligent Systems, IEEE Dec. 5-8, 2004, pp. 378-383.
Communication Pursuant to Article 94(3) EPC dated Dec. 11, 2018 for European Application 15 760 520.5, in 7 pages.
Extended European Search Report dated May 9, 2019 for International Application No. PCT/IL2016/051110, in 7 pages.
European Search Report dated Apr. 29, 2021 in European Patent Application No. 18844671 in 38 pages.
European Application No. 18844671.0-1218, Notice of Grant mailed May 4, 2023, pp. 1-97.
Extended European Search Report dated Jan. 25, 2021 for European Patent Application No. 20181537.0, in 10 pages.
International Search Report in corresponding International Patent Application No. PCT/US2015/29490, dated Aug. 7, 2015, in 2 pages.
Written Opinion in corresponding International Patent Application No. PCT/US2015/29490, dated Aug. 7, 2015, in 6 pages.
International Preliminary Report on Patentability in corresponding International Patent Application No. PCT/US2015/29490, dated Nov. 8, 2016, in 7 pages.
International Search Report in corresponding International Patent Application No. PCT/US2015/29501, dated Aug. 7, 2015, in 2 pages.
Written Opinion in corresponding International Patent Application No. PCT/US2015/29501, dated Aug. 7, 2015, in 6 pages.
International Preliminary Report on Patentability in corresponding International Patent Application No. PCT/US2015/29501, dated Nov. 8, 2016, in 7 pages.
International Search Report in corresponding International Patent Application No. PCT/US2015/61271, dated Feb. 2, 2016, in 2 pages.
Written Opinion in corresponding International Patent Application No. PCT/US2015/61271, dated Feb. 2, 2016, in 6 pages.
International Preliminary Report on Patentability in corresponding International Patent Application No. PCT/US2015/61271, dated May 23, 2017, in 7 pages.
International Search Report and Written Opinion dated Feb. 18, 2016 for International Application No. PCT/IL2015/050802, in 10 pages.
International Preliminary Report on Patentability dated Feb. 14, 2017 for International Application No. PCT/IL2015/050802, in 7 pages.
International Search Report and Written Opinion dated Apr. 20, 2017 for International Application No. PCT/IL2016/051110, in 10 pages.
International Search Report and Written Opinion dated Dec. 11, 2018 for International Application No. PCT/US2018/045850, in 12 pages.
International Search Report and Written Opinion dated Aug. 24, 2020 for International Application No. PCT/US2020/033872, in 8 pages.
Office Action dated Jul. 24, 2019 in European Patent Application No. 15760520.5, in 8 pages.
IBM Security Guardium Insights for IBM Cloud Park for Security, printed from https://www.ibm.com/downloads/cas/QY1RYRLP, printed May 26, 2021 in 12 pages.
IBM Security Qradar Solutuion Brief "Visibility, detection, investigation and response" printed from https://www.ibm.com/downloads/cas/OP62GKAR, printed on May 26, 2021 in 11 pgs.
Reaqta Hive, A.I. Based Endpoint Threat Response, Whitepaper, 27 pages (Apr. 6, 2017).
Extended European Search Report dated Aug. 25, 2021 for European Patent Application No. 21162973.8, in 5 pages.
Office Action dated May 31, 2022 in Japanese Patent Application No. 2020-503272, in 7 pages.
Japanese Application No. 2020-503272, Office Action Mailed Feb. 8, 2023, pp. 1-3.
International Search Report issued in application No. PCT/US2021/050129 on Dec. 21, 2021.
U.S. Appl. No. 17/660,191 Notice of Allowance Mailed Jul. 24, 2023, pp. 1-6.
U.S. Appl. No. 17/660,190 Notice of Allowance Mailed Apr. 2023, pp. 1-9.
U.S. Appl. No. 17/660,179, Notice of Allowance mailed Sep. 5, 2023, pp. 1-5.
U.S. Appl. No. 17/660,179 Non-Final Office Action Mailed May 11, 2023, pp. 1-7.
U.S. Appl. No. 17/660,198 Notice of Allowance Mailed May 30, 2023, pp. 1-9.
AEfficient Virus Detection Using Dynamic Instruction Sequencesa—May 2009 (Year: 2009).
Abdelhameed, M.U, et al. Portable executable automatic protection using dynamic infection and code redirection; 2009 International Conference on Computer Engineering & Systems (pp. 501-507); (Year: 2009).
Abrath, Bert et al. Obfuscating Windows DLLs; 2015 IEEE/ACM 1st International Workshop on Software Protection (pp. 24-30); (Year: 2015).
Birrer, B, et al., "Using qualia and hierarchical models in malware detection", Journal of Information Assurance and Security, Dec. 29, 2009, pp. 247-255.
Chakraborty et al., "Hierarchical learning for automated malware classification", MILCOM 2017-2017 IEEE Military Communications Conference (MILCOM), Oct. 23-25, 2017, pp. 1-6.
Jack Ullrich, Detecting Manual Syscalls from User Mode, Winterni, Cybersecurity Research & Development, Feb. 10, 2021, 11 pages, https://winternl.com/detecting-manual-syscalls-from-user-mode/.
Mahler, "A New Methodology for Information Security Risk Assessment for Medical Devices and its Evaluation," 2020, The Department of Software and Information Systems Engineering, Ben-Gurion University of the Negev, Israel.
Matsuda, Wataru et al. "Real-Time Detection System Against Malicious Tools by Monitoring DLL on Client Computers;" 2019 IEEE Conference on Application, Information and Network Security (AINS) (pp. 36-41); (Year: 2019).
Nisslmueller, U., "LOLBin detection through unsupervised learning An approach based on explicit featurization of the command line and parent-child relationships", University of Twente, Student Theses, Sep. 27, 2022, 72 pages.
Pandian, "Security Challenges of IoT and Medical Devices in Healthcare," Internet of Things, 1st Edition, 2020, Chapter 6, pp. 87-106.
Shun-Wen Hsiao et al., "Sequence Feature Extraction for Malware Family Analysis via Graph Neural," Network, arXiv:2208.05476v1, Aug. 10, 2022, pp. 1-12.
Stine, "A cyber risk scoring system for medical devices," International Journal of Critical Infrastructure Protection, Dec. 2017, vol. 19, pp. 32-46.

(56) References Cited

OTHER PUBLICATIONS

Zaldivar, "Investigating the Security Threats on Networked Medical Devices," 2020, 10th Annual Computing and Communication Workshop and Conference, Jan. 2020.

* cited by examiner

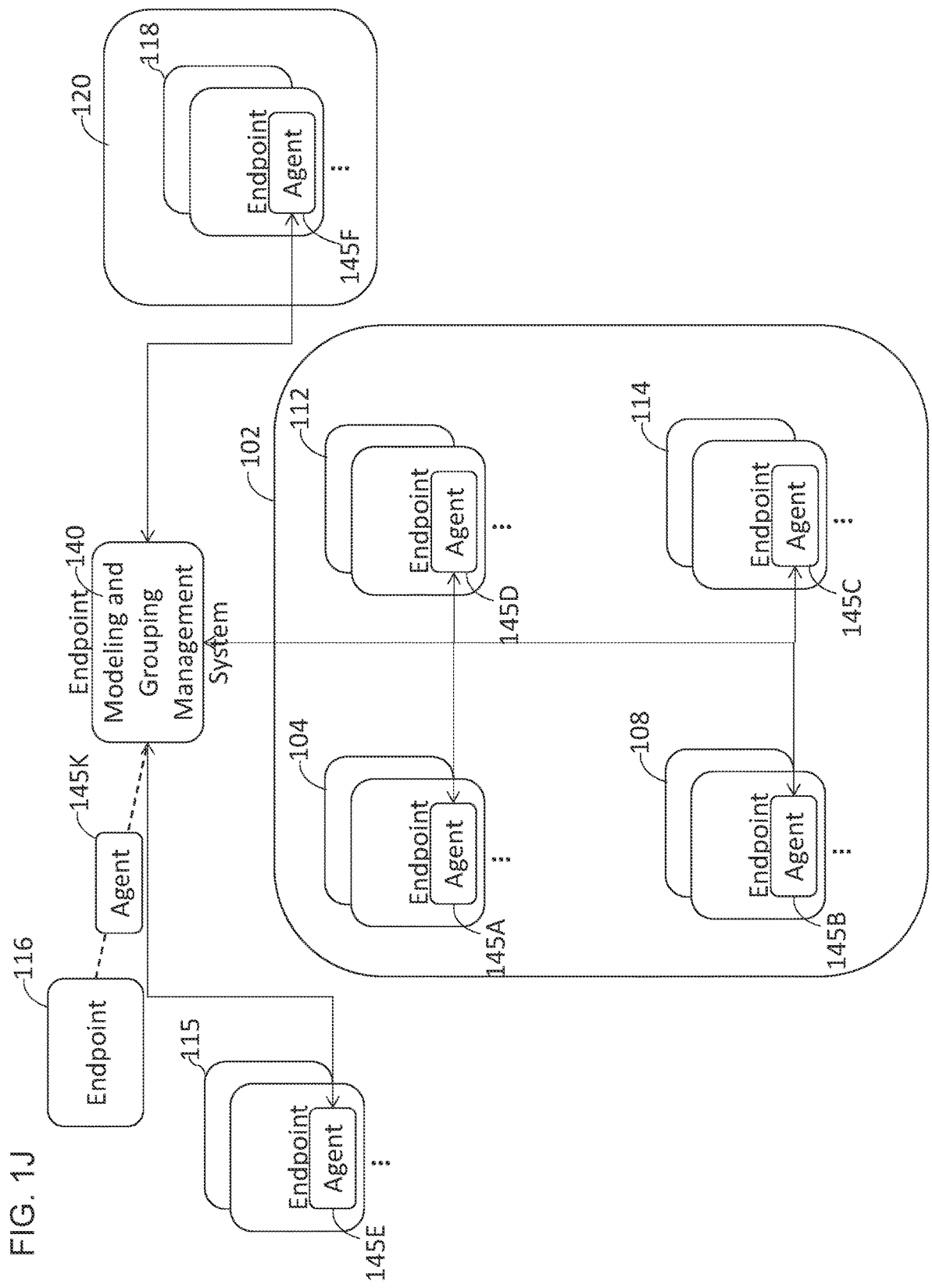

FIG. 14

Group Details
Location
Endpoints
Groups

Search

| Name | Endpoints | Protocols | Data Centers | Local Apps | Cloud Apps | Violations |
|---|---|---|---|---|---|---|
| Group Name | # | # | # | # | # | # |
| Group Name | # | # | # | # | # | # |
| Group Name | # | # | # | # | # | # |
| Group Name | # | # | # | # | # | # |
| Group Name | # | # | # | # | # | # |
| Group Name | # | # | # | # | # | # |
| Group Name | # | # | # | # | # | # |
| Group Name | # | | | | | |

METHODS, SYSTEMS, AND DEVICES FOR DYNAMICALLY MODELING AND GROUPING ENDPOINTS FOR EDGE NETWORKING

CROSS REFERENCE TO RELATED APPLICATIONS

The present application is a continuation of U.S. patent application Ser. No. 17/660,187, filed Apr. 21, 2022, which is a continuation of U.S. patent application Ser. No. 17/069,415, now U.S. Pat. No. 11,522,894, filed Oct. 13, 2020, which is a continuation of U.S. patent application Ser. No. 16/525,415, now U.S. Pat. No. 10,841,325, filed Jul. 29, 2019, which is a continuation of U.S. patent application Ser. No. 16/058,810, now U.S. Pat. No. 10,462,171, filed Aug. 8, 2018, which claims the benefit under 35 U.S.C. § 119(c) of U.S. Provisional Application No. 62/542,288, filed Aug. 8, 2017, U.S. Provisional Application No. 62/545,917, filed Aug. 15, 2017, and U.S. Provisional Application No. 62/550,439, filed Aug. 25, 2017, each of which is hereby incorporated herein by reference in its entirety under 37 C.F.R. § 1.57. Any and all applications for which a foreign or domestic priority claim is identified in the Application Data Sheet as filed with the present application are hereby incorporated by reference under 37 C.F.R. § 1.57.

BACKGROUND

Field

The embodiments disclosed herein generally relate to systems and methods for dynamically modeling and grouping endpoints for edge networking, in particular, modeling and grouping endpoints based on technical behavioral analysis enabled by deep visibility into the computer processes of and electronic communications in and to the endpoints.

Description

The detection of viruses, malware, ransomware, and the like on computer endpoints connected to an enterprise network is a large-scale problem for information technologists who are charged with maintaining and protecting the confidential information and software programs stored on these systems. The foregoing challenge is made more complicated by today's complex enterprise networks that are no longer just confined to hardware positioned behind or within a firewall and/or data access management system. With the development of cloud computing storage facilities and software as a service (SaaS) capabilities, and the proliferation of mobile devices, such as smart phones, laptops, tablets and other devices, all of which generally sit outside the enterprise firewall, the enterprise network is not just contained by hardware that is behind or within a firewall and/or data access management system.

Rather, the enterprise network, broadly speaking, is now an elastic network as opposed to a fixed boundary network. Thus, new systems and methods for security, management, control, access, and supervision of computer networks that are more suitable to modern networks are needed.

SUMMARY

For purposes of this summary, certain aspects, advantages, and novel features of the invention are described herein. It is to be understood that not all such advantages necessarily may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

In some embodiments, described herein is a dynamic endpoint-based edge networking system for protecting security and integrity of an elastic computer network, the system comprising: a plurality of agents, wherein each of the plurality of agents is installed on a target endpoint device, the target endpoint device being one of a plurality of endpoint devices forming an elastic computer network, and wherein each of the plurality of agents is configured to: access an operating system of the target endpoint device on which the agent is installed to obtain visibility of operating system processes and network communications of the target endpoint device; monitor the operating system processes and the network communications of the target endpoint device to obtain target endpoint data, the target endpoint data comprising information regarding at least one of the system processes or network processes of the target endpoint device; transmit the target endpoint data to a central server system; identify, using a local security protocol, one or more local anomalous indicators on the target endpoint device based at least in part on the target endpoint data; and respond to the one or more local anomalous indicators on an endpoint-level based at least in part on the local security protocol, wherein the local security protocol comprises one or more rule sets, policies, or access rights designed to ensure local security of each of the plurality of endpoint devices; and a central server system comprising: one or more computer readable storage devices configured to store a plurality of computer executable instructions; and one or more hardware computer processors in communication with the one or more computer readable storage devices and configured to execute the plurality of computer executable instructions in order to cause the central server system to: receive the target endpoint data from each of the plurality of agents installed on a target endpoint device; analyze the target endpoint data received from each of the plurality of agents to identify network-wide activity patterns; identify, using a network-wide security protocol, one or more network-wide anomalous indicators on a network level across the plurality of endpoint devices based at least in part on the identified network-wide activity patterns; and respond to the one or more network-wide anomalous indicators on the network level across the plurality of endpoint devices based at least in part on the network-wide security protocol.

In some embodiments, provided herein is the dynamic endpoint-based edge networking system, wherein monitoring the operating system processes and the network communications of the target endpoint device comprises continuously verifying and authenticating target endpoint activities.

In some embodiments, provided herein is the dynamic endpoint-based edge networking system, wherein the plurality of endpoint devices comprise one or more cellphones, servers, virtual machines, laptops, tablets, desktop computers, Internet of Things (IoT) devices, landline phones, wearable devices, or smart home devices.

In some embodiments, provided herein is the dynamic endpoint-based edge networking system, wherein the local anomalous indicator comprises activities of malicious software on the target endpoint device.

In some embodiments, provided herein is the dynamic endpoint-based edge networking system, wherein the malicious software comprises a virus, malware, ransomware, adware, spyware, Trojan horse, worm, rootkit, scareware, rogueware, active content software, or logic bomb.

In some embodiments, provided herein is the dynamic endpoint-based edge networking system, wherein the malicious software comprises zero-day software.

In some embodiments, provided herein is the dynamic endpoint-based edge networking system, wherein responding to the one or more local anomalous indicators based on the local security protocol comprises controlling one or more operating system processes or network communications of the target device.

In some embodiments, provided herein is the dynamic endpoint-based edge networking system, wherein responding to the one or more local anomalous indicators based on the local security protocol comprises limiting one or more operating system processes or network communications of the target device.

In some embodiments, provided herein is the dynamic endpoint-based edge networking system, wherein limiting one or more operating system processes or the network communications of the target device effectively isolates malicious software located on the target endpoint.

In some embodiments, provided herein is the dynamic endpoint-based edge networking system, wherein at least one endpoint device of the plurality of endpoint devices is located outside of a computer network firewall.

In some embodiments, provided herein is the dynamic endpoint-based edge networking system, wherein one or more of the central server system or plurality of agents is further configured to analyze the target endpoint data to determine typical network access behavior and typical processor behavior of the target endpoint.

In some embodiments, provided herein is the dynamic endpoint-based edge networking system, wherein the determined typical network access behavior and typical processor behavior of the target endpoint is used to update the local security protocol.

In some embodiments, provided herein is the dynamic endpoint-based edge networking system, wherein one or more artificial intelligence (AI) techniques are employed by one or more of the central server system or plurality of agents to analyze the target endpoint data to determine typical network access behavior and typical processor behavior of the target endpoint.

In some embodiments, provided herein is the dynamic endpoint-based edge networking system, wherein the central server system is further caused to group and one or more endpoints of the plurality of endpoints into an endpoint cluster, wherein the one or more endpoints of the endpoint cluster comprise one or more similar processing or network access patterns.

In some embodiments, provided herein is the dynamic endpoint-based edge networking system, wherein the central server system is further caused to generate and assign a common local security protocol to each of the one or more endpoints of the endpoint cluster.

In some embodiments, provided herein is the dynamic endpoint-based edge networking system, wherein each of the plurality of agents is further configured to perform a point-in-time validation of the target endpoint device, wherein the point-in-time validation comprises a verification that no local anomalous indicators are present on the target endpoint device.

In some embodiments, provided herein is the dynamic endpoint-based edge networking system, wherein the local anomalous indicator is a pattern of local anomalous activity on the target endpoint device.

In some embodiments, provided herein is the dynamic endpoint-based edge networking system, wherein one or more of the local security protocol or the network-wide security protocol is manually configured by a network administrator.

In some embodiments, provided herein is the dynamic endpoint-based edge networking system, wherein one or more of the local security protocol or the network-wide security protocol is based on a pre-configured rule set.

In some embodiments, provided herein is the dynamic endpoint-based edge networking system, wherein one or more of the local security protocol or the network-wide security protocol is automatically generated and assigned by one or more of the central server system or plurality of agents.

In some embodiments, provided herein is the dynamic endpoint-based edge networking system, wherein a unique local security protocol is generated for each of the plurality of endpoint devices.

In some embodiments, provided herein is the dynamic endpoint-based edge networking system, wherein the local security protocol is dynamically updated by one or more of the central server or plurality of agents based on one or more operating system processes or network communications of the target endpoint device.

In some embodiments, provided herein is the dynamic endpoint-based edge networking system, wherein the local security protocol comprises one or more policies for restricting or allowing access between the target endpoint device and another endpoint device of the plurality of endpoint devices, between the target endpoint device and an outside service or system, or between the target endpoint device and an internal service or system.

In some embodiments, provided herein is the dynamic endpoint-based edge networking system, wherein the plurality of agents are further configured to scan a visible network to identify devices in or in proximity to a network.

In some embodiments, provided herein is the dynamic endpoint-based edge networking system, wherein the scan comprises utilizing discovery protocols to identify the devices in or in proximity to the network and obtain data therefrom.

In some embodiments, provided herein is the dynamic endpoint-based edge networking system, wherein the data obtained from the devices in or in proximity to the network comprises one or more of an operating system type, device type, IP address, or MAC address.

In some embodiments, provided herein is the dynamic endpoint-based edge networking system, wherein responding to the one or more local anomalous indicators based on the local security protocol comprises one or more of altering data access rights of the target endpoint device, excluding access to the target endpoint device by a user, or locking the target endpoint device.

In some embodiments, provided herein is a computer-implemented method for protecting security and integrity of an elastic computer network, the method comprising: installing a software agent on each of a plurality of endpoint devices forming an elastic computer network; accessing, by each software agent, an operating system of an endpoint device on which the software agent is installed to obtain visibility of operating system processes and network communications of the endpoint device; monitoring, by each software agent, the operating system processes and the network communications of the endpoint device to obtain endpoint data, the endpoint data comprising information regarding at least one of the system processes or network processes of the endpoint device; transmitting, by each software agent, the endpoint data to a central server system; identifying, by the software agent using a local security protocol, one or more local anomalous indicators on the endpoint device based at least in part on the endpoint data; responding, by each software agent, to the one or more local anomalous indicators on an endpoint-level based at least in part on the local security protocol, wherein the local security protocol comprises one or more rule sets, policies, or access rights designed to ensure local security of each of the plurality of endpoint devices; receiving, by the central server system, the endpoint data from each software agent on each of the plurality of endpoint devices; analyzing, by the central server system, the endpoint data received from each software agent on each of the plurality of endpoint devices to identify network-wide activity patterns; identifying, by the central server system using a network-wide security protocol, one or more network-wide anomalous indicators on a network level across the plurality of endpoint devices based at least in part on the identified network-wide activity patterns; and responding, by the central server system, to the one or more network-wide anomalous indicators on the network level across the plurality of endpoint devices based at least in part on the network-wide security protocol, wherein the central server system comprises a computer processor and an electronic storage medium.

In some embodiments, provided herein is the computer-implemented method, wherein at least one endpoint device of the plurality of endpoint devices is located outside of a computer network firewall.

In some embodiments, provided herein is the computer-implemented method, wherein a common local security protocol is generated for a portion of the plurality of endpoint devices and a unique local security protocol is generated for another portion of the plurality of endpoint devices.

BRIEF DESCRIPTION OF THE DRAWINGS

A better understanding of the devices and methods described herein will be appreciated upon reference to the following description in conjunction with the accompanying drawings, wherein:

FIG. 1J is a block diagram illustrating deployment of an agent to an unmanaged endpoint according to some embodiments;

FIG. 14 is a graphical user interface of a listing of groups and associated characteristics according to some embodiments.

DETAILED DESCRIPTION

Figure 1A:
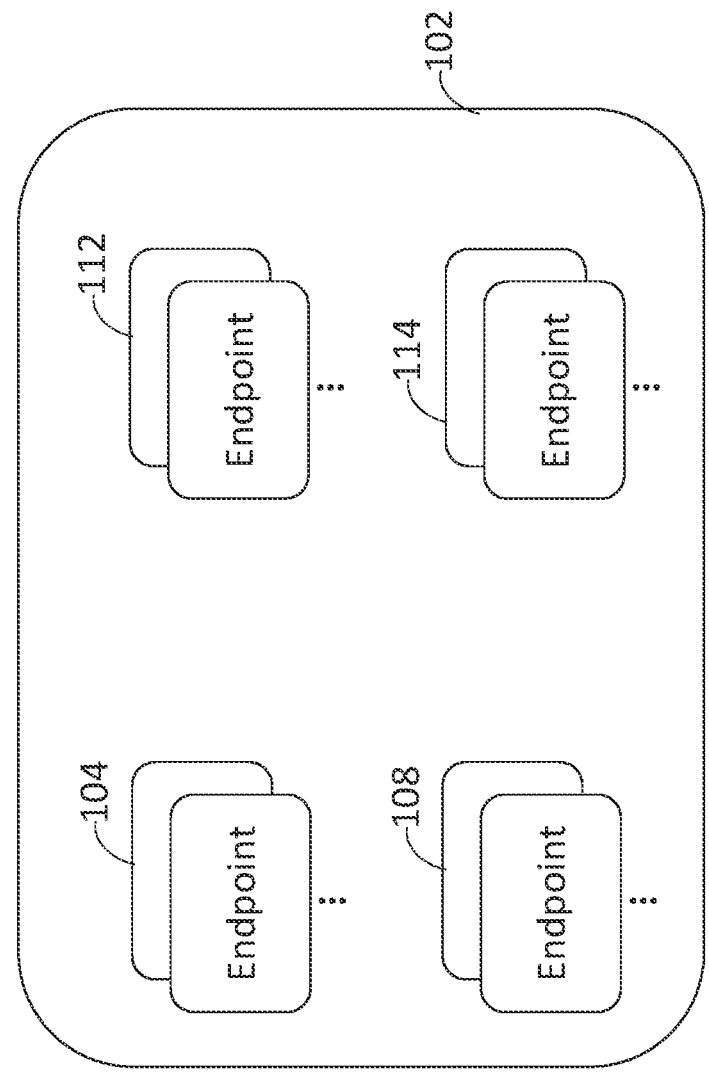
FIG. 1A is a block diagram illustrating a traditional enterprise network perimeter based on a firewall and/or data access management systems.

Although several embodiments, examples and illustrations are disclosed below, it will be understood by those of ordinary skill in the art that the invention described herein extends beyond the specifically disclosed embodiments, examples and illustrations and includes other uses of the invention and obvious modifications and equivalents thereof. Embodiments of the invention are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the invention. In addition, embodiments of the invention can comprise several novel features and no single feature is solely responsible for its desirable attributes or is essential to practicing the inventions herein described.

The detection of viruses, spyware, Trojan horses, ransomware, and like malicious software (collectively referred to here as "malware") on computer endpoints connected to an enterprise network is a large-scale problem for information technologists that are charged with maintaining and protecting information and software programs stored on these systems. The foregoing challenge is made more complicated by today's complex enterprise networks that are no longer just confined to hardware positioned behind or within a firewall and/or data access management systems. With the development of cloud computing storage facilities and software as a service (SaaS) capabilities, and the proliferation of mobile devices, such as smart phones, laptops, tablets and other devices, all of which generally sit outside the enterprise firewall, the enterprise network comprises multiple hardware devices which communicate with the network from outside within a firewall and/or data access management systems.

Rather, the enterprise network, broadly speaking, is now an elastic network as opposed to a fixed boundary network. With an elastic network, the challenge of protecting enterprise data and/or enterprise software systems from malware is made more complicated because IT administrators need not only be concerned with protecting computing devices within the firewall and/or data access management systems but also computing devices interacting with the corporate network from outside the firewall perimeter and/or data access management systems. For example, a mobile device that is located outside the enterprise firewall and/or data access management systems, and that is infected with a virus or like malicious software can compromise enterprise data and/or the systems within the enterprise firewall and/or data access management systems, especially if the mobile device possesses authorization to traverse the firewall and access systems and data within the firewall or other cloud computing systems connected to endpoints within the firewall.

Certain anti-virus systems merely focus on detecting known viruses, malware, ransomware, and the like, and such systems provide little protection from zero-day (meaning, previously unknown) malware. Many of today's varieties of malware are configured to continuously morph themselves so as to, for example, create a new digital signature associated with their software file, to allow them to avoid detection by traditional anti-virus systems that rely on "black listed" digital signatures for detection of such malware. Accordingly, there is a need for a system that is configured to protect enterprise data and/or software system from both known and unknown malware, especially in computing environments where the enterprise network exists not just within a firewall and/or data access management systems but also outside the firewall and/or data access management systems in elastic edge networks or grids.

To address the foregoing challenges, this disclosure illustrates systems, methods, and devices for automatically and dynamically controlling processes and/or network access of endpoint devices, whether such devices are positioned inside or outside the enterprise firewall and/or data access management systems. It can be advantageous to control processes and/or network access of endpoints because if an endpoint is infected, the systems disclosed herein can be configured to prevent the endpoint, and therefore also prevent the malware that is operating on the endpoint, from accessing certain network connections and/or running certain processes, all of which can control the malware and/or limit the reach of the malware and/or prevent the malware from spreading to other systems and/or manipulating enterprise data.

In other words, the systems disclosed herein can be configured to create a safe protected environment for all endpoint devices on an elastic network whether or not such endpoints reside inside and outside the enterprise firewall and/or data access management systems. In certain embodiments, the system can be configured to create a safe protected environment for endpoints in an elastic network based on analyzing behavioral characteristics of all or some of the endpoints in the elastic network to determine what data access and/or network access privileges an endpoint should be granted. In many instances, malware causes endpoints to perform processes and/or to access certain network paths that the endpoint does not typically perform or access. Accordingly, by preventing atypical performance processes and/or atypical network accesses, the system can prevent a virus, malware, ransomware, and the like from causing damage to the endpoint device and/or to the enterprise systems and data.

In some embodiments, the systems, devices, and methods disclosed herein can be designed around the concept of creating an initial "zero-trust" security architecture that can continuously collect endpoint data at various level of granularity within the system to persistently verify and establish the credibility of individual endpoints and the network as a whole. Existing security models are based on point-in-time authentication, and thus are unable to ensure the integrity of an endpoint device or a network in between authentications. While the systems, devices, and methods described herein can provide point-in-time authentication, in some embodiments, a key aspect of the design is the continual nature of the verification of the integrity of a network and its various endpoint devices, as well as the verification of the users' identity. In some embodiments, this verification is established through artificial-intelligence (AI) driven analysis of individual endpoint, group, and network-wide usage patterns. In some embodiments, this analysis is centered on continuous monitoring and collection of data from endpoint devices, and the determination of a baseline usage of a user, endpoint device, group, subnetwork, network segment, or the network as a whole. Once established, baseline usage can be continuously updated and compared to current usage in order to authenticate users and endpoint devices on a persistent basis. In other words, the system described herein can establish an expectation of usage for various levels of granularity, from the network level all the way down to an individual user and/or endpoint device, and then compare that expectation to a current real usage to constantly perform validation. In some embodiments, the system is capable of separately validating the integrity of both an endpoint device and a user utilizing the endpoint device.

In certain embodiments, the systems disclosed herein can be configured to install agents on endpoints. In certain embodiments, the agents can be configured to analyze processes and/or network traffic occurring on an endpoint. In certain embodiments, the agents can be configured to transmit such analysis data to a central computing server system. In certain embodiments, the central computing server system can be configured to analyze the data to determine typical network access behavior and/or typical processor behavior for the endpoint. In certain embodiments, the agent is configured to analyze the data to determine typical network access behavior and/or typical processor behavior for the endpoint, and in certain embodiments, both the agent and the central server are configured to perform such behavioral analysis of the endpoint. In certain embodiments, artificial intelligence (AI) techniques are employed by the agent and/or the central server to perform such behavioral analysis. Based on such behavioral analysis, the agent and/or the central server can be configured to determine and/or model what are the typical processes and/or network access patterns for the endpoint.

In certain embodiments, the system comprises a plurality of agents operating on a plurality of endpoints within an elastic network. In certain embodiments, the plurality of agents operating on a plurality of endpoints is communicating with the central server and/or is performing the same behavioral analysis disclosed above. In certain embodiments, the systems disclosed herein are configured to group and/or model a subset of the plurality of endpoints as having the same and/or similar processing and/or network access patterns. In certain embodiments, the systems disclosed herein can be configured to automatically and/or dynamically assign to the various determined groupings of the plurality of endpoints one or more rules or sets of rules for controlling certain processes and/or network accesses on the various determined groupings of the plurality of endpoints. In some embodiments, the system, through embedded agents and/or security agents at endpoint devices, which can include, without limitation, other systems, servers, computers, virtual machines, or the like, has the ability to monitor the endpoint devices and apply policies at the individual endpoint level. In some embodiments, the embedded agents act as a continuous verification and authentication monitor, rather than as a binary, point-in-time user authentication tool.

In some embodiments, the system comprises a plurality of agents installed on endpoint devices, wherein the agents are designed to ensure security on the endpoint devices. In some embodiments, ensuring security may involve accessing the device at a base level, such that, for example, an agent can monitor substantially all activity occurring on the device. In some embodiments, uninterrupted access to endpoint activity may allow the agent to validate, over time, that the endpoint device and/or the user utilizing the endpoint device are operating within the expectations of the system and/or within the expected typical use or activity or processes for that endpoint and/or user. In some embodiments, an agent may validate, at each point in time, that no anomalous activity is occurring on an endpoint device. In some embodiments, the system can continuously monitor substantially all aspects of an endpoint device operating system, such that it can recognize anomalies occurring at any point in time, and also patterns of anomalous behavior, to determine whether an endpoint has become compromised or unsecure. Furthermore, in some embodiments, through monitoring, the system can determine whether implemented security rules are violated, implement various controls or limitations over the endpoint functions, or do any other action defined by the system or a network administrator. In some embodiments, these actions and controls are implemented at the individual endpoint level. In some embodiments, these actions or controls are implemented on a defined or undefined group of endpoints or at the entire network level. In some embodiments, a centralized system can collect data from all the agents installed on a network to identify network-wide patterns of usage, such that vulnerabilities and issues that may be difficult or impossible to identify with the data from a single endpoint can be identified by the central system. For example, a specific use or pattern of usage on one or more endpoints may not be identified as anomalous alone by the agents installed therein, but may, when combined with data from some other endpoints or substantially all endpoints of the network, nonetheless be identified as anomalous by the system. In some embodiments, the agent-based system described herein can provide a layered security solution that provides individual endpoint security as well as network-wide security.

In some embodiments, the system described herein provides low-level, cross-platform monitoring of endpoint activities. In some embodiments, the system is configured to create, define, and/or dynamically alter a set of rules that determine which endpoint activities are identified as anomalous. In some embodiments, the set of rules can be defined by machine learning aspects, pre-determined rule sets, and/or administrator management.

It can be advantageous for the system to perform such behavioral analysis because the system can reduce the work for IT administrators and/or the system can determine such behavioral patterns better than human operators. It can be advantageous for the system to automatically and/or dynamically assign one or more rules or sets of rules to one or more endpoints because the system can reduce the work for IT administrators and/or the system can better develop and/or assign such rules to endpoints, especially in situations where the enterprise network comprises, hundreds, thousands and/or millions of endpoint devices connected to the enterprise network.

In some embodiments, another central function of the system may be the creation, generation, and implementation of access policies, which can be based around determining a baseline usage or expectation of usage. In some embodiments, the generated access policies provide an outline for the endpoints, services, servers, programs, and the like, that any given user on any given endpoint can access at any given time. In some embodiments, the access policies are synthesized through the data collected from the continuous monitoring of endpoints through agents and the determination of baseline usage of users and/or endpoint devices. In some embodiments, the aggregate of the access policies applied to each individual and/or endpoint device comprise a network access policy as a whole. In some embodiments, the access policies can be inferred or generated directly from the baseline usage of users and/or endpoint devices, and then updated manually or automatically through AI analysis. In some embodiments, because the network can be managed by individual agents installed on endpoint devices and a central server, the access policies can be implemented on any and all levels of the network.

In certain embodiments, the agents are configured to assign to the various determined groupings of the plurality of endpoints one or more rules or sets of rules for controlling certain processes and/or network accesses on the various determined groupings of the plurality of endpoints. In certain embodiments, the central server is configured to assign to the various determined groupings of the plurality of endpoints one or more rules or sets of rules for controlling certain processes and/or network accesses on the various determined groupings of the plurality of endpoints. In certain embodiments, the system is configured to use both the agents and the central server to assign to the various determined groupings of the plurality of endpoints one or more rules or sets of rules for controlling certain processes and/or network accesses on the various determined groupings of the plurality of endpoints.

In certain embodiments, the agent operating on a particular endpoint can be configured to apply the one or more rules or sets of rules to determine whether to allow or reject a network access path request coming from a program or instruction running on an endpoint. In certain embodiments, the central server can be configured to apply the one or more rules or sets of rules to determine whether to allow or reject a network access path request coming from a program or instruction running on an endpoint. In certain embodiments, it can be advantageous for the agents to determine whether to allow or reject a network access path request coming from a program or instruction operating on a particular endpoint because the system acts in a distributed manner as opposed to the central server making all determinations and potentially causing a bottleneck. Additionally, a distributed system reduces network traffic over the network and the number of requests to the central server. In some embodiments, the systems described herein comprise a machine learning component for managing and restricting access to a network. In other embodiments, AI management and restriction of access to the network is supplemented or replaced by human administrator management. In some embodiments, human administrators may manually implement general or specific rules or manage access on a system wide or endpoint-by-endpoint basis. In some embodiments, the rules, policies, and access rights of the system, regardless of how they are fashioned, can be designed to ensure security of the endpoints and the network by, for example, ensuring that no malware or other malicious software is introduced, that the integrity of the certificates are not compromised, and that there are no anomalies in usage, among others.

In some embodiments, an edge network according to various embodiments herein may comprise, and be defined by, a collection of connected endpoints. In some embodiments, the policies or rules for managing or restricting access to the network may be devised and effected manually by, for example, a network administrator. In some embodiments, the edge networking system can perform other functions, such as profiling inbound and outbound connections, installing agents unto network endpoints, and/or managing and regulating access to various systems within and outside the network. In some embodiments, the systems, devices, methods herein can identify and group one or more endpoints and manage policies for restricting and/or allowing access between endpoints, between an endpoint and outside services and systems, and between endpoint and internal services or systems.

In some embodiments, the agent-based system described herein may enable network management through enhanced data availability. Network management may include altering endpoint data access rights, user exclusion, and/or endpoint locking, among others. In some embodiments, the system may restrict any or certain inbound connections from one or more sources outside the network. In some embodiments, the monitoring, rule setting, and/or network management aspects of the system can be controlled at the individual endpoint devices, as opposed to at the network level, through installed agents.

In some embodiments, an agent as described herein can be installed on an endpoint device to access and manage incoming and outgoing traffic on the device. In some embodiments, the agent, through its access to the device systems and traffic, can continuously validate the identity and permissions of a user of the device. In some embodiments, a network is defined by endpoint devices with installed agents and the system gains visibility and access to all devices of the network through the installed agents. In some embodiments, when an agent is installed on an endpoint, substantially all communications to and from an endpoint device can be monitored and stored by the agent, such that any network management rules (e.g. access rights) can be applied regardless of the physical location of the endpoint. In some embodiments, the agent-based system described herein can monitor and store all internal communications and/or external communications. For example, the system may be configured to monitor and store activity occurring between two endpoints within the network. In some embodiments, the system has visibility to these communications through kernel-level monitoring of endpoints with installed agents. In some embodiments, the system utilizes the data access and network management policies, enforced at the individual endpoints, to define a broad-level network across of a plurality of endpoints.

Another difficulty faced by existing network security, management, and control systems is the transient nature of the network, particularly with regard to new endpoint devices accessing the network and existing endpoint devices ceasing to exist on the network. In some embodiments, the systems, devices, and methods disclosed herein solve the difficulty of a constantly expanding and/or retracting network by constructing a continuously updated mapping, visualization, and/or representation of the network construct, including various network segments and/or subnetworks. In some embodiments, the system is configured to map a plurality of endpoint devices in a software-based, distributed manner. That is, the map or visualization can be assembled based on data received from distributed software throughout the network. In some embodiments, this distributed software comprises agents installed on each endpoint device of a network. In some embodiments, the system can provide a visualization or view of the network and/or various subnetworks by aggregating data collected from the agents installed on a plurality of endpoint devices. In some embodiments, the network can comprise various subnetworks, each subnetwork comprising one or more endpoint devices. In some embodiments, the system can be configured to assemble a view of the network and/or various subnetworks based on information received from agents. In some embodiments, the map, view, or visualization of the network, constructed using data from agents installed on endpoints, can provide an overall and/or piece-by-piece view of the network and/or various subnetworks.

A related issue to the elastic nature of modern networks discussed above is the existence of non-traditional network-connected devices. The system described herein deals with this issue by gaining visibility of these devices through the distributed agent-based endpoint network and then integrating the control and network management functionalities to directly or indirectly supervise these non-traditional devices. In some embodiments, a network, network segments, and/or subnetworks can comprise various endpoint devices, some of which may have an agent installed and some of which may have no agent installed. However, in some embodiments, by virtue of having an agent installed on one or more endpoint devices of the network, the system may have visibility, through scanning or discovery functionality, over all endpoint devices on the network and/or subnetworks. By having visibility over endpoint devices without agents installed, the system can collect data from those devices, including, but not limited to, the existence of the unmanaged devices (i.e. devices with no agent installed therein), the network communications that the unmanaged devices have sent or received to and from other endpoint devices, and the existence or nonexistence of inbound or outbound connections to the unmanaged devices. Based on this collected data, the endpoint-based network system can dynamically determine necessary actions to take regarding the preservation or termination of communications and connections between the unmanaged devices and the network as a whole, subnetworks, network segments, logical groups, physical groups, or even individual endpoints. In some embodiments, the system can be configured to include the unmanaged devices in grouping themselves, and thus apply any group-specific rules directly to the unmanaged device and its communications with other endpoint devices in the network. In some embodiments, the dynamic determination and groupings can be made by, for example, an orchestration layer as described below.

In some embodiments, the system can be configured to counter compromised vulnerable Internet of Things (IoT) devices. Some malicious software uses IoT devices for use as proxies or intermediaries for Internet requests to route malicious traffic for cyber-attacks and computer network exploitation. IoT devices, sometimes referred to as "smart" devices, are devices that communicate with the Internet to send or receive data. Examples of targeted IoT devices include: routers, wireless radios links, time clocks, audio/video streaming devices, Raspberry Pis, IP cameras, DVRs, satellite antenna equipment, smart garage door openers, and network attached storage devices. IoT proxy servers may be attractive to malicious cyber actors because they provide a layer of anonymity by transmitting all Internet requests through the victim device's IP address. In some embodiments, IoT devices may be particularly attractive targets because they allow access to many business websites that block traffic from suspicious or foreign IP addresses. In some embodiments, malicious software can use the compromised device's IP address to engage in intrusion activities, making it difficult to filter regular traffic from malicious traffic. In some embodiments, malicious software can use compromised IoT devices as proxies to, for example, send spam e-mails, maintain anonymity or avoid detection, obfuscate network traffic, mask Internet browsing, generate click-fraud activities, buy, sell, and trade illegal images and goods, conduct credential stuffing attacks, and sell or lease IoT botnets to other cyber actors for financial gain. In some embodiments, IoT devices may have weak authentication, unpatched firmware or other software vulnerabilities, or have easily defeated default usernames and passwords. In some embodiments, the agent-based endpoint network disclosed herein can combat attacks that occur through IoT devices by detecting, monitoring, and controlling communications from these devices into the endpoint devices.

In some embodiments, the agent-based system may provide visibility into substantially all computerized devices, including those without installed agents and/or in proximity with an endpoint device with an installed agent. In some embodiments, the system can identify and gain visibility of all devices in the same subnet, visible, or accessible network in proximity to an endpoint device. These devices may include any internet or network-connected devices, such as physical devices, vehicles, home appliances, and any other items embedded with electronics, software, sensors, actuators, and connectivity which enable these things to connect and exchange data In some embodiments, an installed agent may be configured to scan a visible network, which may include any sub-network, or the entire network. In some embodiments, the system can utilize discovery protocols to ascertain the existence and obtain data from all devices in or in proximity to a network. In some embodiments, the system can obtain data from these devices, including the operating system, the type of device, IP address, and MAC address, among others. In some embodiments, the system may protect the endpoint-based network from attacks that are directed through these "unmanaged" (i.e. no agent installed) devices by restricting network communications between unmanaged devices and network endpoints.

In some embodiments, the system may also comprise an orchestration functionality or layer, which may serve to coordinate the collection and aggregation of data from the plurality of agents. In some embodiments, this orchestration layer may increase system efficiency by directing discovery protocols, network scanning, data collection and aggregation, network visualization construction, and various other system functionalities to reduce excessive or nonessential functions. In some embodiments, the orchestration functionality can amass the data from all of the endpoints and agents of the network, network segments, and/or subnetworks to create one or more cohesive views, visualizations, asset inventories, lists, or the like, in order to provide a mapping, grouping or representation of the network, network segments, and/or subnetworks. In some embodiments, the data is collected from agents installed in physical endpoints on the network, data centers, cloud services, non-traditional devices (e.g. IoT devices, printers, etc.) or any other part of the network.

In some embodiments, the system can be configured to utilize the continuously updated mapping, visualization, and/or representation to update the network groupings, access rules, network administration, and all other facets of the security and network management functionalities. In this way, the system can dynamically react to the expansion or retraction of the network through the addition and/or departure of endpoint devices to and from the network. The system may also include non-traditional endpoint devices including IoT devices into groupings such that group access rights and rules can be applied to those devices. In the alternative, in some embodiments, non-traditional endpoint devices on the network may not be grouped, and the system may determine, based on data aggregated from the agents installed on the endpoint devices, that one or more non-traditional endpoint devices should be able to communicate with all, some, or none of the other endpoint devices of the network. In some embodiments, this determination can be based on a holistic behavioral analysis of the network, the various network segments, subnetworks, and/or individual endpoints. The level of granularity and specificity to which the system can control groupings and therefore access rights and network communications management of the endpoint devices of the network, including non-traditional endpoint devices, is not limited. Specifically, network groupings and rules can be applied to the network as a whole, to particular subnetworks or network segments, to groups of endpoints, to individual endpoints, to non-traditional endpoints, to third-party services, enterprise services, and the like, and to any and all communications between any of the above (e.g. between an individual endpoint and its own group or a separate group of endpoints). There are very few limitations on the extent and specificity of control that the system can have on grouping and controlling the endpoints of the network and the network as a whole, or in parts. In some embodiments, some devices on the network can be controlled and managed, even without installing an agent therein, by limiting the ability of those devices to communicate with other devices on the network.

In some embodiments, the system described herein is not limited by physical proximity to a network. Because agents can be installed directly on endpoints, the physical location of the endpoints does not determine whether the endpoint benefits from the security features of the flexible network system described herein.

In some embodiments, the system can be configured to access a holistic amalgamation of network connection and system activity data, including, for example, what software is being utilized at an endpoint, what data is sent and received over a network connection, the time and form of user authentication, and/or the time and form of endpoint validation, among others. Thus, in some embodiments, the security features of the system can function in connection with a complete view of endpoint activity and network communications. In some embodiments, the system can be configured to continuously monitor endpoint activity and network communications, rather than solely at the time a network connection is formed. In some embodiments, the agent-based system may be configured to ensure the integrity of a network connection, in addition to the data sent and received over that connection.

In some embodiments, the system can authenticate the sender and receiver of data over a network connection such that integrity of the network connection is ensured. In some embodiments, the system can restrict data transfer over a network connection if it identifies an illegitimate sender or receiver. In some embodiments, the system can perform this authentication and other integrity checks, through an installed agent, by parsing requests and responses sent and received by an endpoint, monitoring bandwidth usage, and/or scrutinizing contextual data (e.g. time of access), among others. In some embodiments, the agent-based system may terminate illegitimate connections.

In some embodiments, the system described herein may facilitate faster and more efficient network communications than, for example, a virtual private network (VPN). In some embodiments, the system may introduce no latency into network connections. In some embodiments, the system may perform without latency regardless of the underlying network infrastructure, because the system may not perform routing of network connections and agents are installed directly at endpoints. In some embodiments, the system is not bound by any network infrastructure limitations or overhead caused by routing network traffic.

Certain enterprise networks can use centralized servers to identify anomalies, such as malware, and/or to determine access restrictions. Identification and response to these anomalies can be delayed based on the latency to and from the centralized servers. Furthermore, these enterprise networks can be required to perform anomaly detection for hundreds of thousands of endpoints connected within its perimeters and/or connected cloud services and data centers. In some embodiments, the endpoint modeling and grouping management system disclosed herein addresses these shortcomings by enabling agents installed on the endpoints to detect anomalies, respond to security threats, enforce network policies, regulate network access, and the like. In some embodiments, the agents can regulate network access by employing AI techniques to generate access policies for an endpoint, allowing or restricting connection to, from, and/or of an endpoint and/or an asset, setting authentication criteria for a connection, establishing roles for endpoints, change and/or update policies at endpoints, and the like. In some embodiments, the agents can enforce network policies, such as shutting down and/or enabling network access, setting and/or limiting network bandwidth, generating an alert based on network bandwidth usage, locking an endpoint based on bandwidth usage, setting bandwidth policies for specified connections to particular endpoints and/or assets, controlling traffic during certain time periods such as outside of normal business working hours, deploying internet security for a particular connection and/or endpoint, and the like.

In some embodiments, the agents can identify anomalies and perform actions autonomously by applying the models generated by the endpoint modeling and grouping management system.

To enable the foregoing, in certain embodiments, the endpoint modeling and grouping management system can be configured to collect data from endpoint computer devices in a network.

Enterprise networks can collect network traffic data. However, often times the network traffic data is encrypted and may not provide any visibility for activities occurring within an endpoint, within an enterprise network perimeter, within a cloud service, within a cloud data center, and the like. Furthermore, endpoints on traditional enterprise networks can connect directly with a cloud service while outside of the enterprise network perimeter, and thus, traditional enterprise networks may not have visibility on this type of traffic. In some embodiments, the endpoint modeling and grouping management system addresses these shortcomings of enterprise network technology by enabling an agent to monitor activity at the kernel level. In some embodiments, the agents can monitor data packets before encryption and/or after decryption. In some embodiments, the agents can monitor activity occurring within the endpoint. In some embodiments, the agents can monitor activity when the endpoints are outside of a traditional enterprise network perimeter. In some embodiments, the agents can monitor data packets enclosed in a layer of protection, such as a sandbox. Thus, the endpoint modeling and grouping management system can provide deep visibility on the activities of endpoints connected to the endpoint modeling and grouping management system.

In some embodiments, agents installed on the endpoints can collect real-time information on the kernel level providing the system with deep visibility to a wide range of data types, such as internal endpoint activity, encrypted data, and the like. In some embodiments, the endpoint modeling and grouping management system can identify similarities in behavior by employing an artificial intelligence component on the data collected by the agents. In some embodiments, the endpoint modeling and grouping management system can dynamically model groups such as logical groups, and cluster endpoints based on the behavioral similarities and/or differences identified among the activities of the endpoints. In some embodiments, the endpoint modeling and grouping management system transmits the behavioral models to the agents to allow the agents to identify anomalies and/or security threats.

In some embodiments, the endpoint grouping and modeling systems herein can utilize various data to determine and model endpoint groupings. In some embodiments, the system can be configured to use an all-inclusive approach, wherein the system examines the data from the various endpoints as a whole. For instance, the system may survey, for example, every IP address contacted, every service utilized, and every network communication, inbound or outbound, to and from each endpoint in order to classify and group endpoints with similar characteristics. In some embodiments, the result of this classification and grouping mechanism may be to assemble a group of endpoints having similar baseline access and network communication patterns. In some embodiments, the endpoint grouping may or may not coincide with user's having similar access needs based on, for example, their job responsibilities, their location, or any other user classification. For example, software developers within an enterprise network may utilize use-case specific services like GitHub, Visual Studio, Python that may indicate to the system that this endpoint or user should be grouped with other endpoints or users with similar usage patterns (e.g. other software developers), and that the group should have limited access or communication to services or endpoints that do not match the established pattern of usage of the group or do not pair with a system-determined purpose or intent of the group's users or endpoints. In some embodiments, the grouping modeling system's analysis extends beyond the identity of the services, resources, or endpoints to which an endpoint is accessing. In some embodiments, the system may also analyze, for example, when the access occurs, how frequently access occurs, the duration of each instance of access, the amount of data transferred during each instance of access, the type of data transferred, bandwidth usage, identity of the user accessing, current processes running on the endpoint device before, and during, and after the time of access. In some embodiments, all of the above and more may be utilized to determine groupings, to establish a baseline of usage for an endpoint device and/or a grouping, and to generate and set access rights, security, and network communication protocols.

In some embodiments, the system can be configured to generate and provide multiple unique views or visualizations of the network and its various groupings and subnetworks. For example, in some embodiments, the network can be viewed as a whole or in part based on, for instance, logical groupings, physical location of endpoints, subnetworks, network segments, device types, managed devices, unmanaged devices, similarities in inbound and outbound connections, similarities in types of applications installed, time of use of endpoint device, frequency of use, time of use of applications, type of WiFi network used, access point utilized temperature of devices, device memory usage, type of hardware, RPM of hardware, number of CPU cycles on endpoint device, third-party organizational groupings, and any other properties available to an agent or the central server.

In some embodiments, the systems, devices, and methods described herein can be configured to integrate with other existing third-party services, deployment means, enterprise mobility management (EMM) tools, authentication software, and security protocols deployed alongside the endpoint-based network system. In some embodiments, the data and information collected by the system described herein can enable automation of third-party solutions running alongside the system within a network. For example, the system, through the discovery and grouping protocols described herein, may scan and discover an unmanaged device within an existing grouping. Having visibility of this unmanaged device may allow the system to then use existing deployment tools or means, such as, for example, Active Directory, to deploy an agent unto the unmanaged device. The tools and solutions which may be integrated with the endpoint-based network system herein is not limited, and may include any other platform running within the network environment. Specific examples include, for example, Active Directory, Jamf, Tanium, IBM Bigfix, Kaspersky, Trend Micro, Tripwire, Carbon Black, Symantec Endpoint Protection, Ivanti Endpoint, SCCM, McAfee, CrowdStrike, Trend Micro Deep Security, Avast, Shield, Norton, and the like. In some embodiments, the system can be integrated into these third-party platforms such that agents can be automatically deployed to endpoints by the existing platforms, such that specific access or network management rules developed by the system can be deployed through the third-party platforms.

Figure 1B:
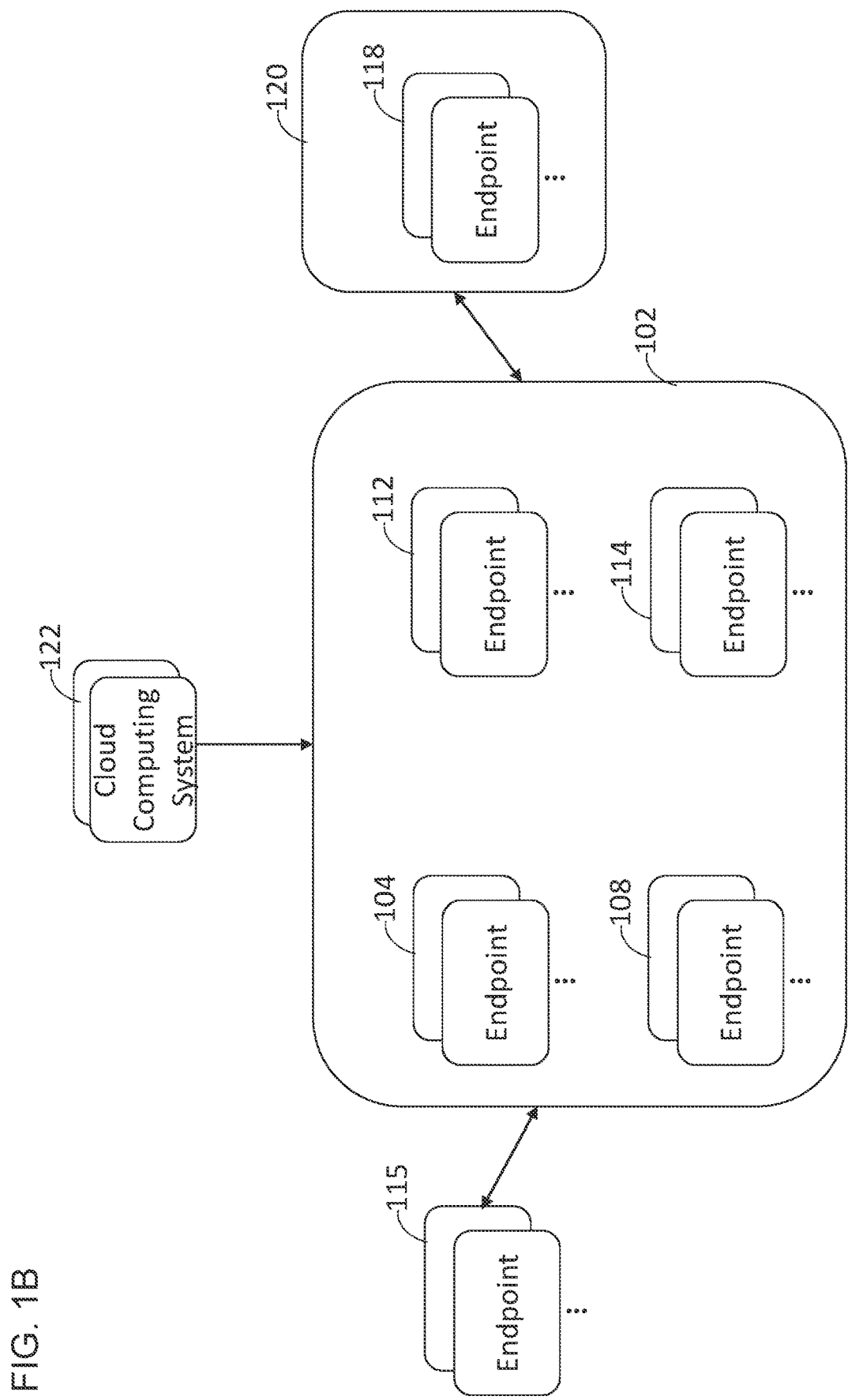
FIG. 1B is a block diagram illustrating a traditional enterprise network perimeter based on a firewall and/or data access management systems with external devices and cloud services.

Traditional enterprise networks can define their network topology and/or network perimeter based on hardware. FIG. 1A is a block diagram illustrating a traditional enterprise network perimeter based on hardware, a firewall and/or data access management systems. FIG. 1B is a block diagram illustrating a traditional enterprise network perimeter based on a firewall and/or data access management systems with external devices and cloud services. Endpoints (such as computing devices, data centers, and/or servers) 104, 108, 112, 114 that connect to a network (such as via a Wi-Fi connection) can be determined to be within an enterprise network perimeter and that computer's network traffic can be transmitted through a connection tunnel, for example, VPN, between the endpoints 104, 108, 112, 114 and external computing devices 115 and/or external networks 120 with their own endpoints 118 outside of the enterprise network perimeter via the enterprise network firewall 102 and/or data access management systems. The perimeter is often defined based on a firewall and/or data access management systems 102 between endpoints (such as computing devices/servers) 104, 108, 112, 114 and the external network. Typically traditional enterprise networks can inspect and/or monitor inbound and outbound network traffic of the connection tunnel (such as by using intrusion detection and prevent systems (IDS) which are a commonly used network security/threat prevention procedure that examines network traffic flows). Traditional enterprise networks can monitor and inspect network traffic to detect and prevent vulnerability exploits coming from malicious inputs to a target application or service. Attackers can input malicious input to interrupt and/or gain control of an application or computing device. For example, attackers can disable an application, access all rights and permissions available to the compromised application, and the like.

However, data available to traditional enterprise networks can be limited to network traffic to and from the external computing devices. Thus, these traditional enterprise networks can monitor and/or inspect network traffic between endpoints 104, 108, 112, 114 that are within the traditional enterprise network perimeter and computing devices external to the enterprise network perimeter 115 and/or to other networks 118. Traditional enterprise networks can also monitor and/or inspect network traffic between endpoints 104, 108, 112, 114 that are within the traditional enterprise network perimeter and cloud computing systems (such as cloud services and/or cloud databases) 122. The traditional enterprise network may not have access to network traffic internal to the endpoints within the enterprise network perimeter 104, 108, 112, 114 nor traffic within an external cloud computing system. This becomes problematic in today's world where a user can be traveling from one destination to another. For example, an individual can use his or her cellphone and/or a laptop from a different location in the world than the location of their desktop. Endpoints such as a desktop can be connected to a home or work network for extended periods of time and thus, can stay within the enterprise network perimeter. However, for endpoints that are remote computing devices such as the cellphone and laptop, the endpoints can connect and disconnect from the home or work network periodically throughout the day. Thus, the endpoints can be outside the enterprise network perimeter, and thus at certain times, communicate directly with cloud data centers and/or cloud applications. The communication channels and/or network traffic may not be restricted with the same network restrictions an endpoint may have when within the perimeters of the traditional enterprise network. The endpoints may also not be protected by the same network protections available on the enterprise network. As a result, the direct communication channel to and from the endpoint may not be monitored and inspected for security threats and/or may not have any form of access provisioning applied because the endpoint can bypass these mechanisms by being outside the enterprise network perimeter.

In addition, a single user can own several endpoints, some residing within the enterprise network perimeter (such as a work desktop) and endpoints that may not be within the enterprise network perimeter (such as a mobile phone or a laptop). Furthermore, a user's endpoint can also be continually changing, such as when a user purchases a new laptop or phone. Therefore, a user can be connected to a plurality of different networks at once and change continuously. Traditional enterprise networks can address this by allowing new devices within the perimeter to have protections and access rights. However, a shortcoming is that when malicious code connects within the enterprise network perimeter, the malicious code can have access to a large amount of data and/or operations within the enterprise network perimeter.

Another issue with traditional enterprise networks is the rise of encryption in network traffic. Network traffic can be encrypted before transmission and decrypted upon receipt at the destination computing device. Thus, a traditional enterprise network that monitors the inbound and/or outbound network traffic may not be able to view the content and/or other important information available on the network data packet being transmitted and/or received.

Furthermore, the data available to traditional enterprise networks can often be limited to network traffic. Accordingly, these enterprise networks can have limited and/or no visibility into the operations and processes that are occurring within the transmitting computing device and the receiving computing device. For example, these enterprise networks can monitor the incoming and outgoing network traffic of a computing device but may not be able to monitor communication between applications (such as a browser on the user's space) and the CPU. Given this limited visibility, the traditional enterprise networks may not have the information necessary to effectively assess security risks, understand and assess behavior of the computing devices, and/or offer cyber security solutions at the operational level of a computing device.

Moreover, traditional enterprise networks may have limited or no visibility to activities occurring external to its perimeter (such as activity occurring on the cloud network). As mentioned herein, traditional enterprise networks have not been able to effectively regulate communication between corporate enterprise networks and cloud data centers/services. Given the widespread adoption of cloud network services by many corporations, users can access data (for example, work email, sensitive documents) via their mobile phones that can access cloud applications and/or cloud data centers directly. This direct communication tunnel from the endpoint to a cloud service may not involve the transmission of network traffic through the enterprise network, and thus may not go through the enterprise network firewall and/or data access management systems for monitoring and access restrictions. Accordingly, traditional enterprise networks may not be able to monitor and/or regulate such communication. Furthermore, a growing number of data leaks and security breaches include compromise of a large number of sensitive documents. This is at least partially due to the fact when there is a security leak into the enterprise network perimeter, the security breach not only includes the files that are stored within the enterprise network but can also include the files that are stored in the cloud data centers and/or the cloud services that are accessible by endpoints within the enterprise network. Thus, the security breach can spread to machines with the perimeter and machines within the cloud. This is becoming a growing problem as enterprises are adding more devices and more services to their corporate enterprise networks, growing the enterprise network perimeter and linking the endpoints to larger cloud data centers and more cloud services, thus providing attackers with access to more information.

Some enterprise networks tried to solve this problem of limited visibility by placing a secure socket layer (SSL) terminator. An SSL connection can be used by applying a certificate for authentication before sending encrypted data from an endpoint to a web server. Then, the SSL terminator can intercept the encrypted network traffic and decrypt the network traffic on a separate computing device using the certificate in order to access content within the network traffic. These types of solutions, however, often raise privacy concerns. For example, users may not want to make their certificates that are used to decrypt the network traffic available to third parties.

Figure 1C:
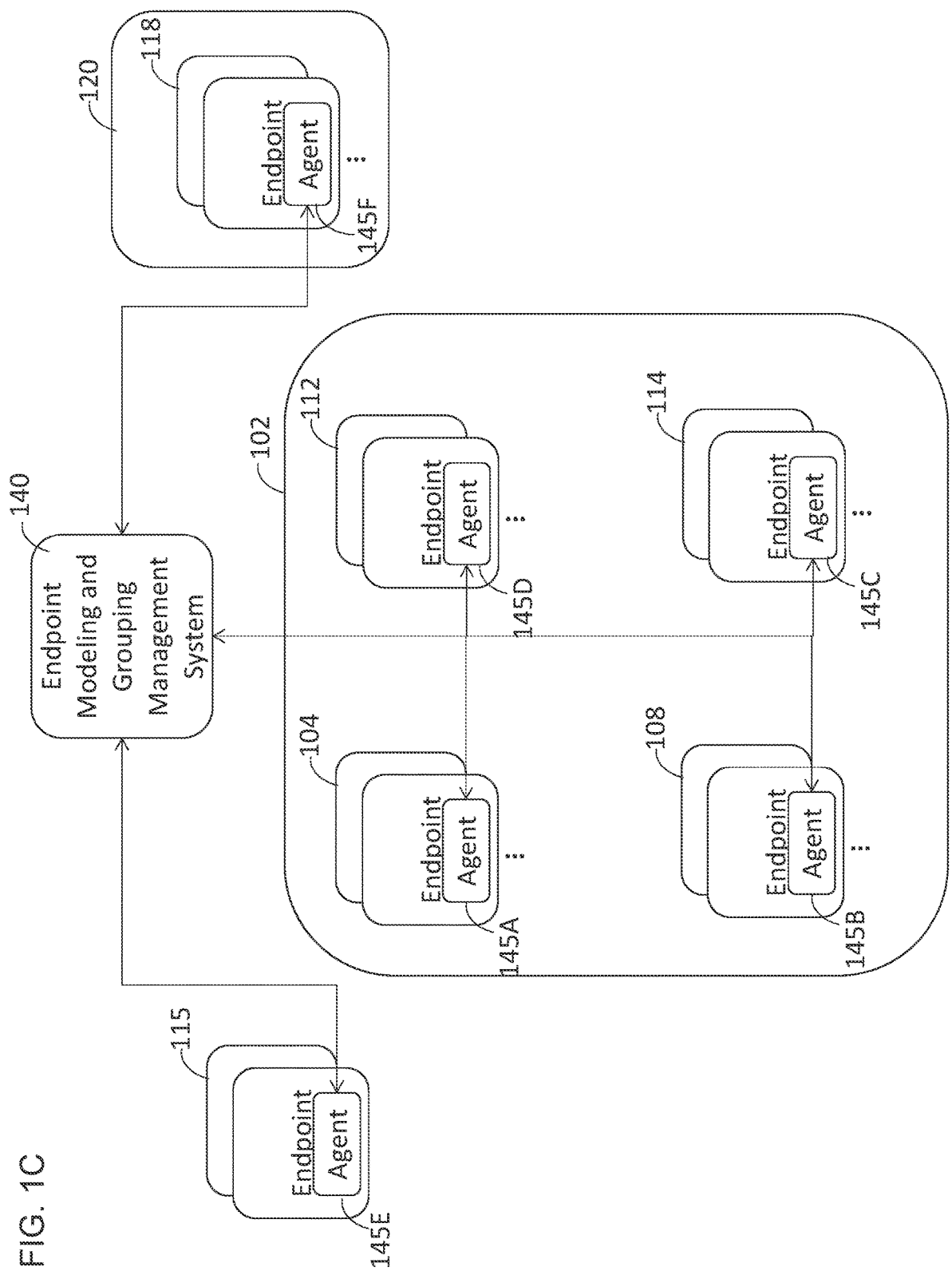
FIG. 1C is a block diagram illustrating a network perimeter using an endpoint modeling and grouping management system and agents installed on endpoints according to some embodiments.
Figure 1D:
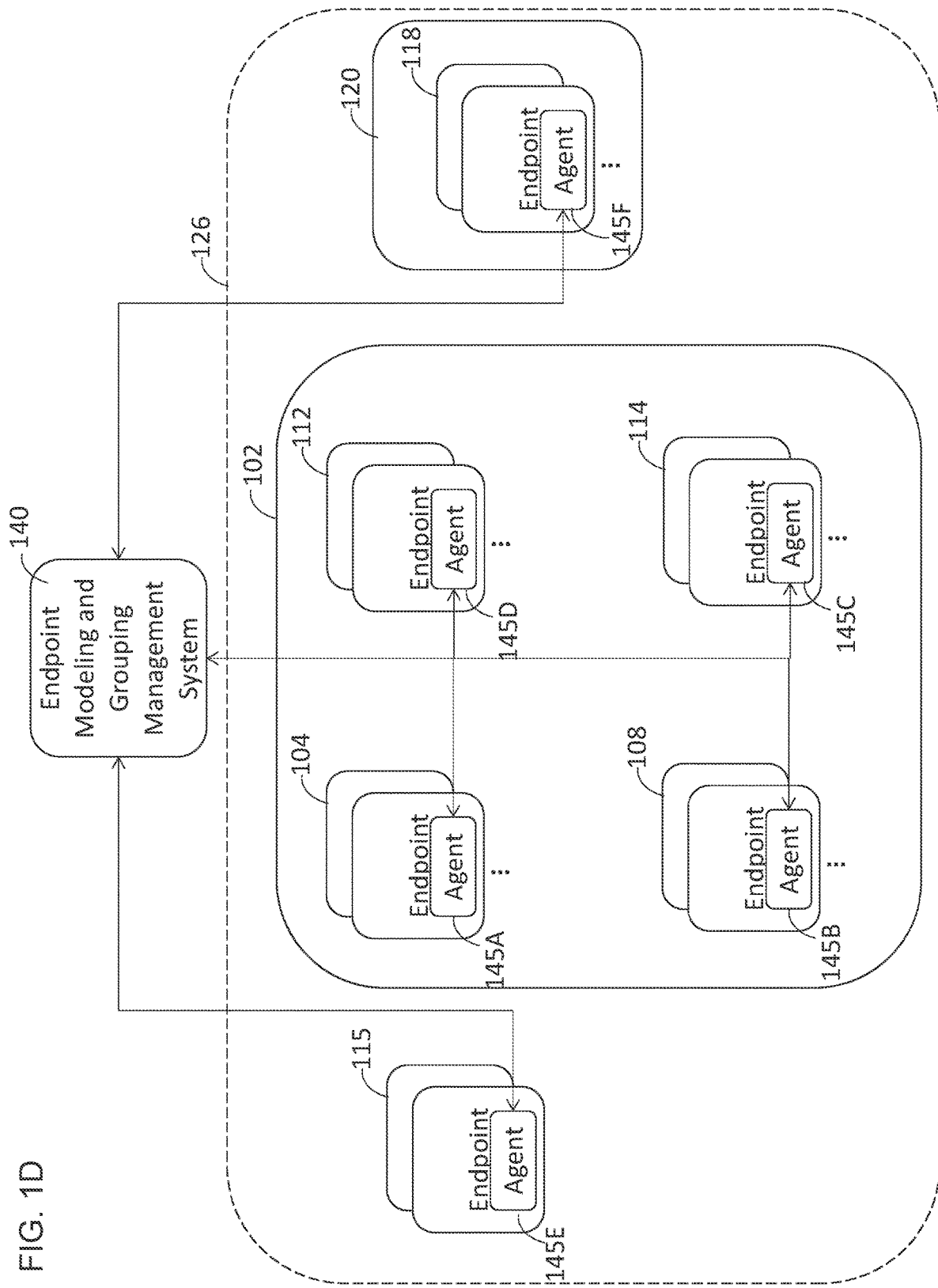
FIG. 1D is a block diagram illustrating a grouping of endpoints with installed agents according to some embodiments.

Various embodiments described herein address one or more shortcomings of traditional enterprise networks. In some embodiments, the endpoint modeling and grouping management system can achieve deep visibility of activity on the network and in the endpoint, both encrypted and non-encrypted communications, via agents installed at the endpoints. FIG. 1C is a block diagram illustrating a network perimeter using an endpoint modeling and grouping management system and agents installed on endpoints according to some embodiments. In some embodiments, an enterprise network perimeter can comprise one or more endpoints with applied network configurations. An enterprise network perimeter can comprise applying access restrictions to the one or more endpoints within the network perimeter. An enterprise network perimeter can comprise security assessment of inbound and outbound traffic to the network perimeter. In some embodiments, the endpoint modeling and grouping management system 140 can access and analyze the network traffic and/or activity data generated by the agents 145A, 145B, 145C, 145D, 145E, 145F, 145I, 145J (collectively referred to herein as agents 145). In some embodiments, the endpoint modeling and grouping management system 140 can model and cluster groups such as logical groups of endpoints based on the network traffic and/or activity data. FIG. 1D is a block diagram illustrating a grouping of endpoints with installed agents according to some embodiments. The endpoint modeling and grouping management system can determine a grouping such as a logical grouping 126 that encompasses endpoints 104, 108, 112, 114, 115, and 118. The endpoint modeling and grouping management system can assess other types of data, such as active directory information to model and cluster groups such as logical groups of endpoints. In some embodiments, the endpoint modeling and grouping management system 140 can transmit the model (or the artificial intelligence software) to end points and/or agents 145 in a group such as logical group. The models can be used to assess activity on the endpoints in order to identify anomalies. In some embodiments, the endpoint modeling and grouping management system 140 can determine enforcement and data control path policies based on the modeling of groups. In some embodiments, the endpoint modeling and grouping management system can employ artificial intelligence to model and cluster groups such as logical groups and/or determine enforcement and data control path policies. In some embodiments, the endpoint modeling and grouping management system 140 can be a cloud-based system. In some embodiments, the endpoint modeling and grouping management system 140 can be a system within and/or external to the enterprise network perimeter.

In some embodiments, the endpoint modeling and grouping management system can employ edge computing by optimizing cloud computing systems to perform data processing at the edges of the network, near the source of the data. In some embodiments, the endpoint modeling and grouping management system can identify similarities and/or differences among the data collected from agents installed on various endpoint computer devices. In some embodiments, based on the comparison of the data collected via the agents, the endpoints can be grouped or clustered into groups such as logical groups. The models for the groups such as logical groups can be transmitted to the end points and/or the agents. In some embodiments, the models can provide an indication of baseline activity. Agents and/or endpoints can receive the models, identify baseline activity, and autonomously assess endpoint activity and/or network traffic for anomalies. Anomalies can be used to flag behavior that can indicate a security breach, such as malware or a computer virus. Thus, the agents can identify potential security breaches and react faster than traditional enterprise networks, where data can be transmitted to a cloud server for the cloud server to identify anomalies.

In some embodiments, the endpoint modeling and grouping management system can calculate similarities and/or differences between endpoint devices. In some embodiments, the similarities can be identified using a similarity measure and/or function (such as the distance between devices, or certain data packet types transmitted and received). In some embodiments, the similarities can include perimeters and/or data points indicative of behaviors of the endpoints. For example, similarities can be identified based on an assessment of the inbound and outbound network traffic, the network connections of the endpoints, the types of devices that the endpoints are associated with, the amount of network traffic on a certain network connection, and the like. The groups such as logical groups can be dynamically and automatically created based on behavioral activity in order to create network representations of the groups such as logical groups. In some embodiments, the endpoint modeling and grouping management system can continually add and remove endpoints to the groups such as logical groups based on behavioral activity analysis. The endpoint modeling and grouping management system can continually change the membership of the groups such as logical groups, making the groups such as logical groups an elastic grid. In some embodiments, the endpoint modeling and grouping management system can define an enterprise network perimeter based on the grouping. Thus, the endpoint modeling and grouping management system can create an elastic perimeter that can virtually encompass endpoints. In some embodiments, the endpoint modeling and grouping management system can define the enterprise network perimeter by grouping endpoints with similar behaviors. In some embodiments, the endpoint modeling and grouping management system can create the enterprise network perimeter based on an installed agent such that each endpoint with the installed agent can be determined to be within the enterprise network perimeter regardless of the current location of the endpoint. The groups such as logical groups can be defined behaviorally, beyond the boundaries of hardware, network, endpoint, cloud, physical, or virtual datacenters. Thus, the endpoint modeling and grouping management system can address one or more shortcomings of traditional enterprise networks where the perimeters can be defined by hardware connections. These traditional enterprise networks may not provide protection, access restrictions, and the like to endpoints that are outside of the enterprise network perimeter whereas the endpoint modeling and grouping management system can define its perimeter based on the installed agents, and thus can provide access restrictions, protection, and the like regardless of the location of the endpoints.

In some embodiments, the endpoint modeling and grouping management system can set policies based on groupings such as logical groupings. In some embodiments, the policies can regulate network access of the endpoints. For example, for a particular group such as logical group, the endpoint modeling and grouping management system can apply certain policies to certain groups such as logical groups. For example, a group such as logical group can access certain datacenters, only access certain endpoints via virtual private network (VPN), or allow access to cloud application/servers. For example, the finance logical group can have access to certain datacenters that the engineering logical group may not have access to.

Figure 1E:
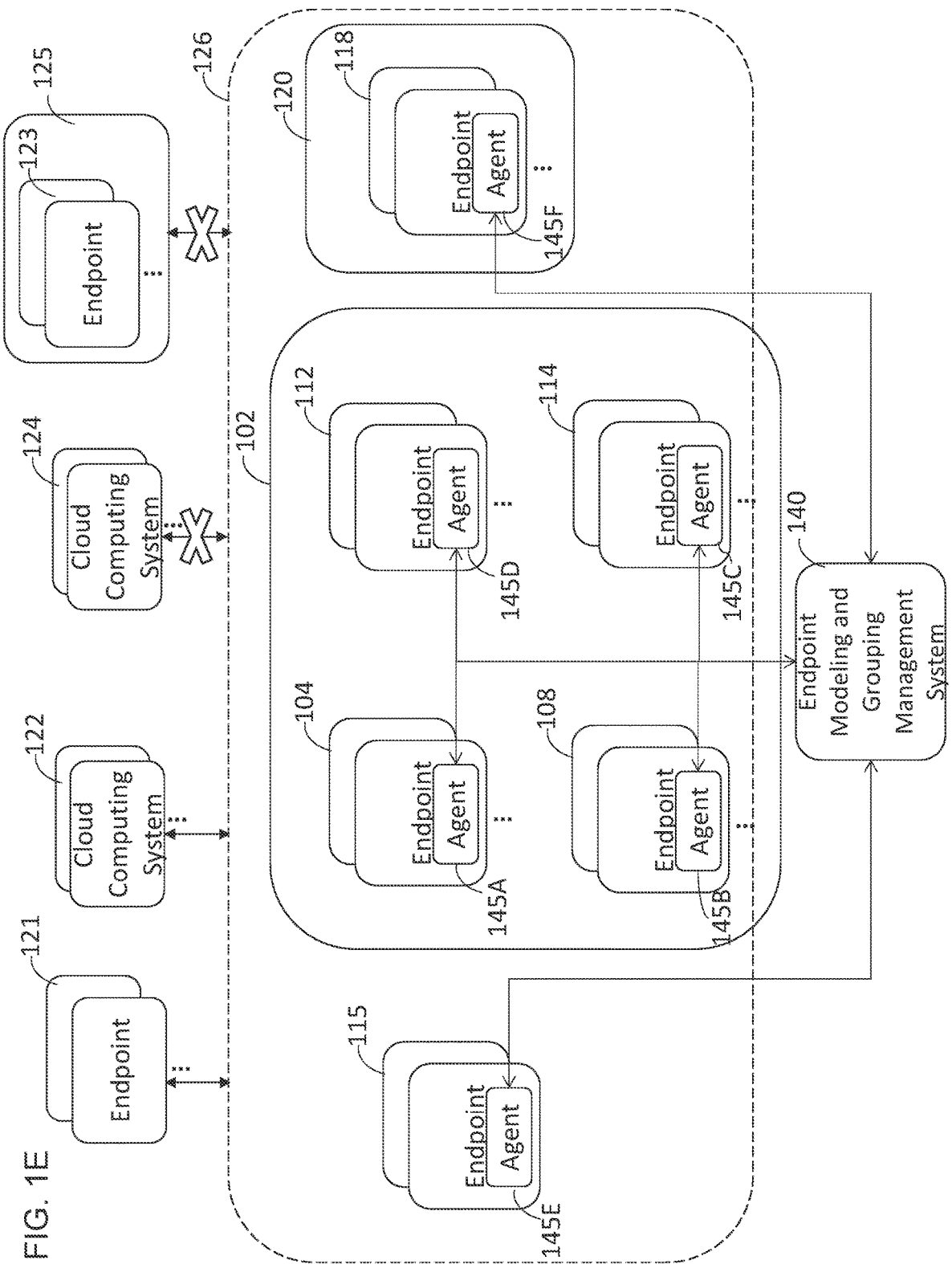
FIG. 1E is a block diagram illustrating a grouping by an endpoint modeling and grouping management system, which can be configured to apply access restrictions to the grouping according to some embodiments.

FIG. 1E is a block diagram illustrating a grouping by an endpoint modeling and grouping management system, which can be configured to apply access restrictions to the grouping. The agents 145 can be installed on endpoints 115, 104, 112, 108, 114, and 118 to create a grouping such as a logical grouping 126. The endpoint modeling and grouping management system 140 and/or the agents 145 can employ access restrictions for the group 126, such as allowing access to an endpoint 121 outside the logical group, allowing access to cloud computing systems 122 and denying access to different cloud computing system 124 (such as a cloud service or a cloud database), and/or denying access to another external network 125 comprising one or more endpoints 123.

In some embodiments, the endpoint modeling and grouping management system can be configured to allow a user to adjust a threshold setting to control the resolution and/or granularity of the logical groupings. In some embodiments, the threshold level can be set to a higher level to encompass a smaller population of endpoints for each group such as logical group.

Figure 1F:
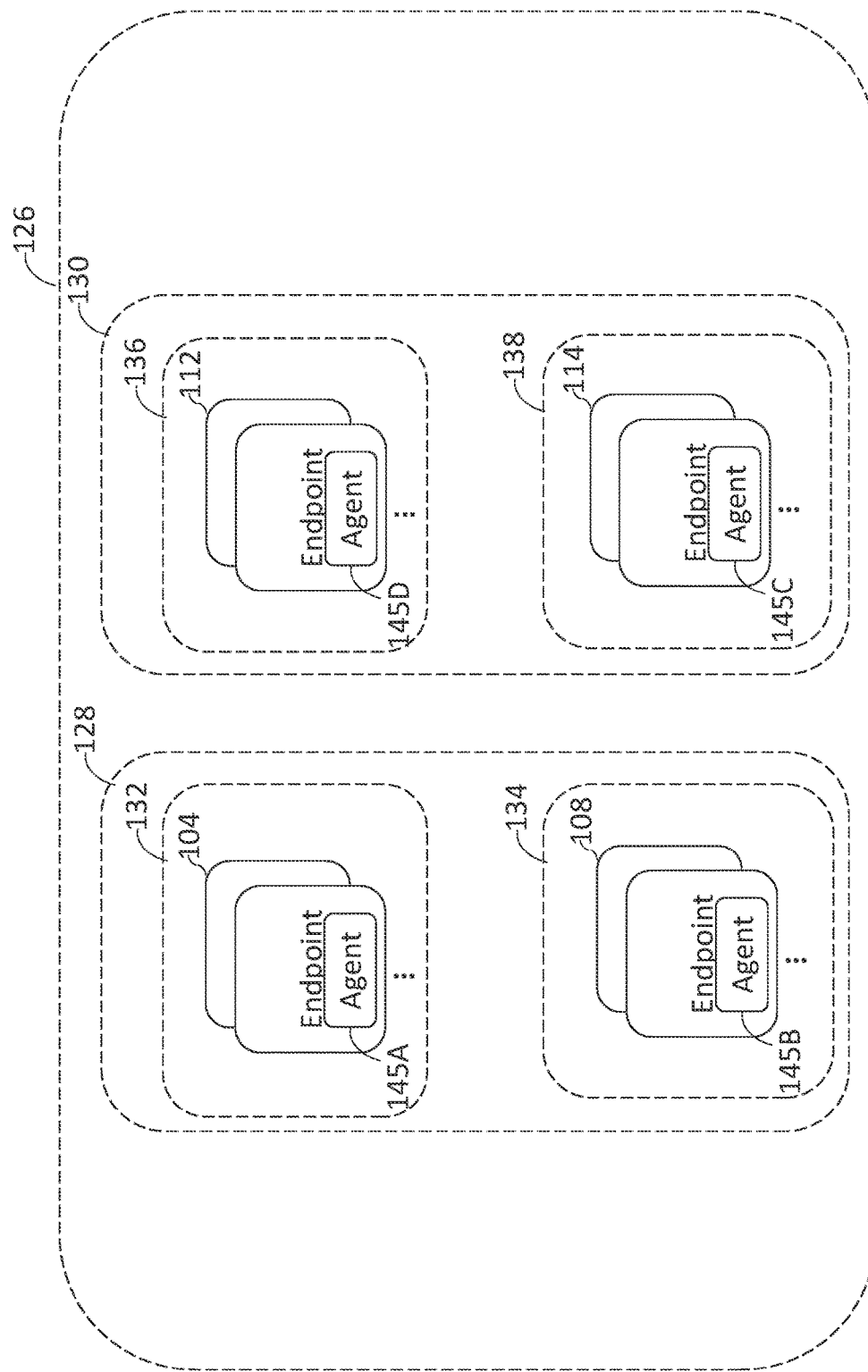
FIG. 1F is a block diagram according illustrating various groupings according to some embodiments.

FIG. 1F is a block diagram illustrating various groupings according to some embodiments. If the threshold level is set low, in other words to be more inclusive, the group can encompass endpoints 104, 112, 108, 114 to form logical group 126. If the threshold is set higher, in other words to be less inclusive requiring endpoints to have more behavioral attributes in common, the groupings can encompass a smaller number of endpoints, such as a first grouping 128 with endpoints 104 and endpoints 108 and/or a second grouping 130 with endpoints 112 and endpoints 114. If the threshold is set even higher, in other words to be the most restrictive requiring endpoints to have essentially the same behavioral attributes, the groupings can encompass a smaller number of endpoints, such as a first grouping 132 with endpoints 104, a second grouping 134 with endpoints 108, a third grouping 136 with endpoints 112, and/or a fourth grouping 138 with endpoints 114.

Figure 1G:
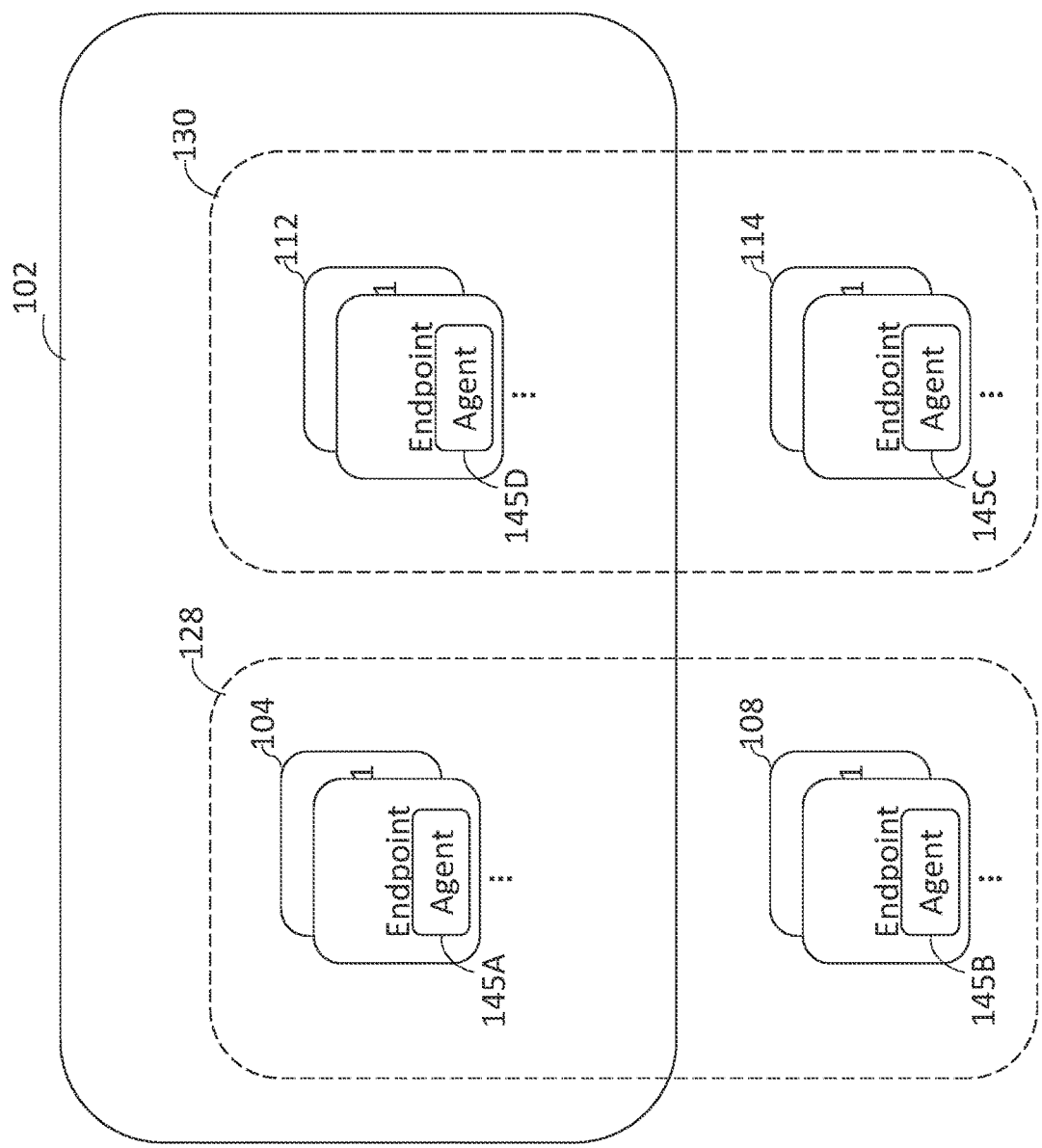
FIG. 1G is a block diagram illustrating various groupings of in-perimeter and out-perimeter endpoints according to some embodiments.

FIG. 1G is a block diagram illustrating various groupings of in-perimeter (i.e. inside the corporate network firewall) and out-perimeter endpoints according to some embodiments. Endpoints 104 and 112 can be within a traditional enterprise network perimeter 102. The groupings such as logical groupings can include one or more endpoints inside of the perimeter and one or more endpoints outside of the perimeter. The endpoints 104, 112 within a single perimeter can be grouped into separate groupings such as logical groupings. A first logical grouping 128 can include in-perimeter endpoints 104 and out-perimeter endpoints 108. A second logical grouping 130 can include in-perimeter endpoints 112 and out-perimeter endpoints 114. For example, endpoints 104 can be desktops within a firewall 102 and endpoints 108 can be laptops outside the firewall 102. The desktop endpoints 104 and laptop endpoints 108 can be associated with a logical group 128, and can only access an email cloud service but be denied access to an accounting database. As such, the logical grouping 128 can comprise the desktop endpoints 104 that sit within the firewall 102 and laptop endpoints 108 that sit outside the firewall 102.

Figure 1H:
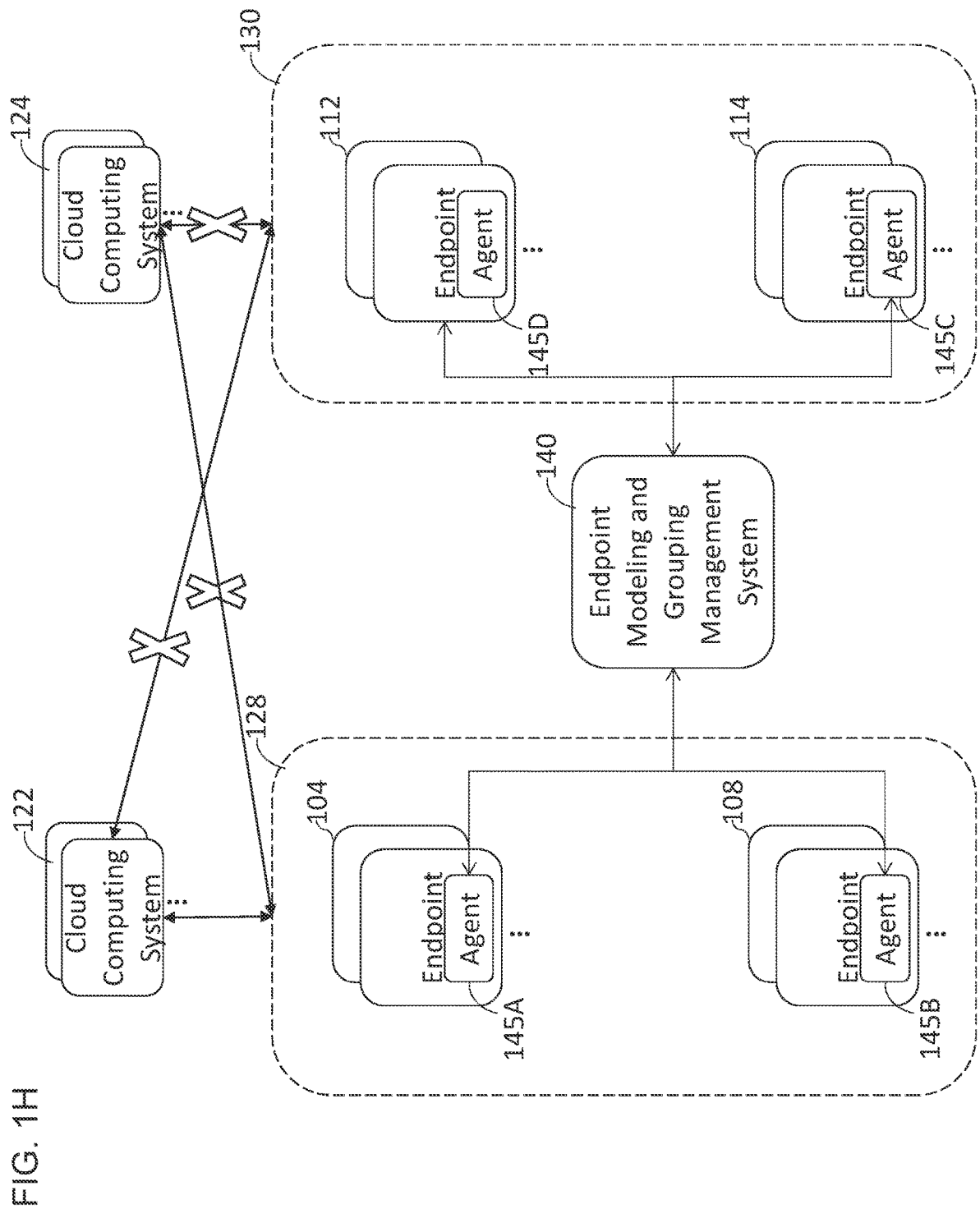
FIG. 1H is a block diagram illustrating various groupings with differing access restrictions according to some embodiments.

FIG. 1H is a block diagram illustrating various groupings with differing access restrictions according to some embodiments. The endpoint modeling and grouping management system and/or the agents 145 can restrict access of the endpoints 104, 108, 112, 114. A first group 128 of endpoints 104, 108 can have access to certain cloud computing systems 122 but may be denied access to other cloud computing systems 124, whereas a second group 130 of endpoints 112, 114 can be denied access to both cloud computing systems 122 and 124.

In some embodiments, an agent installed on one or more endpoint computer devices can be configured to collect data associated with and/or from the endpoints. In some embodiments, the agent can comprise software that collects data about activity occurring at an endpoint or nearby the endpoint. For example, an agent can collect data at an endpoint by intercepting and/or analyzing executed processes on the endpoint and/or monitoring network traffic to and from the endpoint. In some embodiments, the agents can monitor inbound and outbound operations and events at the kernel level. In some embodiments, the agents can monitor encrypted and/or unencrypted data, as will be described in further detail below. In some embodiments, the agents can analyze local, system, and/or operating system activities within the endpoints. The collection of data via an agent can be performed on a periodic basis (for example, each microsecond, each millisecond, each second, each minute, each hour, each day, each month, each year, and/or the like), continuously, and/or can be performed in response to an activity (for example, network traffic, operating system activity, an application, and/or the like). The agents can be installed on computing devices within the perimeters of an enterprise network. In some embodiments, the agents can be installed on cloud data servers and/or cloud services. In some embodiments, the agents can be installed on computing devices outside of the perimeter of a company enterprise network. In some embodiments, the agents can be installed on remote computing devices (such as a mobile phone or laptop) that can move in and out of a company enterprise network perimeter. Thus, the network can be an elastic grid of endpoints that can identify abnormal behavior and/or provide access restrictions inside and outside a company enterprise network perimeter.

Figure 1I:
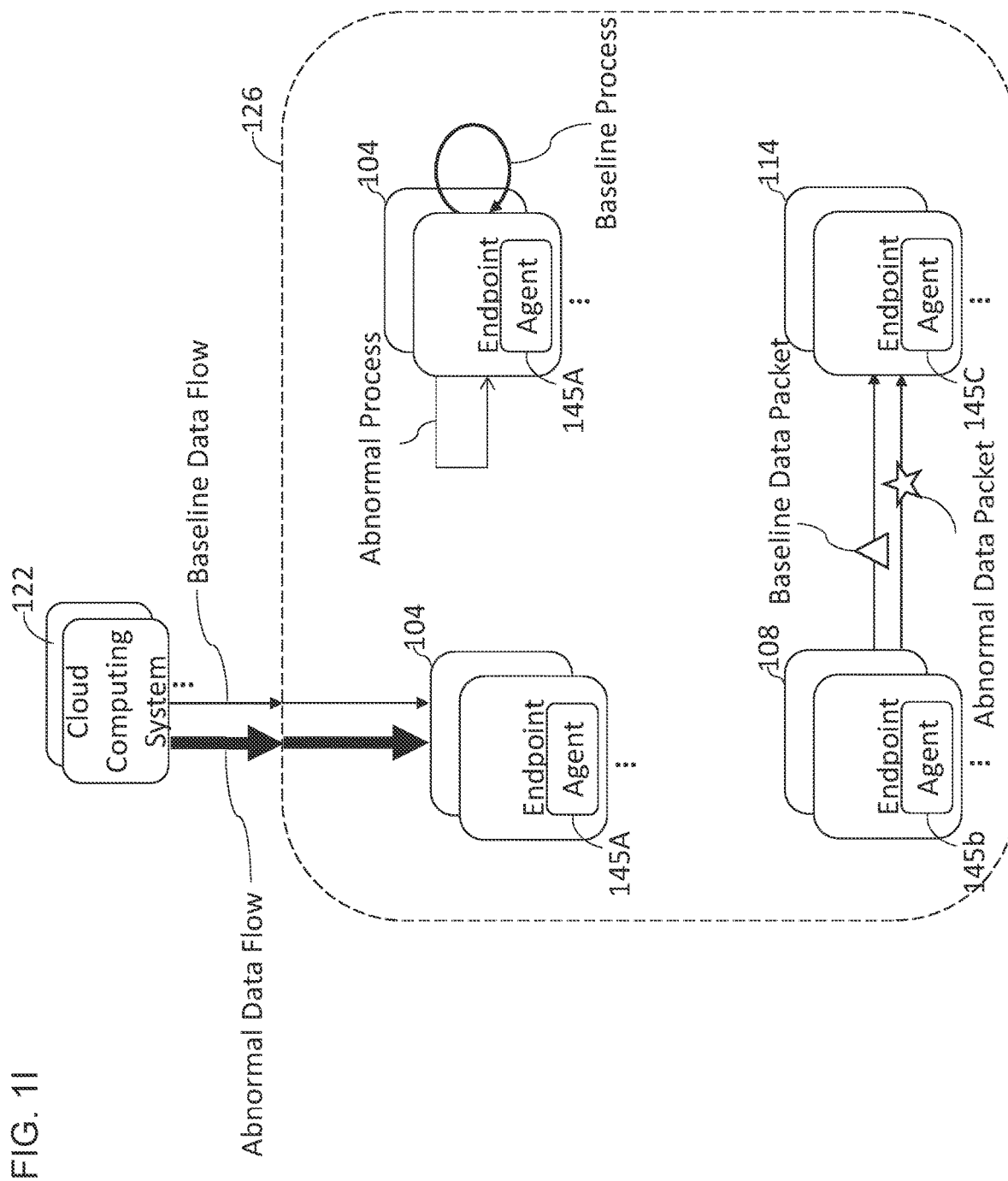
FIG. 1I is a block diagram illustrating identification of abnormal behavior according to some embodiments.

FIG. 1I is a block diagram illustrating identification of abnormal behavior according to some embodiments. In some embodiments, the endpoint modeling and grouping management system and/or agents can identify baseline behavior for the endpoint. An agent 145 can determine that an endpoint 104 comprises baseline behavior of obtaining a certain amount of data from a cloud computing system 112. An abnormal behavior can be a large amount of data and/or a small amount of data as compared to the baseline amount of expected data. The agent 145B or 145C can determine that endpoints 108 or 114 comprises baseline behavior of sending or receiving certain data packets of a particular type, depicted as a triangle, and/or not sending or receiving other data packets of another type, depicted as a star. The agent 145D can determine that an endpoint 112 comprises baseline behavior of performing certain types of internal processes, depicted as a semi-circle, and/or to not perform other types of internal processes, depicted as three straight lines.

In some embodiments, the endpoint modeling and grouping management system and/or the agents can map, determine, and/or identify the network topology of the groups, such as logical groups. The endpoint modeling and grouping management system and/or the agents can use the mapping of the network topology to derive a network map representing one or more endpoints/devices connected to a network. In some embodiments, the endpoint modeling and grouping management system can determine a model for the endpoints on the network map. The models can be used to establish a baseline of behavior for activity and/or access restrictions for one or more groups. In some embodiments, the models can be used to identify access restrictions for the groups. In some embodiments, the endpoint modeling and grouping management system can transmit the model to the endpoints and/or the agents. In some embodiments, the endpoints and/or agents can assess future activity on the endpoint autonomously to identify anomalies in activity based on the baseline. In some embodiments, the endpoints can enforce the access restrictions received from the endpoint modeling and grouping management system.

In some embodiments, the mapping can comprise one or more endpoint devices that may not have agents installed. In some embodiments, the endpoint modeling and grouping management system and/or the agents can determine a mapping of the network to discover one or more endpoint devices. In some embodiments, the endpoint modeling and grouping management system and/or agent can identify endpoints that may or may not have agents installed as part of the mapping. In some embodiments, an agent can be configured to map the network around the agent to discover endpoints and/or devices near the agents. In certain embodiments, the agent can be configured to analyze the mapped network around the agent to discover managed (an endpoint having at least one agent installed on the endpoint) and/or unmanaged (an endpoint having no agent installed on the endpoint) devices. FIG. 1J is a block diagram illustrating deployment of an agent to an unmanaged endpoint according to some embodiments. In some embodiments, the endpoint modeling and grouping management system 140 and/or the agents 145 can determine one or more endpoint devices 116 for installing agents 145K on in order to collect data from the endpoints 116 that do not have agents currently installed. The endpoint modeling and grouping management system 140 and/or the agents 145 can identify the network topology and/or the deployment of agents in response to data collected from one or more agents and/or the creation/updating of the groups, such as logical groups, and vice versa. In some embodiments, the endpoint modeling and grouping management system 140 and/or the agents 145 can determine, based on the collected data, to augment unmanaged devices 116 that are within the perimeter of the elastic network. In certain embodiments, the endpoint modeling and grouping management system 140 can be configured to collect network data via a network device to augment unmanaged in-perimeter devices 116. In certain embodiments, network devices can comprise a switch, a router, a hub, a modem a bridge, a repeater, and/or the like. The endpoint modeling and grouping management system 140 and/or the agents 145 can expand the collection of data from endpoints within the perimeter of the elastic network by installing agents 145k on unmanaged devices 116. In some embodiments, the endpoint modeling and grouping management system 140 can generate and/or update the model for the network perimeter based on the newly collected data from the previously unmanaged devices 116 now having an agent 145K installed on the devices 116 and/or block access for these devices 116 if the devices 116 do not have an agent 145K installed.

In some embodiments, the endpoint modeling and grouping management system can continually assess similarities and/or differences of one or more endpoints. In some embodiments, the endpoint modeling and grouping management system can update the network topology based on newly collected data from the recently deployed agents onto the endpoints that previously did not have agents installed. The endpoint modeling and grouping management system can create an elastic edge grid that can continually and automatically change.

In some embodiments, the endpoint modeling and grouping management system can parse and/or index the collected data from the agents. The endpoint modeling and grouping management system can store the data into a searchable format. The data received from the agents can be normalized.

In some embodiments, the endpoint modeling and grouping management system can be configured to operate on one or more endpoints, where one or more of the endpoints can perform certain steps of the endpoint modeling and grouping management system.

The endpoint modeling and grouping management system can create a group, such as logical group, of endpoints. In some embodiments, the group can comprise one or more endpoints that are located on different networks and protected by different firewalls. The endpoints can comprise user computing devices such as a mobile phone, a desktop computer, a tabloid, a laptop, and/or the like. In some embodiments, the endpoints can comprise servers that connect other devices, such as user computing devices. The endpoints can comprise cloud storage and/or cloud applications. In some embodiments, the endpoints can be used to perform certain steps, such as data collection, which can provide the endpoint modeling and grouping management system with deep visibility. For example, the endpoints can collect data at the kernel level, instead of relying on network inbound and outbound traffic. The endpoints can detect security concerns such as malware injecting itself into a program before going to the kernel. Because of endpoint processing, the endpoint modeling and grouping management system can also assess connection attempts. The endpoint modeling and grouping management system can disallow connection attempts from a current endpoint to another system and/or from another system to the endpoint.

Figure 2:
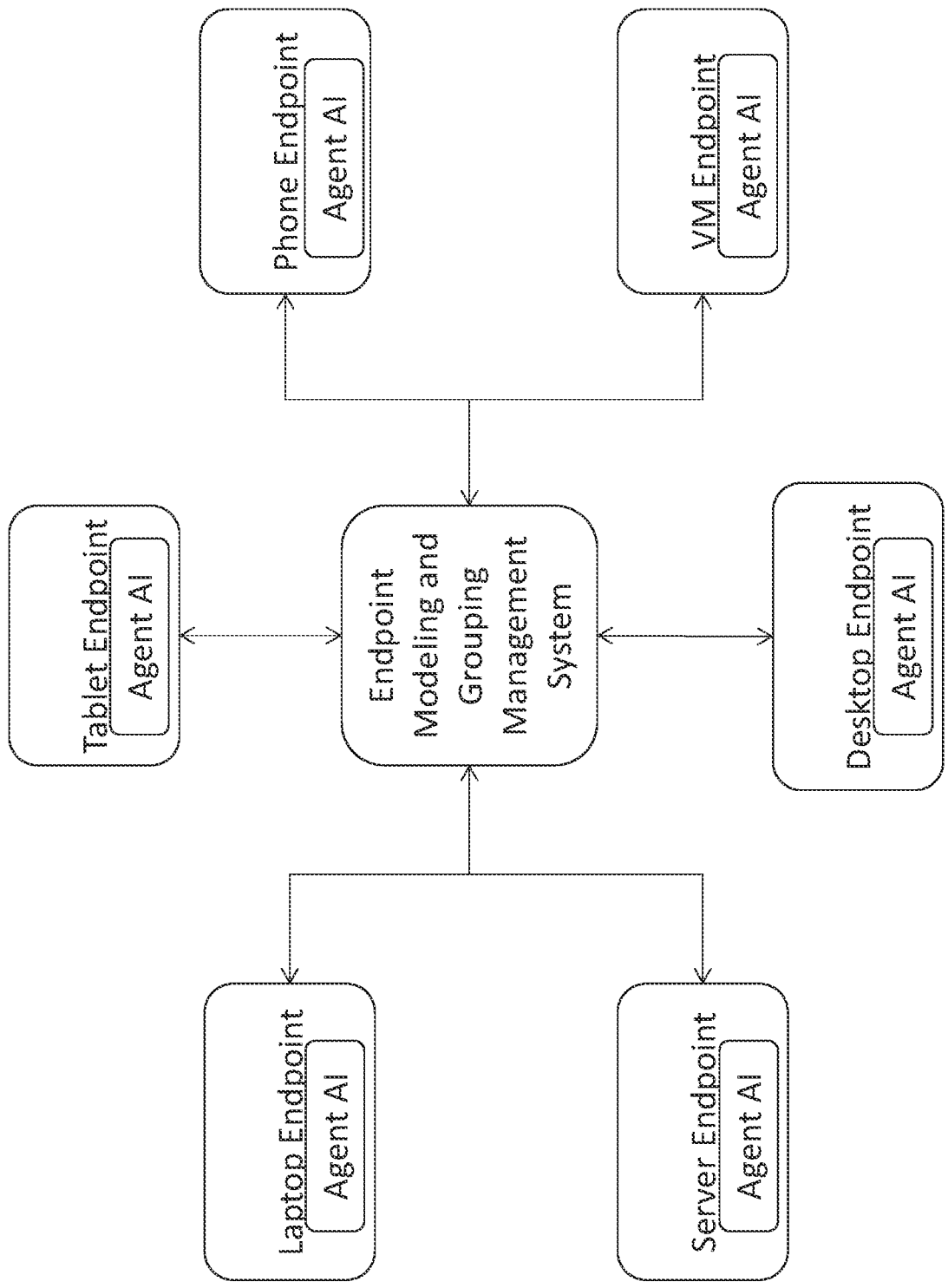
FIG. 2 is a diagram illustrating example edge networks using artificial intelligence (AI) according to some embodiments.

FIG. 2 is a diagram of edge networks using artificial intelligence (AI) according to some embodiments. Artificial intelligence can be used to identify security threats in real-time or substantially real-time on a device. In some embodiments, the AI component can identify groups, such as logical groups, of endpoints based on similarities and/or differences identified from the collected data from agents. The AI component can identify groups of endpoints by running various forms of statistical analysis on accumulated endpoint data (such as network traffic, endpoint operating system events, kernel monitoring). In some embodiments, the AI component can develop models for groups. The endpoint grouping and management system can transmit the models to agents. The agents can identify baseline behavior from the models generated by the AI component to identify anomalies in activity and/or behavior at the endpoint. For example, in some embodiments, the agents can assess future activity at the endpoint to determine if the activity is within the baseline behavior and/or if the activity is a potential security threat. In some embodiments, the agents can identify anomalies autonomously by assessing activity based on baseline behavior of the model. In some embodiments, the agents can assess activity in real-time or substantially real-time without having to communicate with the cloud to identify security threats. The AI component of the system can make prevention, detection, and/or treatment of a security threat autonomous (or semi-autonomous). In some embodiments, the AI component can generate a model for the agent to restrict or allow access to and from an endpoint, and/or prevent access to certain assets and/or certain modules within an asset. In some embodiments, the AI component can generate a model for the agent that can enforce specific usage policies, such as setting and/or limiting network bandwidth, generating an alert based on network bandwidth usage, locking an endpoint based on bandwidth usage, setting bandwidth policies for specified connections to particular endpoints and/or assets, control traffic during certain time periods such as outside of normal business working hours, deploying internet security for a particular connection and/or endpoint, and/or the like. The endpoint modeling and grouping management system can employ edge computing by optimizing cloud computing systems to perform data processing at the edges of the network, near the source of the data. In some embodiments, edge computing is a method of optimizing cloud computing systems by performing data processing at the edges of the network, near the source of the data. In some embodiments, the system can fuse multilayered protection into one AI driven core to proactively protect from all vectors of attack. In some embodiments the system can enable a distributed security approach utilizing deep real-time visibility of the network endpoints.

Figure 3:
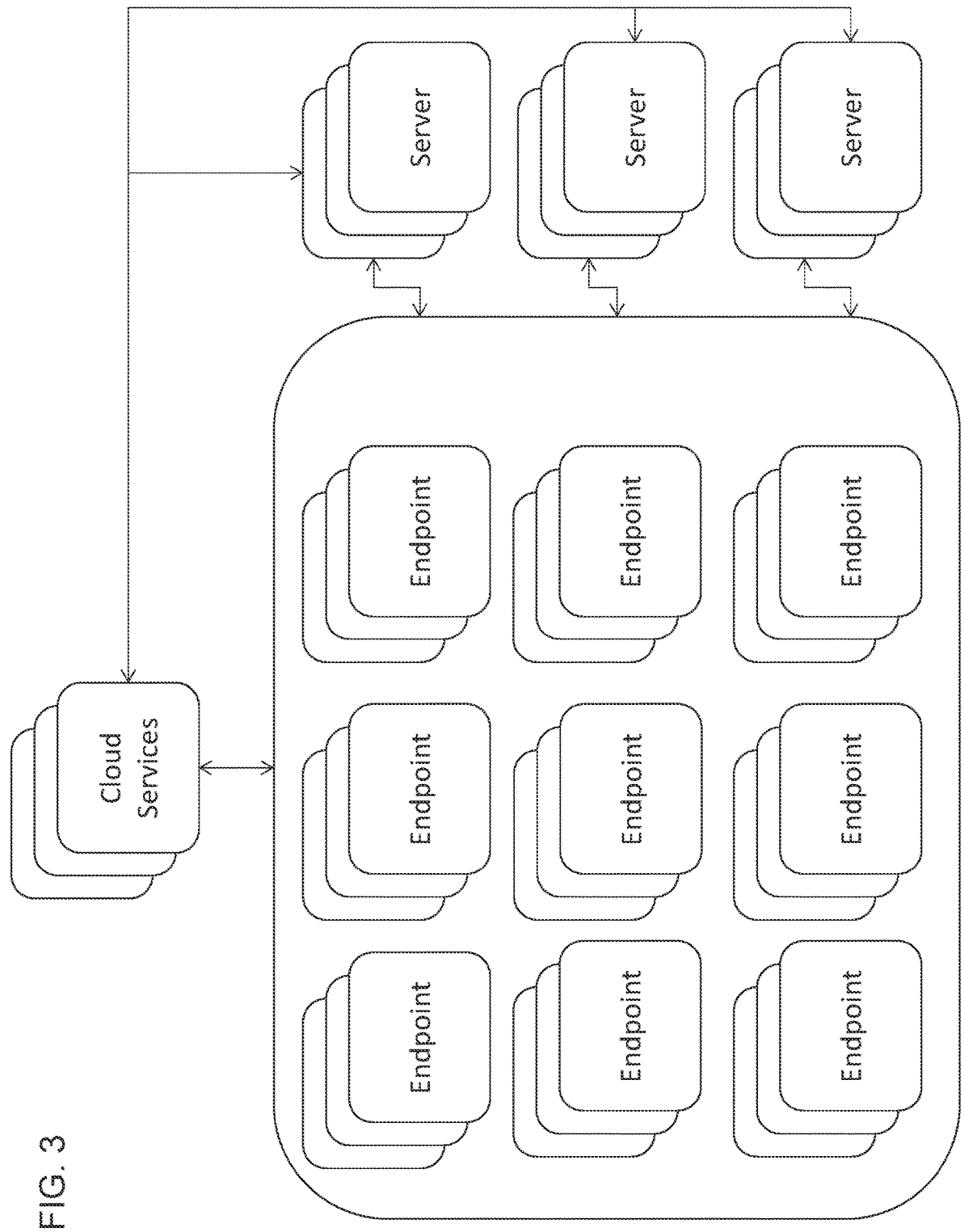
FIG. 3 is a diagram illustrating edge networks in a fully elastic edge grid according to some embodiments.

FIG. 3 is a diagram of edge networks in a fully elastic edge grid according to some embodiments. In some embodiments, the system can be configured to map the network topology based on similarities among endpoints, thereby making the network topology an elastic edge grid. In some embodiments, the endpoint modeling and grouping management system can add and remove endpoints based on continual, dynamic, and/or periodic assessment of data from the agents. In some embodiments, the system redefines the concept of a perimeter by transforming the network as a fully elastic edge grid for every asset, from every asset, from the endpoints to the cloud. In some embodiments, the system and/or agents gain full visibility into every data access operation including encrypted traffic, without decrypting it. In some embodiments, the system comprises AI driven data access control, based on real-time autonomous data paths baselining and enforcement. In some embodiments, the system can define any logical network beyond the boundaries of hardware, network, endpoint, cloud, physical or virtual datacenters. In some embodiments, the system can identify data access anomalies that stem from abnormal data consumption, with monitoring every asset (DLP 2.0).

In some embodiments, performing the mapping of the network topology enables the system to gain visibility into unmanaged devices that are connected to the network.

The endpoint modeling and grouping management system can perform the steps described in this disclosure via artificial intelligence, statistical analysis, and/or machine learning. The endpoint modeling and grouping management system can identify and/or determine similarities between one or more endpoint devices using machine learning techniques, such as artificial intelligence, statistical analysis, and/or trained modeling. For example, the endpoint modeling and grouping management system can be configured to use computational statistics to automatically or semi-automatically create baseline behavioral profiles and find meaningful anomalies. In some embodiments, such baselines can be used to identify similarities between one or more endpoint devices to include in a grouping such as a logical grouping. Anomalies can be used to identify differences between endpoint devices to remove the endpoint device in a grouping. In some embodiments, the machine learning techniques can employ computational tasks that learn from and make predictions based on the collected data. For example, neural networks can be trained using pre-existing training data to look for certain patterns and apply certain rules or patterns to a new set of data to make a recommendation and/or create a grouping such as a logical grouping. Data access abnormalities can be assessed based on abnormal behavior from the baseline, such as abnormal data consumption. The abnormalities can be identified by monitoring one or more assets.

In some embodiments, groups such as logical groups can be identified based on an assessment of the activities collected from the agents. The groups can be determined based on behavior of the activity on the endpoints. The groups can be defined behaviorally, beyond the boundaries of hardware, network, endpoint, cloud, physical, or virtual datacenters.

In some embodiments, the system completes a behavioral assessment of endpoints using artificial intelligence. In some embodiments, artificial intelligence can be used on preexisting datasets of actual data collected from agents previously, whereby the endpoints are known to be associated with one or more particular characteristic indicative of a group such as logical group. In some embodiments, the endpoint modeling and grouping management system can train the AI component to identify these characteristics to create groups based on new data collected from the agents. The datasets can comprise generated data associated with one or more characteristics and/or activities. In some embodiments, the system AI runs at the core or central server and/or at the agents, and delivers protection from malware, exploits, file-less attacks, script based attacks and even live attackers, all with one, fully autonomous low-footprint agent and a simple deployment process. In some embodiments, the endpoint software comprises a single, holistic agent for multi-vector protection. In some embodiments, the system provides full coverage or protection during pre-execution, execution, and/or post-execution of endpoint processes. In some embodiments, the system provides automatic remediation of security threats or breaches. In some embodiments, the system may provide a rollback feature, allowing the system to restore one or more endpoints to a pre-infection condition. In some embodiments, the system is configured to function on any platform, for example, MacOS, Windows, VDI, and Linux. In some embodiments, the system provides deep visibility into endpoints, including encrypted traffic.

In some embodiments, the groups can be used to determine the type of protection required to protect from malware, exploits, file-less attacks, script based attacks, live attacks, and/or the like. In some embodiments, a single agent can be used for multiple types of protection, such as multi-vector protection. The types of protection can vary based on the groups, for example ranging from prevention, detection, treatment measures, and/or the like. In some embodiments, the agents can automatically remediate affected files and/or endpoints. For example, the endpoint modeling and grouping management system can be configured to roll back at least a portion of the software, operating system, and the like to a previous version and/or to a software version installed on another endpoint. In some embodiments, the endpoint modeling and grouping management system can be configured to disconnect the endpoint from the network and solve the issue before reconnecting the endpoint to the network.

Endpoint Modeling and Grouping Management System

Figure 4:
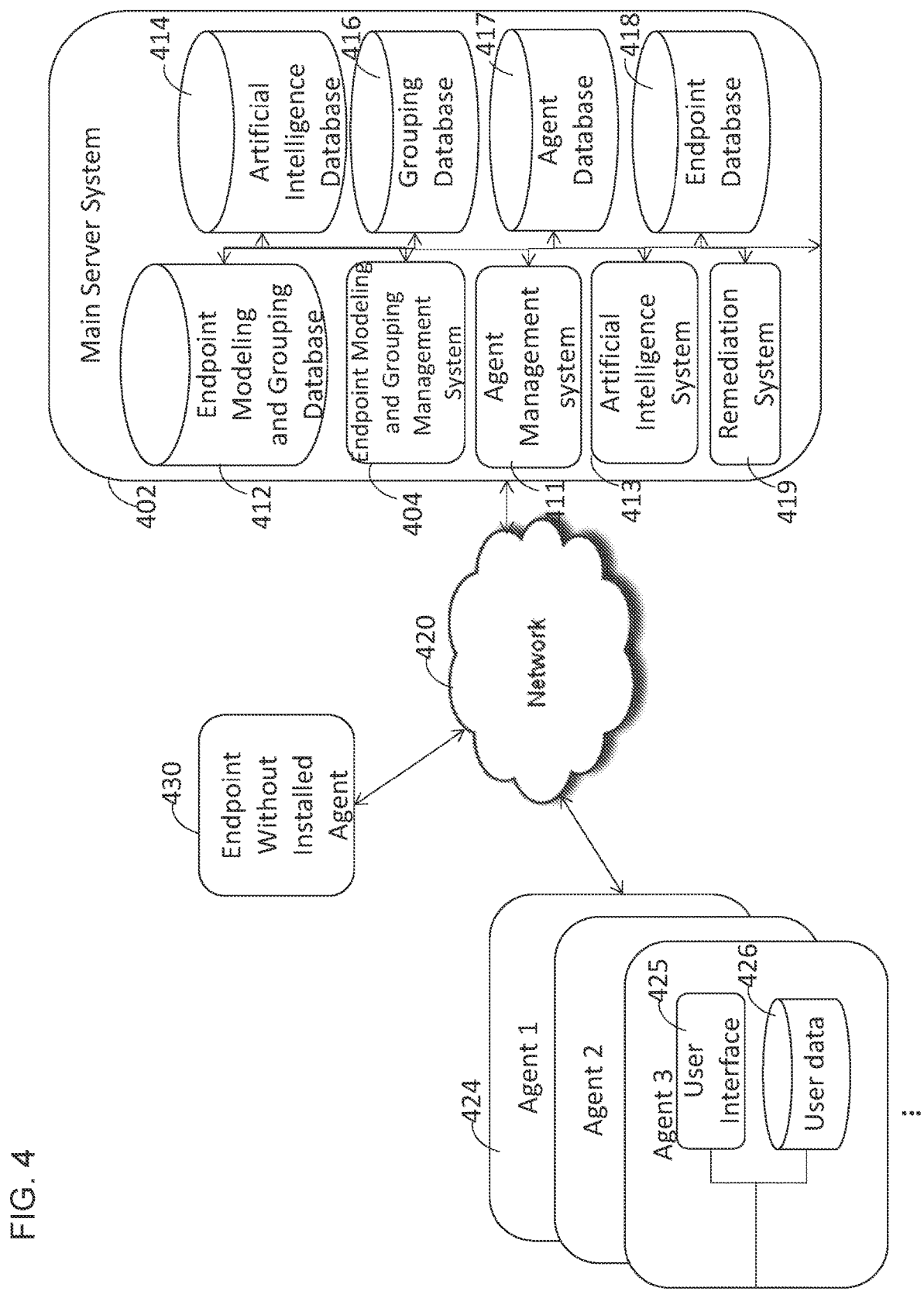
FIG. 4 is a schematic diagram illustrating an endpoint modeling and grouping management system according to some embodiments.

FIG. 4 is a schematic diagram illustrating an endpoint modeling and grouping management system according to some embodiments. In some embodiments, a main server system 402 can be comprised of an endpoint modeling and grouping management system 404, an agent management system 411, an artificial intelligence system 413, a remediation system 419, an endpoint modeling and grouping database 412, an artificial intelligence database 414, a grouping database 416, an agent database 417, and/or an endpoint database 418. The main server system can be connected to a network 420. The network can be configured to connect the main server to an endpoint without installed agent 430 and/or one or more agents 424.

In some embodiments, the endpoint modeling and grouping management system 404 can be configured to identify groups, deploy agents, and/or the like.

In some embodiments, the processes of the main server system 402 can be offloaded to the agents located at the endpoints. For example, in some embodiments, one or more agents can determine whether a particular endpoint can access a particular data path, thereby eliminating the need and bottleneck of requesting permission from the main sever system 402. In some embodiments, the agent can be configured to store computations, results, and input to the agents in addition to the main server system. In some embodiments, offloading certain processing to agents can reduce network traffic to the main server system and/or speed up enforcement of topologies.

In some embodiments, the artificial intelligence database 414 can comprise a collection of various artificial intelligence algorithms and/or systems. In some embodiments, the grouping database 416 can comprise a collection of various groupings such as logical groupings. In some embodiments, the endpoint modeling and grouping management system 404 can use the artificial intelligence system 413 to identify groups of endpoints.

In some embodiments, the agent management system 411 can be configured to collect and analyze data generated and/or collected by the agents 424.

In some embodiments, the agent database 417 can provide a collection of data received by the agents installed on the endpoints. In some embodiments, the agent database 417 can comprise information on the agent, such as a version number of the agent software. In some embodiments, the endpoint database 418 can provide a collection of data related to the endpoints. For example, the endpoint database 418 can include information on the type of device, an IP address, and/or the like.

In some embodiments, the endpoint modeling and grouping management system 404 can provide users with an administrator user interface to access and/or communicate with the main server system, and to utilize the functional aspects of the system. In some embodiments, the endpoint modeling and grouping management system 404 can comprise a user interface 425 to display functions, statistics, and/or other data to the user and to allow users to enter commands. In some embodiments, the endpoint modeling and grouping management system 404 can comprise user data 426 that can be stored with the user profile.

In some embodiments, the endpoint modeling and grouping management system 404 can communicate with endpoints without installed agents 430. The endpoint modeling and grouping management system 404 can deploy and/or install agents to the endpoints without any agents.

Computer System

Figure 5:
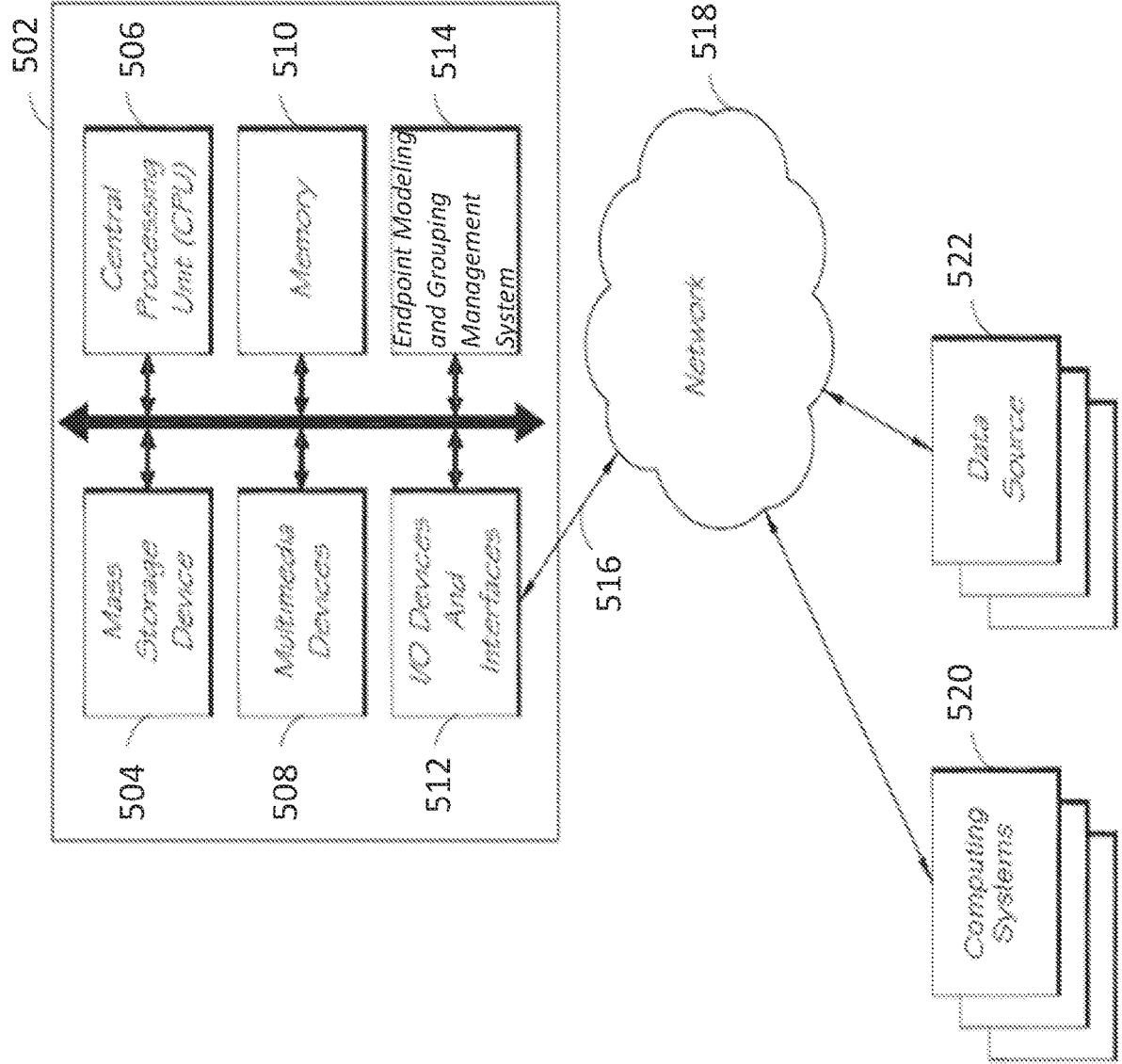
FIG. 5 is a block diagram illustrating a computer hardware system configured to run software for implementing one or more embodiments of an endpoint modeling and grouping management system according to some embodiments.

In some embodiments, the systems, processes, and methods described herein are implemented using a computing system, such as the one illustrated in FIG. 5. The example computer system 502 is in communication with one or more computing systems 520 and/or one or more data sources 522 via one or more networks 518. While FIG. 5 illustrates an embodiment of a computing system 502, it is recognized that the functionality provided for in the components and systems of computer system 502 can be combined into fewer components and systems, or further separated into additional components and systems.

Computing System Components

The computer system 502 can comprise endpoint modeling and grouping management system 514 that carries out the functions, methods, acts, and/or processes described herein. The computer system 502 can comprise endpoint modeling and grouping management system 514 is executed on the computer system 502 by a central processing unit 506 discussed further below.

In general the word "system," as used herein, refers to logic embodied in hardware or firmware or to a collection of software instructions, having entry and exit points. Systems are written in a program language, such as JAVA, C, or C++, or the like. Software systems can be compiled or linked into an executable program, installed in a dynamic link library, or can be written in an interpreted language such as BASIC, PERL, LAU, PHP or Python and any such languages. Software systems can be called from other systems or from themselves, and/or can be invoked in response to detected events or interruptions. Systems implemented in hardware include connected logic units such as gates and flip-flops, and/or can comprise programmable units, such as programmable gate arrays or processors.

Generally, the systems described herein refer to logical systems that can be combined with other systems or divided into sub-systems despite their physical organization or storage. The systems are executed by one or more computing systems, and can be stored on or within any suitable computer readable medium, or implemented in-whole or in-part within special designed hardware or firmware. Not all calculations, analysis, and/or optimization require the use of computer systems, though any of the above-described methods, calculations, processes, or analyses can be facilitated through the use of computers. Further, in some embodiments, process blocks described herein can be altered, rearranged, combined, and/or omitted.

The computer system 502 includes one or more processing units (CPU) 506, which can comprise a microprocessor. The computer system 502 further includes a physical memory 510, such as random access memory (RAM) for temporary storage of information, a read only memory (ROM) for permanent storage of information, and a mass storage device 504, such as a backing store, hard drive, rotating magnetic disks, solid state disks (SSD), flash memory, phase-change memory (PCM), 3D XPoint memory, diskette, or optical media storage device. Alternatively, the mass storage device can be implemented in an array of servers. Typically, the components of the computer system 502 are connected to the computer using a standards based bus system. The bus system can be implemented using various protocols, such as Peripheral Component Interconnect (PCI), Micro Channel, SCSI, Industrial Standard Architecture (ISA) and Extended ISA (EISA) architectures.

The computer system 502 includes one or more input/output (I/O) devices and interfaces 512, such as a keyboard, mouse, touch pad, and printer. The I/O devices and interfaces 512 can comprise one or more display devices, such as a monitor, that allows the visual presentation of data to a user. More particularly, a display device provides for the presentation of GUIs as application software data, and multi-media presentations, for example. The I/O devices and interfaces 512 can also provide a communications interface to various external devices. The computer system 502 can comprise one or more multi-media devices 508, such as speakers, video cards, graphics accelerators, and microphones, for example.

Computing System Device/Operating System

FIG. 5 is a block diagram depicting an embodiment of a computer hardware system configured to run software for implementing one or more embodiments of an endpoint modeling and grouping management system.

The computer system 502 can run on a variety of computing devices, such as a server, a Windows server, a Structure Query Language server, a Unix Server, a personal computer, a laptop computer, and so forth. In other embodiments, the computer system 502 can run on a cluster computer system, a mainframe computer system and/or other computing system suitable for controlling and/or communicating with large databases, performing high volume transaction processing, and generating reports from large databases. The computing system 502 is generally controlled and coordinated by operating system software, such as z/OS, Windows, Linux, UNIX, BSD, PHP, SunOS, Solaris, MacOS, ICloud services or other compatible operating systems, including proprietary operating systems. Operating systems control and schedule computer processes for execution, perform memory management, provide file system, networking, and I/O services, and provide a user interface, such as a graphical user interface (GUI), among other things.

Network

The computer system 502 illustrated in FIG. 5 is coupled to a network 518, such as a LAN, WAN, or the Internet via a communication link 516 (wired, wireless, or a combination thereof). Network 518 communicates with various computing devices and/or other electronic devices. Network 518 is communicating with one or more computing systems 520 and one or more data sources 522. The computer system 502 can comprise an endpoint modeling and grouping management system 514 can access or can be accessed by computing systems 520 and/or data sources 522 through a web-enabled user access point. Connections can be a direct physical connection, a virtual connection, and other connection type. The web-enabled user access point can comprise a browser system that uses text, graphics, audio, video, and other media to present data and to allow interaction with data via the network 518.

The output system can be implemented as a combination of an all-points addressable display such as a cathode ray tube (CRT), a liquid crystal display (LCD), a plasma display, or other types and/or combinations of displays. The output system can be implemented to communicate with input devices and/or interfaces 512 and they also include software with the appropriate interfaces which allow a user to access data through the use of stylized screen elements, such as menus, windows, dialogue boxes, tool bars, and controls (for example, radio buttons, check boxes, sliding scales, and so forth). Furthermore, the output system can communicate with a set of input and output devices to receive signals from the user.

Other Systems

The computing system 502 can comprise one or more internal and/or external data sources (for example, data sources 522). In some embodiments, one or more of the data repositories and the data sources described above can be implemented using a relational database, such as DB2, Sybase, Oracle, CodeBase, and Microsoft® SQL Server as well as other types of databases such as a flat-file database, an entity relationship database, and object-oriented database, and/or a record-based database.

The computer system 502 can also access one or more data sources 522. The data sources 522 can be stored in a database or data repository. The computer system 502 can access the one or more data sources 522 through a network 518 or can directly access the database or data repository through I/O devices and interfaces 512. The data repository storing the one or more data sources 522 can reside within the computer system 502.

Deep Visibility

In some embodiments, one or more agents can be installed on one or more endpoints to collect data in real-time and/or substantially real-time. The agents can be installed to collect network activity, kernel-based monitoring of operations and processes, and encrypted and non-encrypted data, thereby providing the system with deep visibility into the endpoints. In some embodiments, such deep visibility allows the endpoint modeling and grouping management system to monitor and/or assess substantially all, if not all, traffic data and provide functionality on this data set (such as a full indicator of compromise (IOC), analyze all or substantially all endpoints and network activities, provide a richer data set for security threat and risk assessment, provide the ability to perform containment actions on the endpoints, establish baseline behavior based on a fuller dataset, and/or the like).

In some embodiments, the agents can collect traffic without the need to decrypt the network traffic. Thus, the certificates may not be needed to identify encrypted network traffic. Furthermore, the agents can collect data before being encrypted for transmission to an external communication channel and/or collect data after decryption from transmission from an external communication channel. As such, the endpoint modeling and grouping management system can address a shortcoming of traditional enterprise networks that can be limited to monitoring encrypted network traffic at the firewall.

Figure 6:
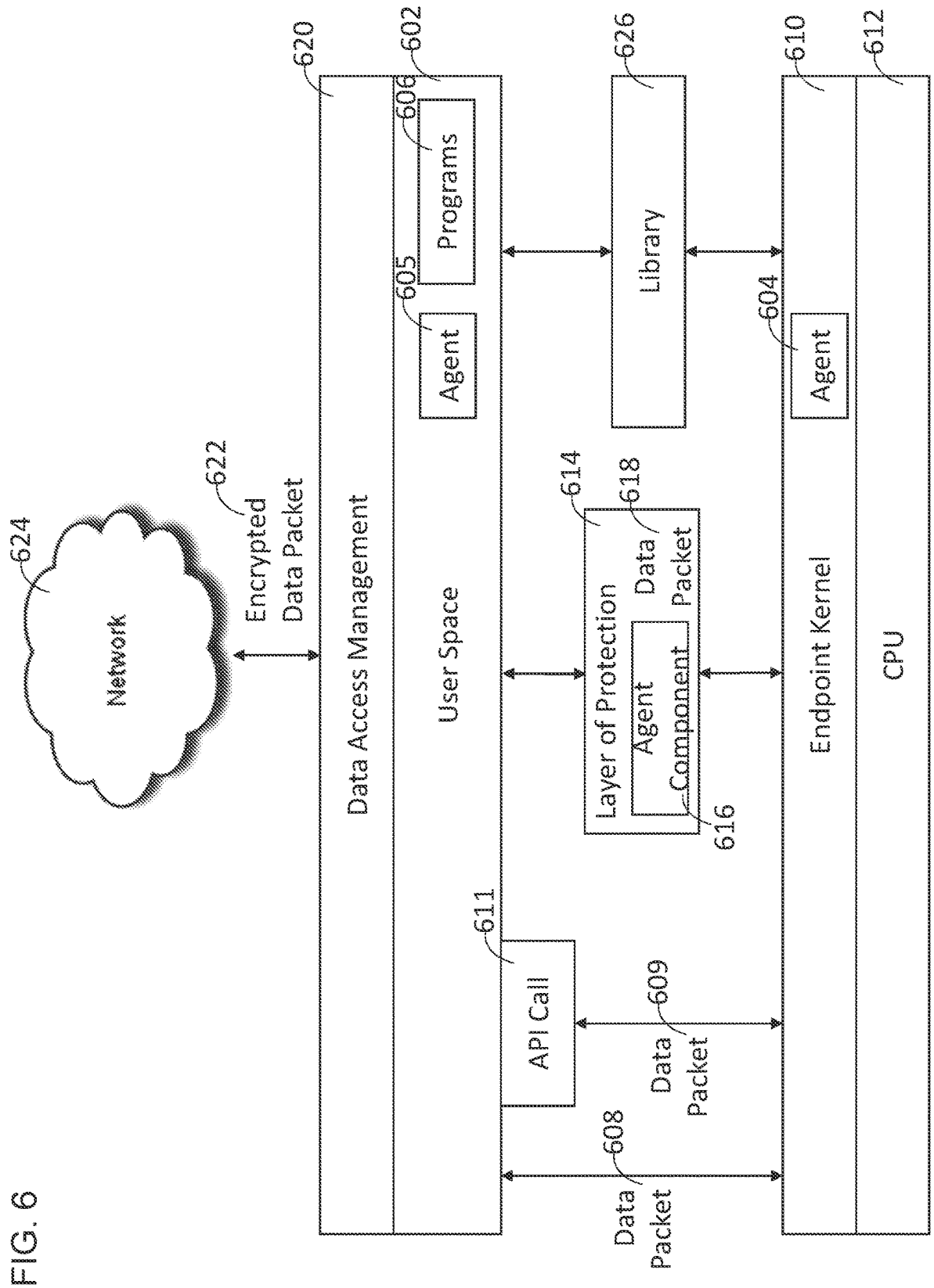
FIG. 6 is a block diagram illustrating one or more agents collecting data from an endpoint according to some embodiments.

FIG. 6 is a block diagram illustrating one or more agents collecting data from an endpoint according to some embodiments. In some embodiments, an agent 604 can be installed on the endpoint. For example, the agent 604 can be installed using a driver that monitors activity on the kernel 610. Thus, the endpoint modeling and grouping management system can access not only network traffic, but network traffic after the data packets are decrypted for inbound transmission and/or before the data packets are encrypted for outbound transmission. The endpoint modeling and grouping management system can also access and/or monitor all activity on the kernel level, such as activity internal to the endpoint, further addressing another shortcoming of traditional enterprise networks that may be limited to inbound or outbound network traffic.

In some embodiments, the user space 602 can comprise one or more programs 606 that are running on the endpoint, such as a browser application. One or more data packets 608 can be transmitted and/or received from the user space 602 to a kernel 610. In some embodiments, the kernel can translate the data packets to be transmitted to the CPU 612 for processing. In some embodiments, the data packets 608 can be sent directly from the user space 602 to the kernel 610 for translation for the CPU 612. In some embodiments, the data packets 609 can be transmitted and/or requested via an API call 611, which can be transmitted to the kernel 610 for translation for the CPU 612.

In some embodiments, one or more programs 606 can use their own (and/or a third party) layer of protection 614 for transmitting and/or receiving data packets 618, such as a sandbox to package the data packet 618 to send directly to the kernel 610. The additional layer of protection can prevent malicious injection of security threats into data packets 618 as the data packet 618 is transmitted to and from the user space 602 and the kernel 610. The endpoint modeling and grouping management system can obtain visibility by placing an agent component 616 onto the layer of protection 614, such as via a plugin that is placed within the layer of protection 614 where the data packet 618 is also placed. The agent component 616 can identify and collect the data traffic once the program 606 removes the layer of protection 614 upon receipt from the kernel 610 and/or before adding the layer of protection 614 when transmitting to the kernel 610.

In some embodiments, one or more programs 606 on the user space 602 can be configured to communicate to the external network 624. One or more data packets can pass through data access management system 620. In some embodiments, the data access management system 620 and/or other device can encrypt the one or more data packets 622 to be sent to the external network 624, and/or can decrypt one or more encrypted data packets 622 received from the external network 624. In some embodiments, in order to send a data packet to the external network 624, a program 606 can request data from a library 626 (for example, data to enable the ability to send and receive port control protocol (PCP)). In some embodiments, the traffic to this library 626 is passed to the kernel 610 and to the CPU 612 before being transmitted to an external computing device outside of the network perimeter. Thus, the agent 604 can be configured to collect this data passing through the library 626 before the data is transmitted to the external computing device. In some embodiments, the agent 604 can be installed on the library 626 and/or on a driver that collects data from the library 626.

The agent 605 can be installed on a program 606 of the user space 602 and/or can be a driver that collects data from a program 606 on the user space 602. In some embodiments, the endpoint modeling and grouping management system can install an agent 605 on the user space 602 and/or install an agent 604 on the kernel layer 610, which can enable detection of abnormal behavior when abnormal activity occurs between the user space 606 and the kernel layer 610 (such as when malicious code is injected in a data packet traveling between the user space 606 and a kernel layer 610). Accordingly, the endpoint modeling and grouping management system can detect abnormalities and/or security threats when a virus or malware is injected before a data packet 608 is processed by the CPU 612 and/or affects the programs 606 on the user space 602.

Figure 7:
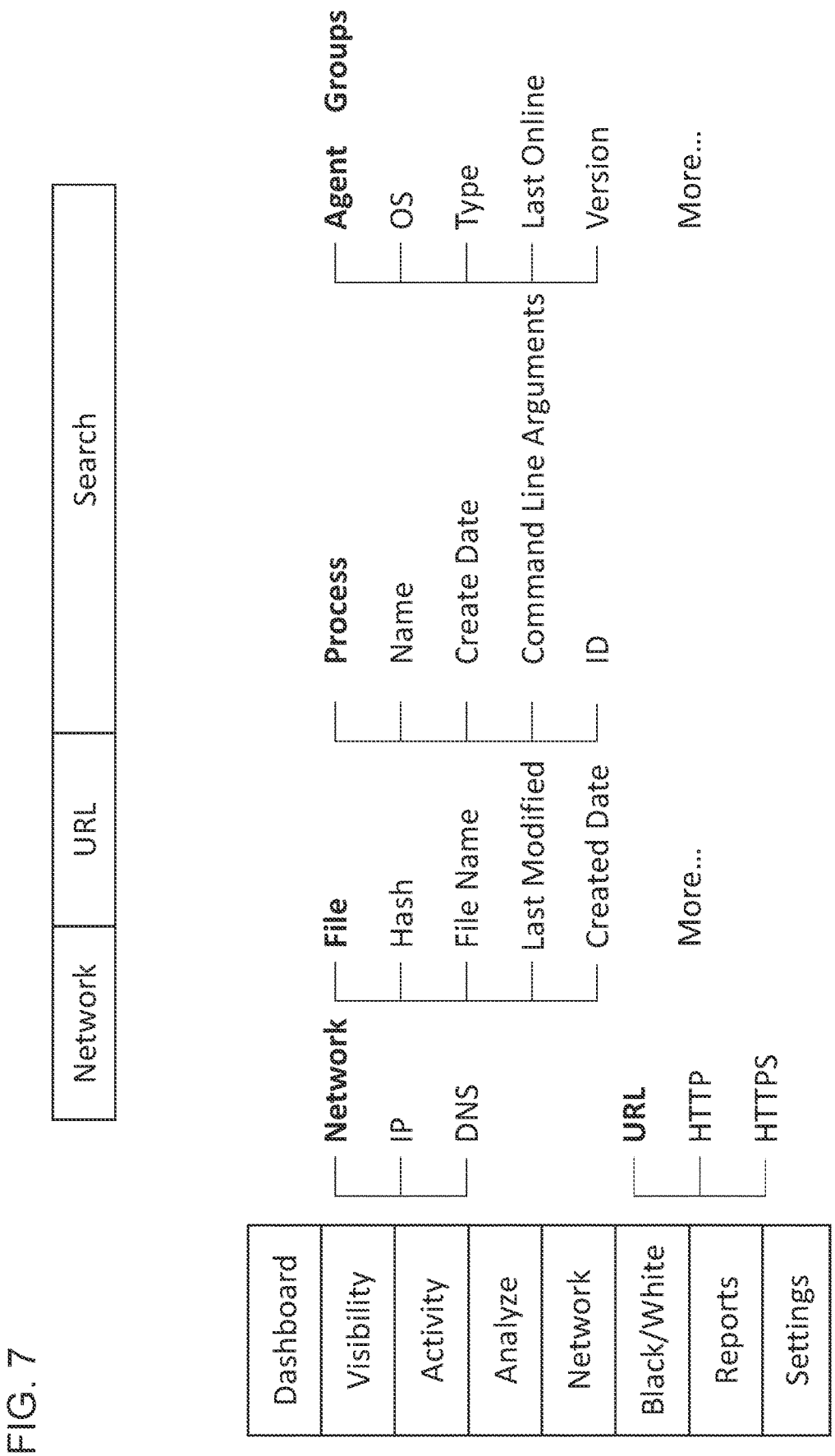
FIG. 7 is a graphical user interface of the data the agent can collect according to some embodiments.

In some embodiments, because one or more agents are installed on one or more endpoints and can monitor and collect data at the kernel level, the endpoint modeling and grouping management system can obtain access to a wide range of data types that may not be available in certain enterprise networks. FIG. 7 is a graphical user interface illustrating some of the types of data the agent can collect according to certain embodiments. As non-limiting examples, the types of data that can be collected by one or more agents can comprise: full disk file monitoring, including the filename, full path, time created, time modified, SHA1, SHA256, MD5; live process monitoring including process name, process ID, time created; originating executable including filename, full path, time created, time modified, SHA1, SHA256, MD5; process events including network activity, file creation/modification, timestamp; and live network monitoring including IP/TCPv4 connections (including attempts), DNS queries, URLs (for HTTP and HTTPS connections), headers (for HTTP and HTTPS connections), and timestamps.

In some embodiments, one or more agents can be configured to collect data available at the PCP (for example, the uniform resource locators (URLs)). In some embodiments, the agents and/or the endpoint modeling and grouping management system can parse and/or assess collected data. For example, the endpoint modeling and grouping management system can parse the URL to identify the host name of the URL and/or the https meta header. In some embodiments, one or more agents can collect cookie information, guest parameters, host parameters, and/or http parameters from endpoint activity. In some embodiments, the endpoint modeling and grouping management system can monitor browsing history of one or more endpoints and determine behavioral patterns of the one or more endpoints based on the browsing history.

In some embodiments, the endpoint modeling and grouping management system can identify matches in certain types of collected data to determine groups. In some embodiments, the endpoint modeling and grouping management system can create policies and/or enforcement data in accordance with the type of data collected. In some embodiments, the endpoint modeling and grouping management system can allow for a search on the collected data generated by the agents installed at various endpoints within the elastic network (for example, analyzing for a specific indicator of compromise (IOC)). In some embodiments, the endpoint modeling and grouping management system can analyze and/or match files and/or header data. Further, in some embodiments, the endpoint modeling and grouping management system can be configured to match endpoints visiting a particular website at a particular time and date, identify endpoints with activity in a certain geographical region, and the like.

Elastic Grid and Autonomous Anomaly Identification

In some embodiments, the endpoint modeling and grouping management system can define an enterprise network perimeter based on one or more groupings. Thus, the endpoint modeling and grouping management system can create an elastic perimeter that virtually encompasses endpoints. In some embodiments, the endpoint modeling and grouping management system can define the enterprise network perimeter by grouping endpoints with similar behaviors. For example, an AI component of the endpoint modeling and grouping management system can identify similarities in behaviors of endpoints. In some embodiments, the endpoint modeling and grouping management system can identify each endpoint installed with an agent as part of the enterprise network perimeter.

Figure 8:
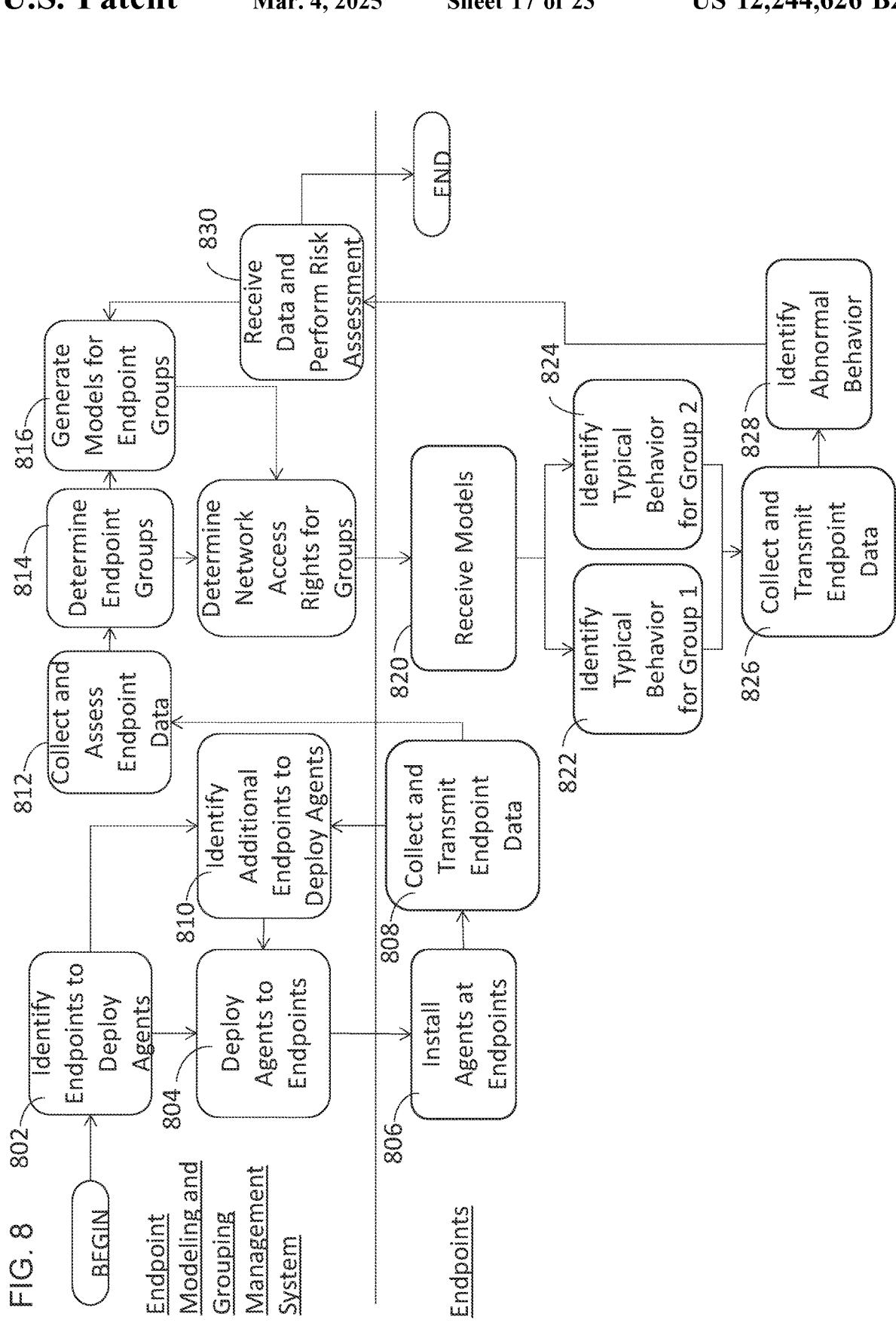
FIG. 8 is a flow diagram illustrating transmission of one or more models to one or more agents based on analysis of data collected from the agents according to some embodiments of an endpoint modeling and grouping management system.

FIG. 8 is a flow diagram illustrating transmission of behavioral models to one or more agents based on analysis of data collected from the agents according to some embodiments of an endpoint modeling and grouping management system transmitting.

At block 802, the endpoint modeling and grouping management system can identify endpoints to which agents can be deployed. For example, the system can determine that one or more agents need to be deployed to a computer within an enterprise network perimeter, a computer outside an enterprise network perimeter, an in-perimeter datacenter, a datacenter outside of a perimeter, and/or a cloud datacenter. In some embodiments, at block 804, the endpoint modeling and grouping management system can deploy the agents to one or more identified, detected, and/or determined endpoints.

At block 806, each of the endpoints that received agents can be configured to install the received agent. In some embodiments, each or some of the endpoints can comprise computing devices and/or memory located on an enterprise network, on a cloud system, on a remote computing device, and/or the like. For example, Endpoint 1 can be an endpoint on a computer within an enterprise network perimeter. Endpoint 2 can be an endpoint on a computer outside of an enterprise network perimeter. Endpoint 3 can be an endpoint on an in-perimeter datacenter. Endpoint 4 can be an endpoint on a datacenter outside of the perimeter, and endpoint 5 and endpoint 6 can be endpoints on cloud datacenters 1 and 2. In some embodiments, one of the endpoints in FIG. 8 can be a cloud service, such as Salesforce, Office 365, Dropbox, Box, GitHub, and/or the like, wherein the system does not deploy an agent at the cloud service endpoint, but rather regulates network access to and/or from the cloud service endpoint.

At blocks 808, the agents can collect and transmit endpoint data. For example, the agents can collect data at the kernel level, identifying internal activities of the endpoints, encrypted and non-encrypted data, inbound/outbound network traffic data, network usage, application usage, processor usage, time period usage, geographic location of the endpoints, corporate department, and/or the like.

At block 810, the endpoint modeling and grouping management system can identify one or more additional endpoints without an agent installed and deploy an agent to those endpoints. In some embodiments, the endpoint modeling and grouping management system can identify an endpoint without an agent on the same computing platform as another endpoint. For example, an endpoint can have an agent installed, which can be used to identify another endpoint without an agent installed that is part of the same cloud datacenter, in-perimeter data center, out-perimeter datacenter, in-perimeter computer, and/or out-perimeter computer.

At block 806, the endpoint can install the agent at additional endpoints, and at block 808, the agent can collect endpoint data from the endpoints and transmit the data to the endpoint modeling and grouping management system. Accordingly, when an endpoint is added to the network via the agent, the endpoint modeling and grouping management system can gain visibility to processing and/or activity of that endpoint by receiving data collected by the agent installed on the endpoint. Thus, the network enterprise perimeter can be defined based at least in part on the data collected by the agents that are installed on the one or more endpoints. This can improve shortcomings of certain enterprise network regimes that are configured to provide software-defined or pre-defined perimeters on a central server, a virtual router, a cloud server, or the like. This can also further improve inefficiency of some enterprise network regimes arising from having to route all traffic to a central server and have the central server respond with its assessment (for example, transmitting access regulations for each data packet). Furthermore, some enterprise network regimes can have limited visibility on encrypted network packets traveling through the network, whereas certain embodiments herein provide visibility to activity or processing at one or more endpoints as described above.

At block 812, the endpoint modeling and grouping management system assesses the data collected by the agents and identifies or determines similarities in the received endpoint data across one or more endpoints. For example, the system can determine that one or more endpoints are similar based on network usage, application usage, processor usage, time period usage, geographic location of the endpoints, corporate department, and/or the like. Further, at block 812, the endpoint modeling and grouping management system can have visibility of activity within the endpoints that have agents installed, such as network usage, application usage, processor usage, time period usage, geographic location of the endpoints, corporate department, and/or the like. For example, the endpoint modeling and grouping management system can have visibility of substantially all endpoints with agents installed therein.

At block 814, the endpoint modeling and grouping management system can determine groups, such as logical groups, based on identified similarities and/or differences. For example, the identified or determined similarities and/or differences can be based on similarities and/or differences in network usage, application usage, processor usage, time period usage, geographic location of the endpoints, corporate department, and/or the like. Each of the groups can comprise one or more endpoints, one or more computer systems, one or more data centers, one or more cloud services, one or more cloud data centers, and/or the like.

At block 816, the endpoint modeling and grouping management system can generate a model for each grouping. For example, the model can be a baseline model that indicates a baseline behavior for endpoints in the group. In some embodiments, the endpoint modeling and grouping management system can identify matches in certain types of collected data to determine groups. In some embodiments, the endpoint modeling and grouping management system can match files and/or header data. For example, the endpoint modeling and grouping management system can match endpoints visiting a particular website at a particular time and date, identify activity in a certain common geographical region, and the like.

In some embodiments, the endpoint modeling and grouping management system can determine a model for groups based on one or more characteristics. For example, the endpoint modeling and grouping management system can create a model according to traffic at the kernel, browsing history, all access data, inbound and outbound connection in a communication protocol (including encrypted traffic), operations on the operating system, device type, processes that are running on the user space and/or other systems of the computing device, network traffic, input from a user, data storage activity, real-time processing, batch processing, multitasking, interactive processing, multiprogramming, transaction processing, multi-access operations, timesharing operations, active directory, access control lists, packet information, protocol information, port number information, packet state information, application information, VPN information, data usage, bandwidth usage, proxy usage, other types of information translated by the kernel for processing in the CPU, a subset and/or all characteristics, and the like.

In some embodiments, the endpoint modeling and grouping management system can generate a model to establish network access regulations. At block 818, the endpoint modeling and grouping management system can determine network access rights for one or more groups of endpoints. The endpoint modeling and grouping management system can regulate the network access restrictions of the endpoints within a particular group. For example, the endpoint modeling and grouping management system can restrict and/or allow network access to a particular cloud data center, a cloud service, a part of the enterprise network, database server, network application, or other devices or services. The endpoint modeling and grouping management system can dynamically identify groups and/or automatically set access restrictions for the groups. Instead of traditional enterprise networks where IT staff are required to identify access regulations for networks with hundreds, thousands, and/or millions of endpoints connected to servers, data centers, and cloud services, the endpoint modeling and grouping management system can automatically identify logical networks and generate access restrictions. The endpoint modeling and grouping management system can identify access regulations based on similarities among endpoints, for example, similarities in network usage, application usage, processor usage, time period usage, geographic location of the endpoints, corporate department, and/or the like.

At block 820, the endpoints receive the models generated by the endpoint modeling and grouping management system and, for example, at blocks 822 and 824, identify baseline behavior based on the models for each group. For example, some can be assigned to logical group 1, and other can be assigned to logical group 2.

In some embodiments, certain endpoints in a group typically access certain network resources, use a certain amount of bandwidth, or the like at a particular time periods (for example, a time of the day, week, month, year). In some embodiments, the system can be configured to use this information to model a baseline behavior. Based on the baseline behavior data, the system can be configured to identify a sudden increase in network data usage and/or odd time periods when network paths are being accessed from an endpoint within the elastic network. For example, the system can be configured to identify when an endpoint is utilizing abnormal network data bandwidth in order to upload and/or download data from a cloud service, wherein such usage represents a big spike above the normal baseline use, and upon identification of such abnormal network usage patterns, the system can be configured to flag the endpoint to a user as a concern and/or automatically and/or immediately restrict network usage for the endpoint acting abnormally. The endpoint modeling and grouping management system can perform such analysis to identify data leaks. Such an approach overcomes the shortcomings of traditional data leak prevention products that can be focused on identifying fixed strings on a network and/or can be focused on device control (such as preventing a device from accessing or copying a file). Focusing on fixed strings and/or device control cannot effectively be applied to an elastic enterprise network with connectivity to mobile devices and to cloud services located outside the firewall.

In some embodiments, the baseline behavior for each group such as logical group can be used to identify abnormal behavior. For example, identifying abnormal behavior can include behavior at a certain time period, types of data packets, an amount of data, encryption techniques used, inbound/outbound network traffic, connection attempts to and from certain external devices, and the like. At block 826, the agents can collect endpoint data, and at blocks 828 the agents can identify abnormal behavior from the baseline identified in the models. Thus, the models that were sent by the endpoint modeling and grouping management system can enable the endpoints to act autonomously and identify abnormal behavior on its own. In some embodiments, the agents can identify abnormal behavior without having to send data to the endpoint modeling and grouping management system and/or other central server, cloud server, network server, or the like. Because the identification of the abnormal behavior can occur on the endpoints via the agent, the response can be quicker before the security attack can take further action without having to send a notice to a central server and wait for a response. Furthermore, performing the assessment and/or the enforcement at the agent, the required communications back and forth with the endpoint modeling and grouping management system (and/or a central server) is reduced. This becomes important in today's enterprise networks where over a million endpoints can be connected to a cloud system with access controls for each endpoint. Thus, the endpoint modeling and grouping management system in the present disclosure can be scalable, whereas a centralized server performing the identification of abnormal behavior may not be scalable. Another benefit is that the enforcement policies can occur in real-time as processes are sent and/or received at the kernel level. Connection attempts from the endpoint to an external device and/or connection attempts from an external device to the endpoint can be detected before the connection is established. Thus, the agents can restrict these connections in real-time before security breaches occur.

Once abnormal behavior is identified, the agents can autonomously take certain action, such as initiating forensics analysis, mitigation and/or remediation techniques, containment mechanisms, rolling back capabilities, file and machine quarantine, external threat feed ingestion, restricting and/or terminating network path access, and the like.

At block 830, the endpoint modeling and grouping management system can receive the identified abnormal behavior and perform further security risk assessment. At block 816, the endpoint modeling and grouping management system can update the model based on the identified abnormal behavior, and transmit the updated model to endpoints of the group such as logical group.

In some embodiments, the endpoint modeling and grouping management system can identify endpoints that appear to belong to a particular group such as logical group, but can create exceptions for the endpoint. In some embodiments, the endpoint modeling and grouping management system can create customizations to groups that are created, such as changing access restrictions. The customizations can be applied to the entire group and/or to individual endpoints. In some embodiments, the endpoint modeling and grouping management system can create exceptions for super-users to allow access to certain cloud data centers that other end points in similar groups may not be able to access.

In some embodiments, the endpoint modeling and grouping management system can allow for a search on the collected information generated by the agents installed at various endpoints within the elastic network (for example, analyzing for a specific indicator of compromise (IOC)). In some embodiments, the collected endpoint data can be parsed and indexed in a database. In some embodiments, in response to a receiving a request to search the endpoint data, the endpoint modeling and grouping management system can perform a search on the indexed database and transmit matches to keywords, threshold levels, and/or indicators of compromise in the search inquiry. In some embodiments, the endpoint modeling and grouping management system provides an indicator of comprise (IOC) search on all endpoints within the elastic network and/or on network activities occurring within the elastic network. The collected information generated by the agents installed at various endpoints can provide a rich database for threat hunting and data mining for identifying network activity that could be indicative of malware or other harmful software operating on an endpoint within the elastic network. In an embodiment, the system comprises filters and/or other mechanisms for identifying network behavior suggestive of a malware attack, and in some embodiments, the system can be configured to respond to such malware attacks by taking containment actions and/or restricting network access for particular affected endpoints in order to protect the rest of the elastic network.

The endpoint modeling and grouping management system can adjust the granularity threshold for identifying groups. If the granularity threshold is set high, there may be too many endpoints in a group. In some embodiments, having too many endpoints in a group may make it challenging to assign network access path privileges. In some embodiments, the granularity of the threshold can be adjusted for logical grouping and/or modeling. In some embodiments, the endpoint modeling and grouping management system can determine groups such as logical groups based on the updated threshold and deploy updated model data to the agents. In some embodiments, the endpoints can identify baseline behavior for the associated groups such as logical groups based on the updated model data. For example, in response to changing the granularity threshold for the groups such as logical groups, some endpoints can remain in group 1 but some endpoints can be regrouped into group 3, and some endpoints can remain in group 2. The endpoint modeling and grouping management system can update the models for the new logical groupings that can be used to determine new baseline behaviors for each of the new logical groupings. These models can be deployed to the agents, such that the agents can identify abnormal behavior for the updated baseline behavior associated with the new logical groupings. In some embodiments, the agents can set access policies to regulate inbound and outbound data to and from the endpoints. These access policies can be determined based on the models updated for each new group such as logical group.

In some embodiments, the endpoint modeling and grouping management system can assess violations of a group. In some embodiments, a violation can comprise when an endpoint attempts to access a network path that is restricted based on the privileges assigned to endpoint, and/or the group that the endpoint is a part of, by the endpoint modeling and grouping management system. The endpoint modeling and grouping management system can assess violations to dynamically and/or automatically change the granularity threshold for the groupings, in other words, change the group in which the endpoint is a part of. In some embodiments, the endpoint modeling and grouping management system can assess violations to dynamically and/or automatically change the network access path privileges assigned to the endpoint and/or the group in which the endpoint is a part of. In some embodiments, violations can be the identification of an incorrect access restriction. Users can indicate an incorrect access restriction to the endpoint modeling and grouping management system. In some embodiments, based on a number and/or percentage of violations, the endpoint modeling and grouping management system can increase and/or decrease the granularity threshold. In some embodiments, the endpoint modeling and grouping management system can adjust the granularity threshold based on a number of groups.

In some embodiments, the endpoint modeling and grouping management system comprises an antivirus system that is configured to search for known viruses and can be combined with a system configured to restrict network access control for endpoints.

Figure 9:
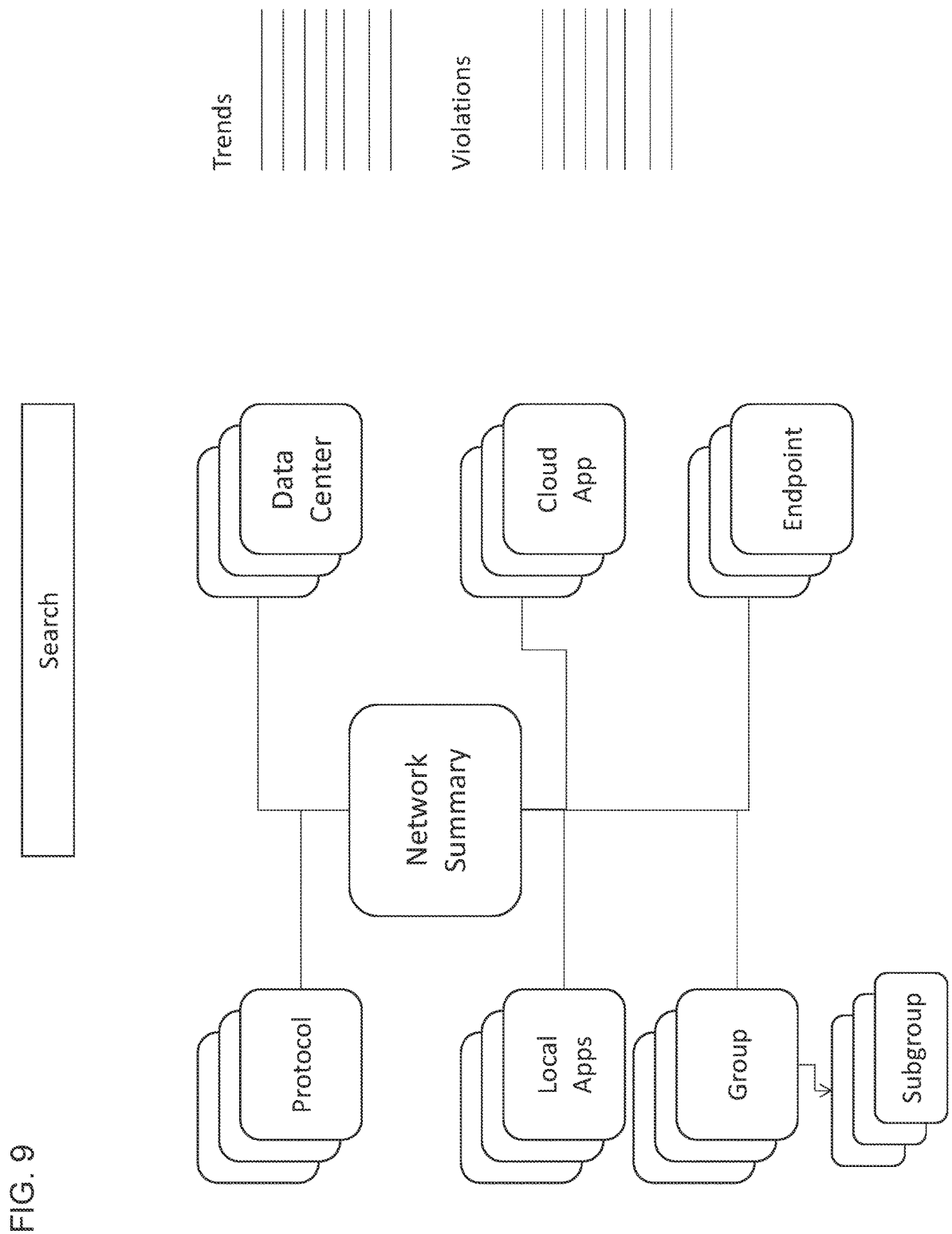
FIG. 9 is a graphical user interface of a group view according to some embodiments.

FIG. 9 is a graphical user interface of a group view according to some embodiments. In some embodiments, the endpoint modeling and grouping management system can provide a dashboard of a group such as logical group in a graphical user interface. In some embodiments, the endpoint modeling and grouping management system can be configured to generate data for causing the display of a dashboard on a remote user's computer screen. In some embodiments, the graphical user interface can display a group and characteristics of the group. In some embodiments, the group can be named "West Coast" indicating employees located on the West Coast of the United States. The graphical user interface can indicate the number of endpoints associated with the group, such as 2,083 end points. The group, such as logical group, can include subgroups within the group, such as one group having 73 subgroups. In some embodiments, the graphical user interface can be configured to display the number of violations for groups, such as 43% of endpoints reporting violations for the "west coast" group. The graphical user interface can display the access regulations to other endpoints, such as local and/or remote applications, protocols, cloud services, data centers, and the like. For example, in some embodiments, the "West Coast" group can be connected to a local application, a USB protocol and several data centers, while being restricted access to a cloud application. In some embodiments, the graphical user interface can display various subgroups of the west coast and/or endpoints of the group such as logical group. In some embodiments, the graphical user interface can display a list of violations for particular endpoints. In some embodiments, the graphical user interface can display the number and/or percentage of violations over a period of time. In some embodiments, the graphical user interface can display an amount of data downloaded and/or uploaded to and from endpoints and/or a group of endpoints. In some embodiments, the graphical user interface can display an amount of data downloaded and/or uploaded to and from endpoints and/or a group of endpoints, and compare such data to historical data. In some embodiments, the system can be configured to generate a flag and/or an alert and/or terminate or reduce network access for an endpoint and/or group of endpoints if the comparison of the amount of data downloaded and/or uploaded with historical data exceeds a threshold level.

Figure 10:
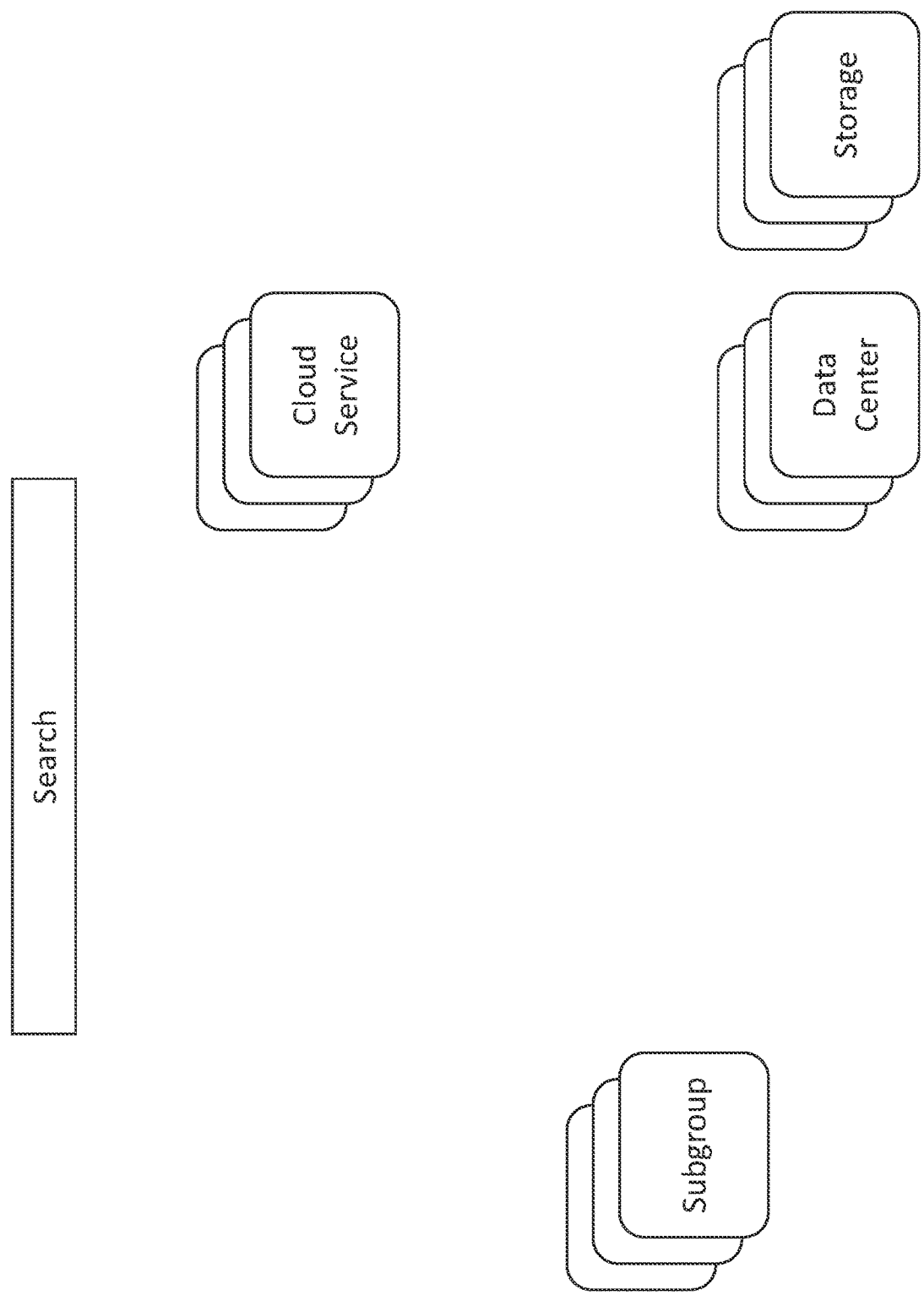
FIG. 10 is a graphical user interface of a dashboard listing groups, data centers, and services according to some embodiments.
Figure 11:
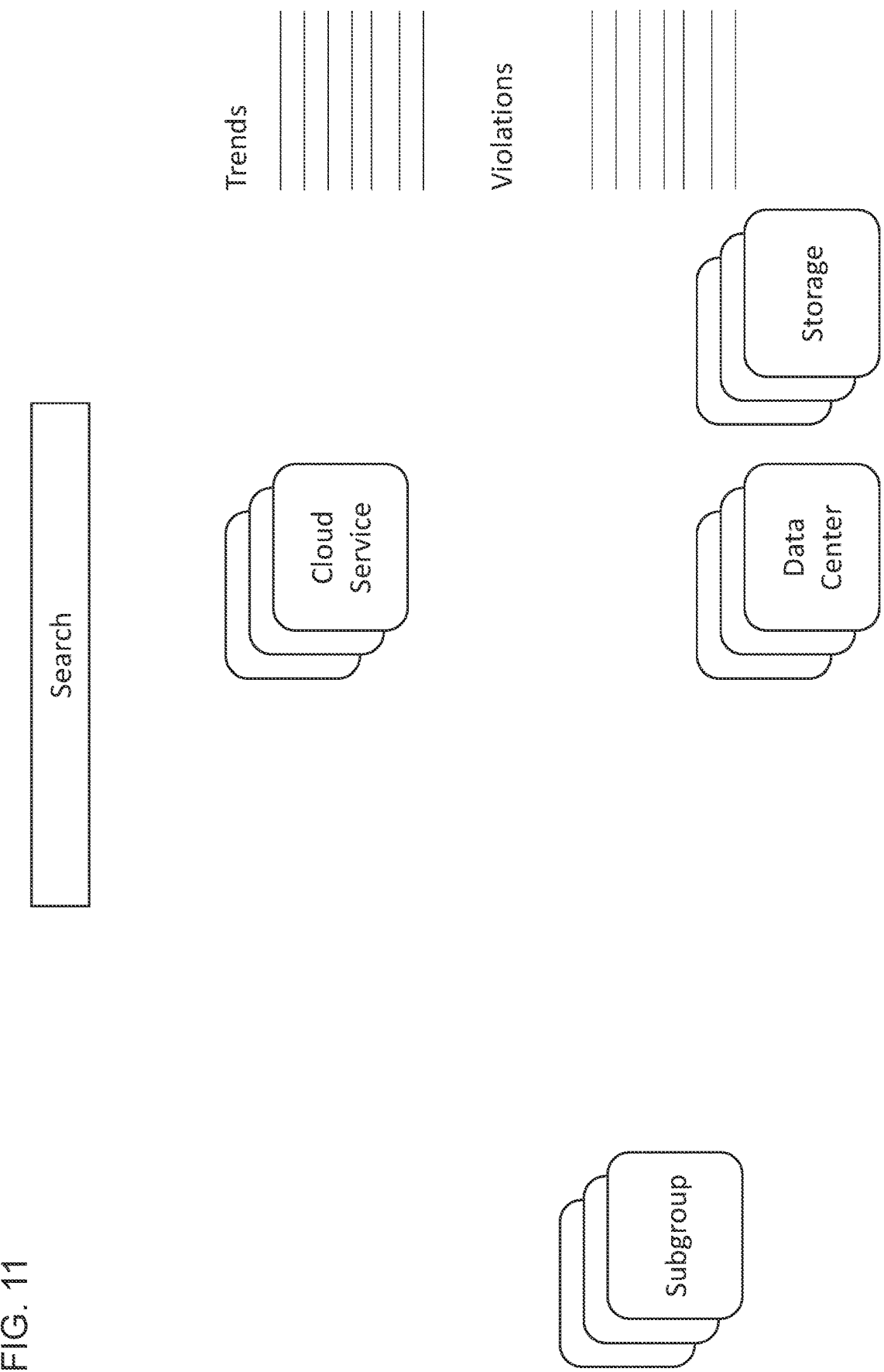
FIG. 11 is a graphical user interface of a group and associated violations according to some embodiments.

In some embodiments, the endpoint modeling and grouping management system can provide a graphical user interface of available groups, data centers, and/or services. In an embodiment, the endpoint modeling and grouping management system can provide a graphical display showing a mapping of endpoints in the elastic network, wherein the endpoint modeling and grouping management system can be configured for automatic, semi-automatic, manual, and/or a combinational determination of access restrictions for the endpoints. FIGS. 10 and 11 are illustrations of graphical user interfaces according to some embodiments of a dashboard listing groups as well as servers, storage devices, data centers, cloud-based services and storage, and other network services that endpoints in the elastic network may access. In the embodiments of FIGS. 10 and 11, the endpoint modeling and grouping management system can display a list of groups, such as logical groups, and/or sub-groups. The endpoint modeling and grouping management system can display available cloud data centers, cloud services, local and/or remote servers, local and/or remote applications, local and/or remote databases, protocols, and the like.

Figure 12:
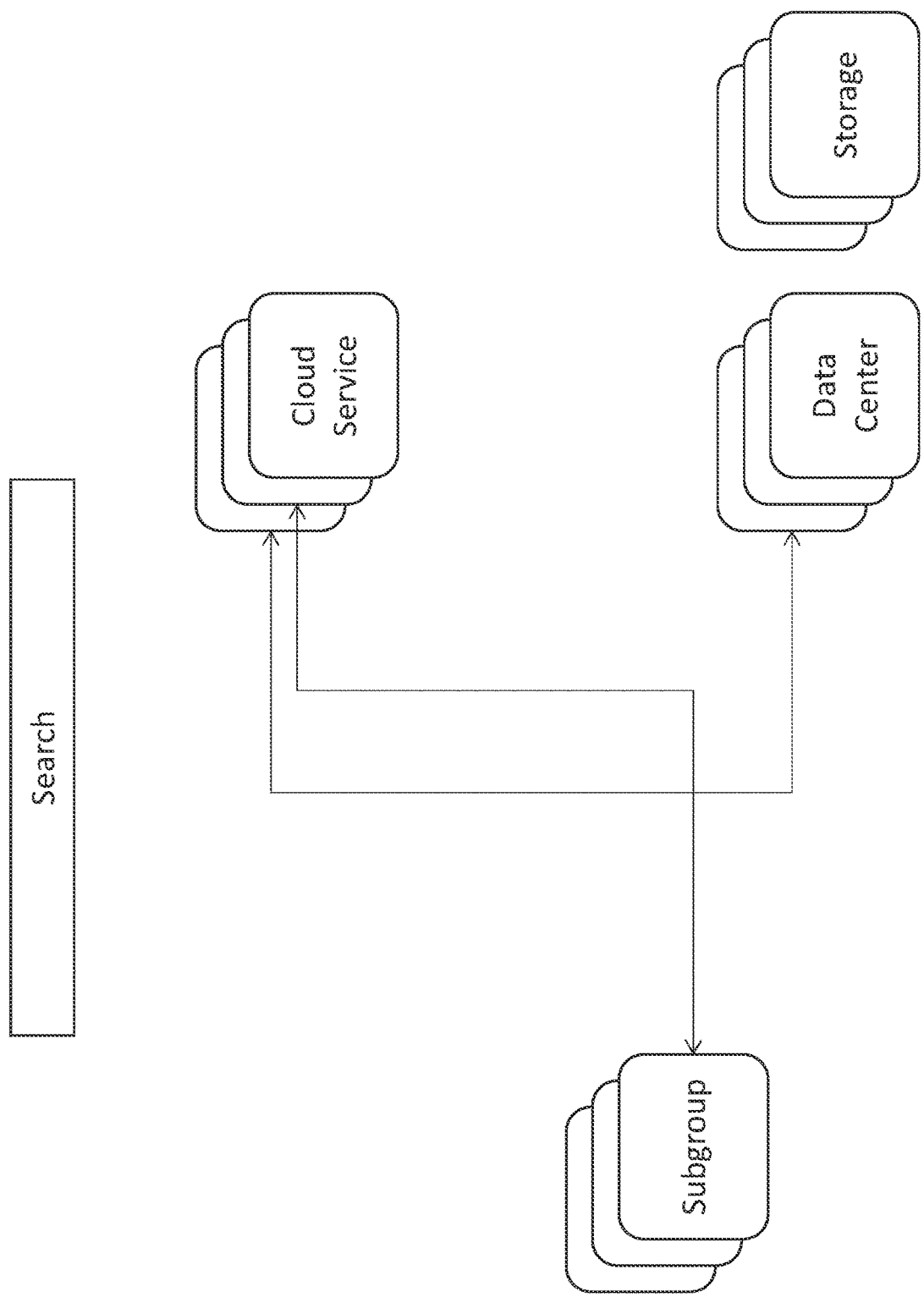
FIG. 12 is a graphical user interface of a group with access controls to two servers and two services according to some embodiments.
Figure 13:
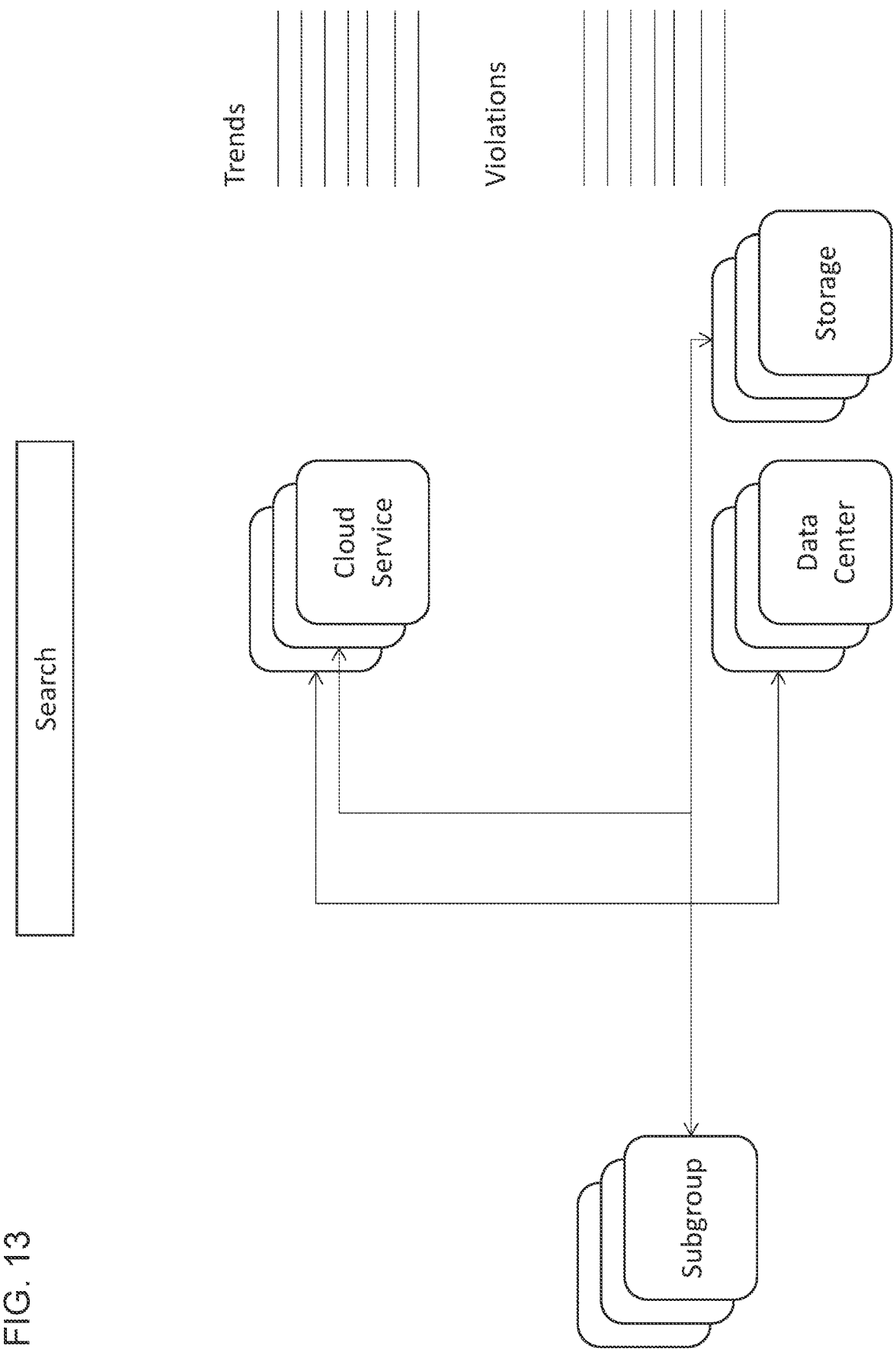
FIG. 13 is a graphical user interface of a group with access controls to servers, two services, and a local database file storage according to some embodiments.

In some embodiments, the endpoint modeling and grouping management system can display access of a particular group to cloud data centers, cloud services and/or applications, local servers or servers, local applications or applications, protocols, network access privileges, and the like. FIGS. 12 and 13 are a graphical user interfaces according to some embodiments. In the embodiment of FIG. 12, the graphical user interface displays a group with access to a server and two cloud-based services. In the embodiment of FIG. 12, a subgroup with a certain number of endpoints and subgroups is selected and shown to have access to two cloud services and one local data center, and/or access restrictions on a cloud service, a local server, and two local data centers. In the embodiment of FIG. 13, the graphical user interface displays a group, such as logical group, with access controls to a server, two cloud-based services, and a local database file storage. In some embodiments, the endpoint modeling and grouping management system can automatically determine and/or display access restrictions on a graphical user interface. In some embodiments, the endpoint modeling and grouping management system can allow manual determination and/or modification of access restrictions on a graphical user interface.

In some embodiments, the endpoint modeling and grouping management system can display a list of groups with associated characteristics. FIG. 14 is a graphical user interface according to some embodiments of a listing of groups such as logical groups and associated characteristics. In some embodiments, the graphical user interface can display the number of end points and/or sub-groups for each group. In some embodiments, the graphical user interface can display the number of access allowances and/or restrictions to protocols, data centers, cloud applications and cloud resources, local applications and/or data, and the like for each group. In some embodiments, the graphical user interface can display the number of violations for each group.

URLs and Cookies

In some embodiments, one or more features of the systems, methods, and devices described herein can utilize a URL and/or cookies, for example for storing and/or transmitting data or user information. A Uniform Resource Locator (URL) can comprise a web address and/or a reference to a web resource that is stored on a database and/or a server. The URL can specify the location of the resource on a computer and/or a computer network. The URL can comprise a mechanism to retrieve the network resource. The source of the network resource can receive a URL, identify the location of the web resource, and transmit the web resource back to the requestor. A URL can be converted to an IP address, and a Doman Name System (DNS) can look up the URL and its corresponding IP address. URLs can be references to web pages, file transfers, emails, database accesses, and other applications. The URLs can comprise a sequence of characters that identify a path, domain name, a file extension, a host name, a query, a fragment, scheme, a protocol identifier, a port number, a username, a password, a flag, an object, a resource name and/or the like. The systems disclosed herein can generate, receive, transmit, apply, parse, serialize, render, and/or perform an action on a URL.

A cookie, also referred to as an HTTP cookie, a web cookie, an internet cookie, and a browser cookie, can comprise data sent from a website and/or stored on a user's computer. This data can be stored by a user's web browser while the user is browsing. The cookies can comprise useful information for websites to remember prior browsing information, such as a shopping cart on an online store, clicking of buttons, login information, and/or records of web pages or network resources visited in the past. Cookies can also comprise information that the user enters, such as names, addresses, passwords, credit card information, etc. Cookies can also perform computer functions. For example, authentication cookies can be used by applications (for example, a web browser) to identify whether the user is already logged in (for example, to a web site). The cookie data can be encrypted to provide security for the consumer. Tracking cookies can be used to compile historical browsing histories of individuals. Systems disclosed herein can generate and use cookies to access data of an individual. Systems can also generate and use JSON web tokens to store authenticity information, HTTP authentication as authentication protocols, IP addresses to track session or identity information, URLs, and the like.

Alternative Embodiments

Although this invention has been disclosed in the context of certain embodiments and examples, it will be understood by those skilled in the art that the invention extends beyond the specifically disclosed embodiments to other alternative embodiments and/or uses of the invention and obvious modifications and equivalents thereof. In addition, while several variations of the embodiments of the invention have been shown and described in detail, other modifications, which are within the scope of this invention, will be readily apparent to those of skill in the art based upon this disclosure. It is also contemplated that various combinations or sub-combinations of the specific features and aspects of the embodiments can be made and still fall within the scope of the invention. It should be understood that various features and aspects of the disclosed embodiments can be combined with, or substituted for, one another in order to form varying modes of the embodiments of the disclosed invention. Any methods disclosed herein need not be performed in the order recited. Thus, it is intended that the scope of the invention herein disclosed should not be limited by the particular embodiments described above.

Conditional language, such as, among others, "can," "could," "might," or "may," unless specifically stated otherwise, or otherwise understood within the context as used, is generally intended to convey that certain embodiments include, while other embodiments do not include, certain features, elements and/or blocks. Thus, such conditional language is not generally intended to imply that features, elements and/or blocks are in any way required for one or more embodiments or that one or more embodiments necessarily include logic for deciding, with or without user input or prompting, whether these features, elements and/or blocks are included or are to be performed in any particular embodiment. The headings used herein are for the convenience of the reader only and are not meant to limit the scope of the inventions or claims.

Further, while the methods and devices described herein may be susceptible to various modifications and alternative forms, specific examples thereof have been shown in the drawings and are herein described in detail. It should be understood, however, that the invention is not to be limited to the particular forms or methods disclosed, but, to the contrary, the invention is to cover all modifications, equivalents, and alternatives falling within the spirit and scope of the various implementations described and the appended claims. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication. The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (for example, as accurate as reasonably possible under the circumstances, for example ±5%, ±10%, ±15%, etc.). For example, "about 3.5 seconds" includes "3.5 seconds." Phrases preceded by a term such as "substantially" include the recited phrase and should be interpreted based on the circumstances (for example, as much as reasonably possible under the circumstances). For example, "substantially constant" includes "constant." Unless stated otherwise, all measurements are at standard conditions including temperature and pressure.

What is claimed is:

1. A computer-implemented method comprising:
   monitoring, by a software agent operating on an endpoint of a computer network, one or more processes or network communications of the endpoint to obtain endpoint data,
       wherein at least one endpoint of the computer network is located outside of a computer network firewall,
       wherein the software agent is configured to perform a point-in-time validation of the endpoint, and
       wherein the point-in-time validation comprises a verification that no anomalous indicators are present on the endpoint;
   identifying, by the software agent, an anomalous indicator on the endpoint based at least in part on the endpoint data, wherein identifying the anomalous indicator comprises comparing activity on the endpoint to prior activity on the endpoint; and
   responding, by the software agent, to the anomalous indicator on an endpoint-level by limiting one or more operating system processes or network communications of the endpoint.

2. The computer-implemented method of claim 1, wherein the comparing activity comprises: accessing a rule set, the rule set based on at least in part on the prior activity, and comparing the rule set to the activity on the endpoint.

3. The computer-implemented method of claim 1, wherein the responding by the software agent is performed without receiving a command instruction from an external server.

4. The computer-implemented method of claim 1, wherein monitoring the one or more processes or the network communications of the endpoint comprises continuously verifying and authenticating the endpoint activities.

5. The computer-implemented method of claim 1, wherein the endpoint comprises one of a cellphone, server, virtual machine, laptop, tablet, desktop computer, Internet of Things (IoT) device, landline phone, wearable device, or smart home device.

6. The computer-implemented method of claim 1, wherein the software agent is configured to scan the computer network to identify devices in or in proximity to the computer network.

7. A non-transient computer readable medium containing program instructions for causing an endpoint of a computer network to perform the steps of:

monitoring, by a software agent operating on endpoint, one or more processes or network communications of the endpoint to obtain endpoint data, wherein at least one endpoint of the computer network is located outside of a computer network firewall, wherein the software agent is configured to perform a point-in-time validation of the endpoint, and wherein the point-in-time validation comprises a verification that no anomalous indicators are present on the endpoint;

identifying, by the software agent, an anomalous indicator on the endpoint based at least in part on the endpoint data, wherein identifying the anomalous indicator comprises comparing activity on the endpoint to prior activity on the endpoint; and responding, by the software agent, to the anomalous indicator on an endpoint-level by limiting one or more operating system processes or network communications of the endpoint.

8. The non-transient computer readable medium of claim 7, wherein the comparing activity comprises: accessing a rule set, the rule set based on at least in part on the prior activity, and comparing the rule set to the activity on the endpoint.

9. The non-transient computer readable medium of claim 7, wherein the responding by the software agent is performed without receiving a command instruction from an external server.

10. The non-transient computer readable medium of claim 7, wherein monitoring the one or more processes or the network communications of the endpoint comprises continuously verifying and authenticating the endpoint activities.

11. The non-transient computer readable medium of claim 7, wherein the endpoint comprises one of a cellphone, server, virtual machine, laptop, tablet, desktop computer, Internet of Things (IoT) device, landline phone, wearable device, or smart home device.

12. The non-transient computer readable medium of claim 7, wherein the software agent is configured to scan the computer network to identify devices in or in proximity to the computer network.

* * * * *